US010540707B2

(12) United States Patent
Takeda

(10) Patent No.: US 10,540,707 B2
(45) Date of Patent: Jan. 21, 2020

(54) COMMERCIAL INFORMATION PROVIDING SYSTEM AND COMMERCIAL INFORMATION PROVIDING METHOD

(71) Applicant: Universal Entertainment Corporation, Koto-ku, Tokyo (JP)

(72) Inventor: Kengo Takeda, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 568 days.

(21) Appl. No.: 15/267,550

(22) Filed: Sep. 16, 2016

(65) Prior Publication Data

US 2017/0083969 A1    Mar. 23, 2017

(30) Foreign Application Priority Data

Sep. 18, 2015 (JP) ................. 2015-185650

(51) Int. Cl.
G06Q 30/06 (2012.01)
G06F 16/951 (2019.01)
G06Q 10/02 (2012.01)

(52) U.S. Cl.
CPC ....... *G06Q 30/0641* (2013.01); *G06F 16/951* (2019.01); *G06Q 30/0631* (2013.01); *G06Q 10/02* (2013.01)

(58) Field of Classification Search
CPC ........... G06Q 30/0641; G06Q 30/0631; G06Q 10/02; G06F 16/951
USPC ................................ 705/27.1, 26.7
See application file for complete search history.

(56) References Cited

U.S. PATENT DOCUMENTS

| 6,085,186 A | * | 7/2000 | Christianson ........... H04L 29/06 |
| 10,339,222 B2 | * | 7/2019 | Henmi ................ G06F 17/2785 |
| 2002/0082882 A1 | * | 6/2002 | Perry ..................... G06Q 10/10 705/52 |
| 2016/0286581 A1 | * | 9/2016 | Shigemori ............ H04W 76/10 |

FOREIGN PATENT DOCUMENTS

JP    2010-N83615    * 11/2010    ............. G06Q 50/00

* cited by examiner

*Primary Examiner* — Yogesh C Garg
(74) *Attorney, Agent, or Firm* — Simpson & Simpson, PLLC; S. Peter Konzel

(57) ABSTRACT

Provided is a commercial information providing system that provides commercial information intended by the administrator in the commercial information suitable for a response to the user. The commercial information providing system includes a control device and an information providing device. The control device is connectable to a database and configured to perform processing of extracting a set of commercial information to be provided from a plurality of sets of commercial information and a response template to be used from a plurality of response templates based on question information input from a user interface and creating response information using the response template. The response information includes a set of commercial information selected from the extracted the set of commercial information based on the priority level. The information providing device is configured to provide the response information created by the control device to the user.

6 Claims, 51 Drawing Sheets

FIG. 12

| SHOP ID | SHOP NAME | PRIORITY LEVEL | TODAY'S RECOMMEN-DATION (DISCOUNT ITEM) | LOCATION | MESSAGE FROM SHOP | ... | IMAGE 1 BASIC PHOTO | ... | FIELD 1 CATEGORY | FIELD 2 NON-FATTY/FATTY | ... | FIELD 10 OPEN HOURS | ... | FIELD n PRICE RANGE | ACCEPTABLE COUPON |
|---|---|---|---|---|---|---|---|---|---|---|---|---|---|---|---|
| 001 | RESTAURANT A | A | JIAOZI | BACKMOST | ... | ... | picture 1-1 | ... | CHINESE FOOD | NON-FATTY | ... | 10:00~0:00 | ... | 500~1,000 | coupon 1 |
| 002 | RESTAURANT B | B | DAN-DAN NOODLES | MIDDLE | ... | ... | picture 2-1 | ... | CHINESE FOOD | FATTY | ... | 9:30~22:30 | ... | 1,000~1,500 | coupon 2 |
| 003 | RESTAURANT C | B | MABO TOFU | FRONT SIDE | ... | ... | picture 3-1 | ... | CHINESE FOOD | FATTY | ... | 7:00~22:00 | ... | 1,000~1,500 | coupon 3 |
| 004 | RESTAURANT D | C | TEMPURA | MIDDLE | ... | ... | picture 4-1 | ... | JAPANESE FOOD | NON-FATTY | ... | 6:30~23:00 | ... | 2,500~3,000 | coupon 4 |
| 005 | RESTAURANT E | C | SOBA NOODLES | FRONT SIDE | ... | ... | picture 5-1 | ... | JAPANESE FOOD | NON-FATTY | ... | 6:30~22:30 | ... | 1,500~2,000 | coupon 5 |
| ... | ... | ... | ... | ... | ... | ... | ... | ... | ... | ... | ... | ... | ... | ... | ... |
| 111 | SHOP M | A | T-SHIRT | FRONT SIDE | ... | ... | picture 111-1 | ... | CLOTHES | – | ... | 10:00~20:00 | ... | 2,500~3,000 | – |
| 112 | SHOP N | B | JEANS | MIDDLE | ... | ... | picture 112-1 | ... | CLOTHES | – | ... | 10:00~21:00 | ... | 5,000~20,000 | – |
| ... | ... | ... | ... | ... | ... | ... | ... | ... | ... | ... | ... | ... | ... | ... | ... |

FIG. 14

| ID | REFERENCE TEXT (Q) | ANSWER PATTERN | SEARCH OBJECT | SEARCH ITEM | SEARCH WORD |
|---|---|---|---|---|---|
| 00000001 | I want to eat Chinese food. | SCENARIO 1 | SHOP DB | FIELD 1 | CHINESE FOOD |
| 00000002 | Is there any Chinese food restaurant? | SCENARIO 1 | SHOP DB | FIELD 1 | CHINESE FOOD |
| 00000003 | Tell me a good Chinese food restaurant. | SCENARIO 1 | SHOP DB | FIELD 1 | CHINESE FOOD |
| ⋮ | ⋮ | ⋮ | ⋮ | ⋮ | ⋮ |
| 00001001 | I want to eat Japanese food. | SCENARIO 1 | SHOP DB | FIELD 1 | JAPANESE FOOD |
| 00001002 | I want to eat non-fatty food. | SCENARIO 1 | SHOP DB | FIELD 2 | NON-FATTY |
| 00001003 | I want to eat for about 2,000 yen. | SCENARIO 1 | SHOP DB | FIELD n | 2000 |
| ⋮ | ⋮ | ⋮ | ⋮ | ⋮ | ⋮ |
| 00100001 | I want to buy a dress. | SCENARIO 2 | SHOP DB | FIELD 1 | DRESS |
| 00100002 | I want a dress. | SCENARIO 2 | SHOP DB | FIELD 1 | DRESS |
| ⋮ | ⋮ | ⋮ | ⋮ | ⋮ | ⋮ |
| 01000001 | What are the open hours? | SPECIFIC ANSWER1 | SHOP DB | FIELD 10 | - |
| 01000002 | How late is the restaurant open? | SPECIFIC ANSWER2 | SHOP DB | FIELD 10 | - |
| ⋮ | ⋮ | ⋮ | ⋮ | ⋮ | ⋮ |
| 10000001 | What is the recommendation of this restaurant? | SPECIFIC ANSWER10 | SHOP DB | FIELD 15 | - |
| 10000002 | Can I print out the coupon? | SPECIFIC ANSWER11 | COMPLEX | PRINT | COUPON |
| 10000003 | Tell me the availability. | SPECIFIC ANSWER12 | SHOP SERVER | - | - |
| ⋮ | ⋮ | ⋮ | ⋮ | ⋮ | ⋮ |
| 11100001 | Can I stay tonight? | SPECIFIC ANSWER101 | HOTEL SERVER | - | - |
| ⋮ | ⋮ | ⋮ | ⋮ | ⋮ | ⋮ |

FIG. 15

| TEMPLATE ID | ANSWER PATTERN | CONDITIONS OF SELECTION | ANSWER TEMPLATE 1 | ANSWER TEMPLATE 2 | ANSWER TEMPLATE 3 | ... |
|---|---|---|---|---|---|---|
| 0001 | SPECIFIC ANSWER 1 | — | The open hours are <Field 10>. | The restaurant opens <Field 10>, today. | According to our database, the open hours are <Field 10>. | ... |
| ... | ... | ... | ... | ... | ... | ... |
| 0023 | SPECIFIC ANSWER 10 | — | The best recommendation is <Field 15>. | The recommendation of this restaurant is <Field 15>. | We recommend <Field 15>. | ... |
| ... | ... | ... | ... | ... | ... | ... |
| 0058 | SPECIFIC ANSWER 21 | — | <Shop name> is located at <Location>. <MAP> | ... | ... | ... |
| ... | ... | ... | ... | ... | ... | ... |
| 0120 | SPECIFIC ANSWER 101 | — | Sorry, this terminal cannot print out <Search word>. | ... | ... | ... |
| ... | ... | ... | ... | ... | ... | ... |
| 0501 | SCENARIO 1 | n>3 | TemplateS1-1-1 | TemplateS1-1-2 | TemplateS1-1-3 | ... |
| 0502 | SCENARIO 1 | n<3 | TemplateS1-2-1 | TemplateS1-2-2 | TemplateS1-2-3 | ... |
| 0503 | SCENARIO 1 | MORE DETAILS ICON | TemplateS1-3-1 | ... | ... | ... |
| ... | ... | ... | ... | ... | ... | ... |

FIG. 16A (SCENARIO 1) IN CASE OF THREE OR MORE SHOPS

According to our database, there are <Number of hits> restaurants in total.
Here are popular restaurants in recent days. How do you like these restaurants?

<First shop >         <Second shop>         <Third shop>
<First Image_1>       <Second Image_1>      <Third Image_1>

<Icon 1-1: RESERVE>        <Icon 1-2: RESERVE>        <Icon 1-3: RESERVE>
<Icon 2-1: MORE DETAILS>  <Icon 2-2: MORE DETAILS>  <Icon 2-3: MORE DETAILS>
   <Icon 3: MORE SHOPS >

FIG. 16B (SCENARIO 1) IN CASE OF NOT MORE THAN THREE SHOPS

According to our database, there are <Number of hits> restaurants in total.
How do you like these restaurants?

<First shop >         <Second shop>         <Third shop>
   <First Image_1>       <Second Image_1>      <Third Image_1>

<Icon 1-1: RESERVE>        <Icon 1-2: RESERVE>        <Icon 1-3: RESERVE>
<Icon 2-1: MORE DETAILS>  <Icon 2-2: MORE DETAILS>  <Icon 2-3: MORE DETAILS>

FIG. 16C (SCENARIO 1)  IN CASE WHERE MORE DETAILS ICON IS PRESSED

Here are more details of <Shop name>

<Image_1>

| | <MESSAGE FROM SHOP> |
|---|---|
| OPEN HOURS | <Field 10> |
| TEL | <Field 11> |
| URL | <Field 12> |

FIG. 16D (SCENARIO 1)  IN CASE WHERE RESERVE ICON OF UNRECOMMENDED SHOP IS PRESSED (RE-RECOMMENDATION)

Reservation of <Shop Name>? <Shop Name> is popular for <Today's recommendation>.
We have checked the availability, but <Shop name> is full.
Would you like to reserve <Shop name>?

<Icon 1-1: RESERVE>

How about <Recommended shop>? <Recommended shop> is available right now.

<Icon 1-2: RESERVE>

Do you have any questions?

FIG. 16E (SCENARIO 1)  IN CASE WHERE RESERVE ICON IS PRESSED (MAKING RESERVATION)

Enter the visit time and the number of visitors.

Visit time: <Acquisition from shop server>     Number of visitors: <List>

If OK, press <submit: HERE>.

FIG. 16F (SCENARIO 1)  IN CASE WHERE HERE ICON IS PRESSED (RESERVATION COMPLETED)

Reservation of <Shop name> has been completed. <Shop name> is at <Location> in the restaurant area.

< MAP >

<print: PRINT>

FIG. 17

| AVAILABLE SEATS | SHOP |
|---|---|
| 0 | 004, 005, ⋯ |
| 1 ~ 5 | 002, 006, 008, ⋯ |
| 6 ~ | 001, 003, 007, 010, ⋯ |

FIG. 18A

| USER ID | INPUT SENTENCE | HIT REFERENCE TEXT ID |
|---|---|---|
| 001 | I want to eat Chinese food. | 00000001 |
| 002 | Is there any Chinese food restaurant? | 00000002 |
| 003 | Tell me about Chinese food restaurant. | 00000003 |

FIG. 18B

| USER ID | RESERVED DATE | RESERVED TIME | RESERVED SHOP |
|---|---|---|---|
| 001 | 2015/4/1 | 10:00 ~ | 005 |
| 002 | 2015/4/1 | 21:00 ~ | 001 |
| 003 | 2015/4/2 | 12:00 ~ | 002 |
| ⋮ | ⋮ | ⋮ | ⋮ |

FIG. 18C

| SHOP ID | DATE OF RECOMMENDATION | TIME OF RECOMMENDATION |
|---|---|---|
| 001 | 2015/4/1 | 9:15 |
| 002 | 2015/4/1 | 11:20 |
| 003 | 2015/4/1 | 12:30 |

FIG. 31A

C1
I want to eat Chinese food.

C2
According to our database, there are five restaurants in total.
Here are three popular restaurants in recent days. How do you like these restaurants?

| Restaurant A | Restaurant B | Restaurant C | |
|---|---|---|---|
| BASIC PHOTO | BASIC PHOTO | BASIC PHOTO | |
| RESERVE | RESERVE | RESERVE | OTHER RESTAURANTS |
| MORE DETAILS | MORE DETAILS | MORE DETAILS | |

C3
Reservation of Restaurant B? Restaurant B is popular for dandan noodles. We have checked the availability but Restaurant B is full. Would you like to reserve Restaurant B?

RESERVE

How about Restaurant A? Restaurant A is available right now.

RESERVE

Do you have any questions?

C4
What is the recommendation of this restaurant?

C5
Today's recommendation of Restaurant A is jiaozi.
Twice cooked pork is a popular menu.

RESERVE    MORE DETAILS

FIG. 33A

| AGE | SHOP TO BE EXCLUDED |
|---|---|
| 0 ~ 19 | 006 |

FIG. 33B

| SEX | SHOP TO BE EXCLUDED |
|---|---|
| MALE | 011, 012 |
| FEMALE | 013, 014 |

FIG. 33C

| FLOOR | SHOP TO BE EXCLUDED |
|---|---|
| 1ST FLOOR | 001, 002, 003, ⋯ |
| 2ND FLOOR | 011, 012, 013, ⋯ |
| 3RD FLOOR | 041, 042, 043, ⋯ |
| 4TH FLOOR | 071, 072, 073, ⋯ |

FIG. 36

| I want to buy a dress. | C11 |

C12
According to our database, there are two shops in total. How do you like these shops?

| Shop M | Shop N |
| BASIC PHOTO | BASIC PHOTO |
| MORE DETAILS | MORE DETAILS |

C13
Here are more details of Shop N.

| BASIC PHOTO | Shop N proposes casual and playful styles. | |
| | OPEN HOURS | 10:00~16:00 |
| | TEL | 03-XXXX-XXXX |
| | URL | http://www.xxxxxxxx |

By the way, Shop M is having a discount sale of T-shirts today.

| Where is Shop M? | C14 |

C15
Shop M is in the front of the shopping area.

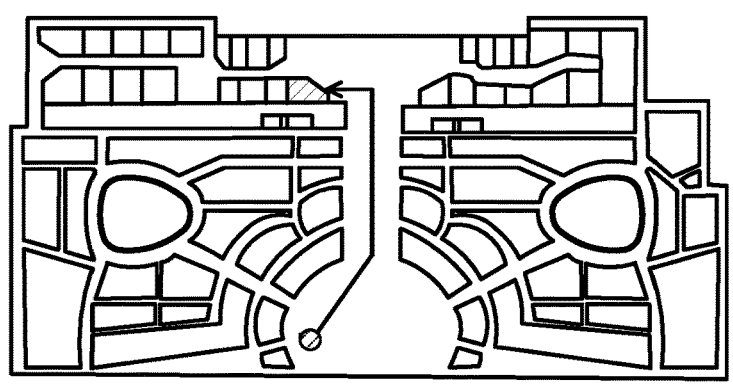

PRINT

C21
Tell me shops I can use a coupon.

C22
Mr. X, your coupon can be used in Restaurant A. You can use three coupons there.

C23
Print out the coupons.

C24
Sorry, this terminal cannot print out coupons. Use a nearby kiosk terminal. Would you like to see the places of kiosk terminals?

FIG. 39

EXTERNAL FACILITY DATABASE

| FACILITY ID | NAME OF FACILITY | PRIORITY LEVEL | SHUTTLE BUS STOP | WALKING TIME TO BUS STOP | TIME TABLE | TRAVEL TIME | REQUIRED TIME | FIELD 1 CATEGORY | ... |
|---|---|---|---|---|---|---|---|---|---|
| 001 | A LAND | A | MAP 1 | 5 MINUTES | TIME TABLE A | 15 MINUTES | 4 - 5 HOURS | THEME PARK | ... |
| 002 | B LAND | B | MAP 1 | 5 MINUTES | TIME TABLE B | 30 MINUTES | 4 - 5 HOURS | THEME PARK | ... |
| ... | ... | ... | ... | ... | ... | ... | ... | ... | ... |
| 009 | Z MUSEUM | C | MAP 2 | 10 MINUTES | TIME TABLE Z | 25 MINUTES | 2 - 3 HOURS | MUSEUM | ... |
| ... | ... | ... | ... | ... | ... | ... | ... | ... | ... |

I want to go to A Land by bus tomorrow.

C32

The shuttle bus to A Land will depart from this bus stop tomorrow.

MAP OF INSIDE OF BUILDING

It takes about 5 minutes from here to the shuttle bus stop.
Then, it takes about 30 minutes to A Land.
Here is the time table of the shuttle bus to A Land.

|    | Weekday         | Weekend and Holiday      |
|----|-----------------|--------------------------|
| 7  | 0, 15, 30, 45   | 0, 10, 20, 30, 40, 50    |
| 8  | 5, 20, 35, 50   | 5, 15, 25, 35, 45, 55    |
| ⋮  | ⋮               | ⋮                        |
| 17 | 0, 30           | 0, 20, 40                |
| 18 | 15, 45          | 5, 25, 45                |

According to the weather report, it will rain tomorrow. You had better take an umbrella with you.

┌─────────────────────────────────────────────────┐
│                                         _ □ ✕  │
├─────────────────────────────────────────────────┤
│ ⊙ [                                          ]  │
│                                                 │
│ ┌─────────────────────────────────────────────┐ │
│ │ CONDITIONAL EXPRESSIONS                     │ │
│ └─────────────────────────────────────────────┘ │
│                                                 │
│  ┌───────────────────────────────────────┐ ⎫   │
│  │ ▼ A                                   │ ⎪   │
│  ├─────┬─────────────────────────────────┤ ⎬ 841│
│  │ No. │              A                  │ ⎪   │
│  ├─────┼─────────────────────────────────┤ ⎪   │
│  │  3  │ According to our database, there│ ⎪   │
│  │     │ are <Number of hits> restaurants│ ⎪   │
│  │     │ in total.                       │ ⎭   │
│  └─────┴─────────────────────────────────┘     │
│  ┌───────────────────────┐                ⎫   │
│  │ BATCH OPERATION ☑     │                ⎪   │
│  ├───────────────────────┤                ⎬ 842│
│  │ EDIT                  │                ⎪   │
│  ├───────────────────────┤                ⎪   │
│  │ DELETE                │                ⎭   │
│  └───────────────────────┘                     │
│                                                 │
│  ┌─────┬───────────────────────────┬────────┐ ⎫│
│  │  ☑  │  CONDITIONAL EXPRESSION   │ APPLY  │ ⎬843
│  ├─────┼───────────────────────────┼────────┤ ⎪│
│  │  ☑  │  n>3                      │(APPLY) │ ⎭│
│  └─────┴───────────────────────────┴────────┘  │
│                            844 ─┐              │
│                             ┌───┴──────────┐   │
│                             │ ⊞   ADD      │   │
│                             └──────────────┘   │
│                                                 │
│  ┌─────┬───────────────────────────┬────────┐ ⎫│
│  │  ☑  │         ATTRIBUTE         │ APPLY  │ ⎬846
│  ├─────┼───────────────────────────┼────────┤ ⎪│
│  │  ☑  │  Field 10 = Chinese food  │(APPLY) │ ⎭│
│  └─────┴───────────────────────────┴────────┘  │
│                            847 ─┐              │
│                             ┌───┴──────────┐   │
│                             │ ⊞   ADD      │   │
│                             └──────────────┘   │
│                        ┌──────────┐            │
│                        │  SAVE    │            │
│                        └────┬─────┘            │
│                             845                │
└─────────────────────────────────────────────────┘
```

FIG. 45

WEIGHT DETERMINATION TABLE

| DISCOUNT SALE PERIOD | SHOPS |
|---|---|
| 7/1 ~ 7/31 | 001, 002, 003, ⋯ |
| 9/20 ~ 9/27 | 001, 005, ⋯ |
| 12/28 ~ 1/5 | 007, 008, ⋯ | ns# COMMERCIAL INFORMATION PROVIDING SYSTEM AND COMMERCIAL INFORMATION PROVIDING METHOD

CROSS-REFERENCE TO RELATED APPLICATIONS

This application claims the benefit of Japanese Patent Application No. 2015-185650 filed Sep. 18, 2015, which is incorporated herein by reference in its entirety.

TECHNICAL FIELD

The present invention relates to a commercial information providing system and a commercial information providing method.

BACKGROUND ART

Shopping malls include diverse shops and facilities; accordingly, a shopping mall may be equipped with guidance information providing apparatuses to direct users to their intended shops or facilities.

Such a guidance information providing apparatus refers to the layout information of the facilities based on the purpose of the visit and the personal attribute of a user, determines the place (an example of commercial information) where to direct the user, and provides guidance information on the place (an example of response information) to the user (refer to Japanese Patent Application Publication No. 2014-178170).

E-commerce sites where users buy merchandises also provide guidance information to users. In response to a user operation of putting some item into a cart on a terminal device like a cell phone, the server of the E-commerce site may provide guidance information (an example of recommendation information) on the screen of the terminal device, informing the user of other items purchased by other users together with the item in the cart or other items of the same type as the item in the cart.

Furthermore, there exists a known recommendation sales method for diversified commodities. The method uses recommendation message data about the diversified commodities created by recommenders as guidance information to direct the user to find commodities matching the user's personal preference (refer to Japanese Patent Application Publication No. 2003-157375).

Still further, there exists a known technique that associates and displays information on the user's purchase records in the past, which is not guidance information though, to provide useful information for the user to do shopping (refer to Japanese Patent Application Publication No. 2004-535015).

SUMMARY OF INVENTION

Technical Problem

The foregoing Japanese Patent Application Publication No. 2014-178170 is however to extract guidance information presumed to be more helpful for a user from prepared information in response to a discretionary operation by the user, or based on the purpose of visit specified by the user and the personal attribute, and to provide the extracted guidance information.

In similar, the foregoing Japanese Patent Application Publication No. 2003-157375 and Japanese Patent Application Publication No. 2004-535015 are also to show other merchandises in view of the relationship with the merchandise put into the cart or to provide recommendation information based on the purchase records in the past in response to a discretionary operation by the user; they focus on providing guidance information matching only the user's preference.

The present invention is accomplished in view of the foregoing issues; an object of the present invention is to provide a novel commercial information providing system that provides commercial information by extracting information from a database based on not only the inputs from the user.

For example, the present invention is applicable to facilities gathering people, such as a hotel, an airport, and a station; commercial facilities provided in the vicinity of these facilities, such as a department store and an shopping center inclusive of an outlet mall; amusement facilities such as a casino; and a commercial complex including a plurality of facilities such as restaurants and movie theaters in addition to the foregoing commercial facilities and the amusement facilities.

It should be noted that the objects, challenges, and effects (benefits) of the present invention are to be understood from the appended claims and not to be interpreted improperly based on the following description.

Solution to Problem

According to the first aspect of the present invention, a commercial information providing system includes:

a user interface capable of accepting input of question information representing a question from a user, a database holding a plurality of sets of commercial information related to commercial facilities and a plurality of response templates of responses to question information input from the user interface, an administrator interface capable of accepting setting of a priority level to prioritize providing a specific set of commercial information among the plurality of sets of commercial information, a control device connectable to the database and configured to perform processing of extracting a set of commercial information to be provided from the plurality of sets of commercial information and a response template to be used from the plurality of response templates based on the question information input from the user interface and creating response information using the response template, the response information including a set of commercial information selected from the extracted the set of commercial information based on the priority level, and an information providing device configured to provide the response information created by the control device to the user.

The foregoing is a novel configuration that extracts commercial information to be provided to the user from a database based on the priority levels assigned by the administrator in addition to the question information from the user. This configuration facilitates providing commercial information intended by the administrator to the user.

According to this configuration, commercial information is extracted based on question information from the user; specific commercial information is selected from the extracted commercial information based on the priority levels assigned by the administrator; and response information including the selected commercial information is provided to the user. That is to say, commercial information intended by the administrator in the commercial information suitable for the response to the question information from the user can be provided to the user.

Since this configuration provides the commercial information intended by the administrator to the user in the form of answering the user's question, the user is naturally directed to a desired action.

This commercial information providing system further includes a terminal device installed in the commercial facilities and connected with the control device to be able to communicate with the control device, and the terminal device includes the user interface.

The foregoing configuration enables input of question information through the user interface of a terminal device installed in the commercial facilities. That is to say, if an issue such as something the user wants to know or some trouble arises to the user when the user is in the commercial facilities, the system can accept question information from the user.

This configuration enables the system to answer the question information from a user in the commercial facilities and provide commercial information intended by the administrator to the user; the user can be provided with a solution and further be directed to a desired action.

In this commercial information providing system, the control device is configured to change the priority level in accordance with a weight assigned depending on predetermined information different from the question information input from the user interface.

The foregoing configuration changes the priority level in accordance with a weight assigned depending on predetermined information different from the question information input from the user interface.

The predetermined information may be personal information such as member information, facility information such as information on equipment in the facilities or a floor map, vacancy information indicating the real-time vacancy rate (occupancy rate) on each set of commercial information, external environment information and internal environment information such as event information in which the start time is linked with a clock function, and different kinds of history information.

According to this configuration, the priority level is changed in view of the predetermined information as well as the question information input by the user, so that the user can be provided with commercial information timely and more appropriate for the user's question.

In this commercial information providing system, the response information created by the control device includes action request information for encouraging the user to react to the commercial information included in the response information.

The action request information may include a RESERVE icon to reserve a shop related to a set of commercial information and a RESERVE icon to reserve a hotel room related to a set of commercial information.

Accordingly, the action request information encourages the user's next action; the user can be pertinently directed to a desired action.

In this commercial information providing system,
the user interface is configured to accept input of use request information for requesting to use a set of commercial information included in the response information provided by the information providing device;
the control device is configured to create guidance information for contributing to use of the set of commercial information designated by the use request information in response to input of the use request information from the user interface; and
the information providing device is configured to provide the guidance information created by the control device to the user.

The foregoing configuration provides guidance information for contributing to use of a set of commercial information in response to input of a use request information for requesting to use the set of commercial information.

The guidance information may be a map showing a route from the current position to a destination (e.g., a shop, a room, or a rest room) or information on a shop such as the telephone number, the open hours, the shop holiday, the menu, a coupon, the chefs name, an appeal point, a layout, and a photo.

This configuration enables the user to use the commercial information more conveniently.

According to the second aspect of the present invention, a commercial information providing system of the present invention includes:
a database including a plurality of sets of commercial information stored in advance,
a control device connectable to the database and configured to create recommendation information with a set of commercial information extracted from the plurality of sets of commercial information,
a user interface capable of accepting input of information,
an administrator interface capable of accepting input of information, and
an information providing device configured to provide the recommendation information to a user.

The control device is configured to perform first extraction processing based on user request information input from the user interface to extract specific sets of commercial information from the plurality of sets of commercial information, perform second extraction processing based on filtering information input from the administrator interface in advance to extract a set of commercial information from the specific sets of commercial information extracted by the first extraction processing, and create recommendation information including the set of commercial information extracted by the second extraction processing.

The foregoing is a novel configuration that extracts commercial information to be provided to a user based on filtering information set by the administrator in addition to user request information from the user.

This configuration facilitates providing commercial information intended by the administrator to the user.

According to this configuration, commercial information is extracted by the first extraction processing based on user request information from the user and further, commercial information is extracted by the second extraction processing based on the filtering information set by the administrator. Recommendation information including the extracted commercial information is provided to the user. That is to say, commercial information the administrator intends to provide to the user in the commercial information suitable for the response to the question information from the user is provided to the user.

Since this configuration provides the commercial information intended by the administrator to the user in the form of answering the user's request, the user is naturally directed to a desired action.

In this commercial information providing system, the control device is configured to add a message for suggesting the set of commercial information extracted by the second extraction processing and requesting the user to take the set of commercial information into consideration.

The foregoing configuration adds a message for suggesting a set of commercial information and requesting the user to take the set of commercial information into consideration.

For a message for suggesting a set of commercial information and requesting to take it into consideration, expressions asking the state, situation, impression, opinion, or intension can be employed. For example, "How about Restaurant A?" or "How about Room A?" is included.

This configuration provides a message suggesting specific commercial information and asking for a reaction. This means the user is directed by the administrator; however, the final decision is left to the user. As a result, the user can have good impression by feeling that the user has selected the information by himself or herself. The user can be directed to the desired action more naturally.

In the third aspect of the present invention, a commercial information providing system of the present invention includes:

a database including a plurality of sets of commercial information stored in advance, a control device connectable to the database and configured to create recommendation information with a set of commercial information extracted from the plurality of sets of commercial information, a user interface capable of accepting input of information, an administrator interface capable of accepting input of information, and a display device capable of displaying the recommendation information.

The control device is configured to perform first extraction processing based on user request information input from the user interface to extract specific sets of commercial information from the plurality of sets of commercial information, perform second extraction processing based on filtering information for determining order of displaying commercial information input in advance from the administrator interface to extract a set of commercial information from the specific sets of commercial information extracted by the first extraction processing, and create recommendation information including the set of commercial information sorted and extracted by the second extraction processing in accordance with the filtering information for determining the order.

The foregoing is a novel configuration that extracts commercial information to be provided to the user based on the filtering information set by the administrator in addition to the user request information from the user.

This configuration facilitates providing commercial information intended by the administrator to the user.

According to this configuration, commercial information is extracted by the first extraction processing based on user request information from the user and further, commercial information is extracted by the second extraction processing based on the filtering information set by the administrator. Recommendation information including the extracted commercial information is provided to the user. That is to say, commercial information the administrator intends to provide to the user in the commercial information suitable for the response to the question information from the user is provided to the user.

Since this configuration provides the commercial information intended by the administrator to the user in the form of answering the user's request, the user is naturally directed to a desired action.

Furthermore, since this configuration displays the commercial information in accordance with the order specified by the administrator, the user is directed to paying attention to the commercial information intended by the administrator.

According to the fourth aspect of the present invention, a commercial information providing method of the present invention is for a commercial information providing system including a user interface capable of accepting input of question information representing a question from a user, a database holding a plurality of sets of commercial information related to commercial facilities and a plurality of response templates of responses to question information input from the user interface, an administrator interface capable of accepting setting of a priority level to prioritize providing a specific set of commercial information among the plurality of sets of commercial information, a control device, and an information providing device. The commercial information providing method includes:

a control step of: connecting, by the control device, to the database; extracting, by the control device, a set of commercial information to be provided from the plurality of sets of commercial information and a response template to be used from the plurality of response templates based on the question information input from the user interface; and creating, by the control device, response information using the response template, the response information including a set of commercial information selected based on the priority level from the extracted a set of commercial information, and an information providing step of providing, by the information providing device, the response information created by the control device to the user.

According to the fifth aspect of the present invention, a commercial information providing method of the present invention is for a commercial information providing system including a database including a plurality of sets of commercial information stored in advance, a control device connectable to the database and configured to create recommendation information with a set of commercial information extracted from the plurality of sets of commercial information, a user interface capable of accepting input of information, an administrator interface capable of accepting input of information, and an information providing device configured to provide the recommendation information to a user. The commercial information providing method includes:

a first extraction step of extracting, by the control device, specific sets of commercial information from the plurality of sets of commercial information based on user request information received through the user interface, a second extraction step of extracting, by the control device, a set of commercial information from the specific sets of commercial information extracted by the first extraction step, based on filtering information input from the administrator interface in advance, and a creation step of creating, by the control device, recommendation information including the set of commercial information extracted by the second extraction processing.

According to the sixth aspect of the present invention, a commercial information providing method of the present invention is for a commercial information providing system including a database including a plurality of sets of commercial information stored in advance, a control device connectable to the database and configured to create recommendation information with a set of commercial information extracted from the plurality of sets of commercial information, a user interface capable of accepting input of information, an administrator interface capable of accepting input of information, and a display device capable of displaying the recommendation information. The commercial information providing method includes:

a first extraction step of extracting, by the control device, specific sets of commercial information from the plurality of sets of commercial information, based on user request information input from the user interface, a second extraction step of extracting, by the control device, a set of commercial information from the specific sets of commercial information extracted by the first extraction processing, based on filtering information for determining order of displaying the plurality of sets of commercial information input in advance from the administrator interface, and a creation step of creating, by the control device, recommendation information including the set of commercial information sorted and extracted by the second extraction processing in accordance with the filtering information for determining the order.

Advantageous Effects of Invention

The present invention enables a user to be provided with commercial information intended by the administrator in the commercial information suitable for a response to the user.

BRIEF DESCRIPTION OF DRAWINGS

FIG. 12 is a diagram for illustrating an example of shop data;

FIG. 14 is a diagram for illustrating an example of knowledge data;

FIG. 15 is a diagram for illustrating examples of answer templates;

FIG. 16A is a diagram for illustrating an example of an answer template;

FIG. 16B is a diagram for illustrating an example of an answer template;

FIG. 16C is a diagram for illustrating an example of an answer template;

FIG. 16D is a diagram for illustrating an example of an answer template;

FIG. 16E is a diagram for illustrating an example of an answer template;

FIG. 16F is a diagram for illustrating an example of an answer template;

FIG. 17 is a diagram for illustrating an example of a weight determination table;

FIG. 18A is a diagram for illustrating an example of an input history table;

FIG. 18B is a diagram for illustrating an example of a reservation history table;

FIG. 18C is a diagram for illustrating an example of a recommendation history table;

FIG. 31A is a diagram for illustrating an example of a dialogue;

FIG. 33A is a diagram for illustrating an example of an unrecommended shop exclusion determination table;

FIG. 33B is a diagram for illustrating an example of an unrecommended shop exclusion determination table;

FIG. 33C is a diagram for illustrating an example of an unrecommended shop exclusion determination table;

FIG. 36 is a diagram for illustrating an example of a dialogue;

FIG. 39 is a diagram for illustrating an example of external facility data;

FIG. 40 is a diagram for illustrating an example of a dialogue;

FIG. 44 is a diagram for illustrating an example of a custom configuration screen; and FIG. 45 is a diagram for illustrating an example of a weight determination table.

DESCRIPTION OF EMBODIMENTS

First Embodiment

The first embodiment of the present invention is described based on the drawings.
[Overview of Commercial Information Providing System]

Figure 1:
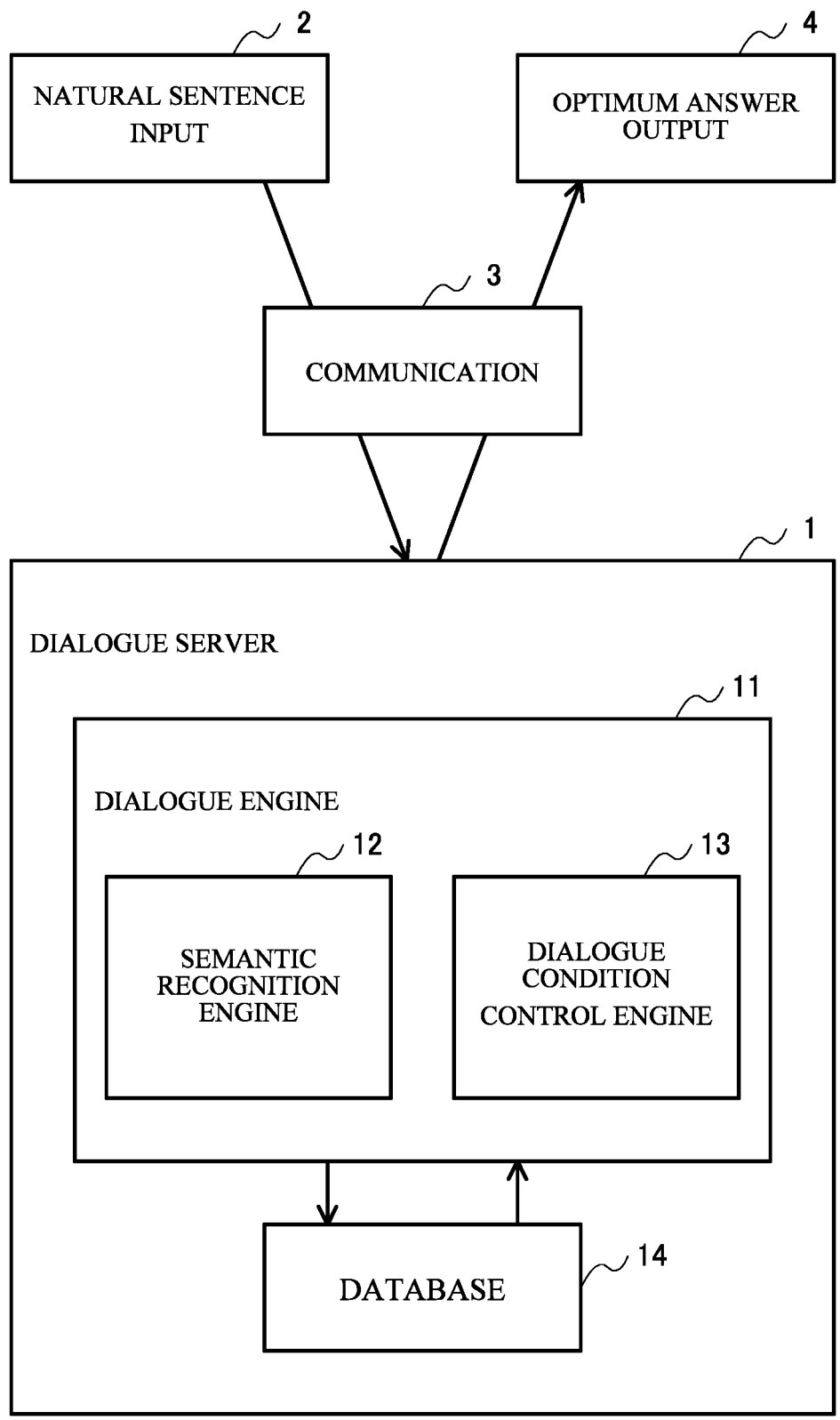
FIG. 1 is a diagram for illustrating an overview of a commercial information providing system.

An overview of a commercial information providing system (a system capable of providing commercial information) of the present embodiment is described using an example of a dialogue server 1 shown in FIG. 1.

The dialogue server 1 includes a dialogue engine 11 and a database (DB) 14. The dialogue engine 11 includes a semantic recognition engine 12 and a dialogue condition control engine 13.

In this commercial information providing system, a communication 3 is made based on a natural sentence input 2 to forward the natural sentence input 2 to the dialogue server 1. In the dialogue server 1, the semantic recognition engine 12 semantically interprets the natural sentence input 2 based on the DB 14 to recognize the meaning (intention) of the natural sentence input 2. The dialogue condition control engine 13 creates an optimum answer output 4 for the natural sentence input 2 based on the DB 14 so as to produce a natural dialogue and sends the optimum answer output 4 through the communication 3.

This commercial information providing system is applicable to various commercial facilities.

For example, in response to a natural sentence input 2 "My name is . . . I have a reservation." to check in accommodation facilities such as a hotel, the semantic recognition engine 12 interprets the natural sentence input and then the dialogue condition control engine 13 references a variety of information (personal information such as member information, facility information such as information on equipment in the facilities and a floor map, external and internal environment information on booking, event, and date and time, various kinds of history information, the intention of the guest, and the intention of the facilities) and creates and outputs an optimum answer output 4 "Welcome to our hotel. This is your room".

In response to another natural sentence input 2 "Do you have any room available?", the dialogue condition control engine 13 creates an optimum answer output 4 "Welcome to our hotel. How do you like this room?" with reference to a variety of information and outputs the optimum answer output 4. If a natural sentence input 2 "It is OK." is entered in response to this answer output, the dialogue condition control engine 13 creates and outputs an optimum answer output 4 "Thank you. The room charge is . . . Insert your credit card".

For another example at an facility information desk, in response to a natural sentence input 2 "I want to eat Japanese food.", the dialogue condition control engine 13 creates an optimum answer output 4 "This is a Japanese food restaurant." with reference to a variety of information and outputs the optimum answer output 4.

For still another example, in response to a natural sentence input 2 "Are there any good sightseeing spots around here?", the dialogue condition control engine 13 creates an optimum answer output 4 "Here is a sightseeing map around here. We recommend the museum." with reference to a variety of information and outputs the optimum answer output 4.

In response to a natural sentence input 2 "Tell me the bus schedule.", the dialogue condition control engine 13 creates an optimum answer output 4 "Here is the time table of the shuttle bus. The bus will leave in fifteen minutes." with reference to a variety of information and outputs the optimum answer output 4.

In creating an optimum answer, the dialogue condition control engine 13 can change the restaurant to be answered in view of the status of the user or include a restaurant (recommended shop) to be recommended in view of the circumstances of the hotel.

For example, if identifying the status of the user as middle class, the dialogue condition control engine 13 takes account of the status of the user in creating an optimum answer output 4 "How do you like this room?" to a natural sentence input 2 "Is there any room available?". In this case, the room presented to the user will be a higher-class room affordable by the user.

For another example, if identifying the user as middle class and regular customer, the dialogue condition control engine 13 creates and outputs, in response to a natural sentence input 2 "Is there any room available?", an optimum answer output 4 "Thank you for always using our hotel. We offer you a discount on this superior room. How do you like it?" in view of the status of the user and the history of use of the hotel.

For still another example, if detecting a previous trouble, the dialogue condition control engine 13 creates and outputs, in response to a natural sentence input 2 "Is there any room available?", an optimum answer output 4 "We are sorry but the rooms are fully booked." in view of the history of use of the hotel.

For still another example, if having information on a food (a menu including the food) to be ordered because of the circumstances of the hotel, the dialogue condition control engine 13 may create and output, in response to a natural sentence input 2 "Do you have a recommendation for Japanese food restaurant?", an optimum answer output 4 "Restaurant R has a good reputation." in view of a variety of information. In this case, Restaurant R is a restaurant serving a menu including the particular food.

If the semantic recognition engine 12 cannot understand the meaning of a natural sentence input 2 or if the dialogue condition control engine 13 cannot create an optimum answer output 4, the dialogue server 1 may change the responder to a staff. For example, in response to a natural sentence input 2 "I want to talk with somebody.", the dialogue condition control engine 13 creates and outputs an optimum answer output 4 "A staff will come soon to help you".

As described above, the commercial information providing system changes a guidance of one-way information into two-way communication. The commercial information providing system can accept a free-style input (ambivalent expressions) and provide a free-style output (a response in view of the circumstances of the user and the administrator) like conversation between people.

Unlike an existing information board, the commercial information providing system eliminates inconveniences such as narrowing down the answers by starting from a menu selection. Furthermore, the commercial information providing system can include the intention of the information provider (a recommendation of the administrator) in an answer that meets the user's question and matches the user's conditions to satisfy the user's request, so that the user can be naturally directed to an action intended by the administrator.

Figure 2:
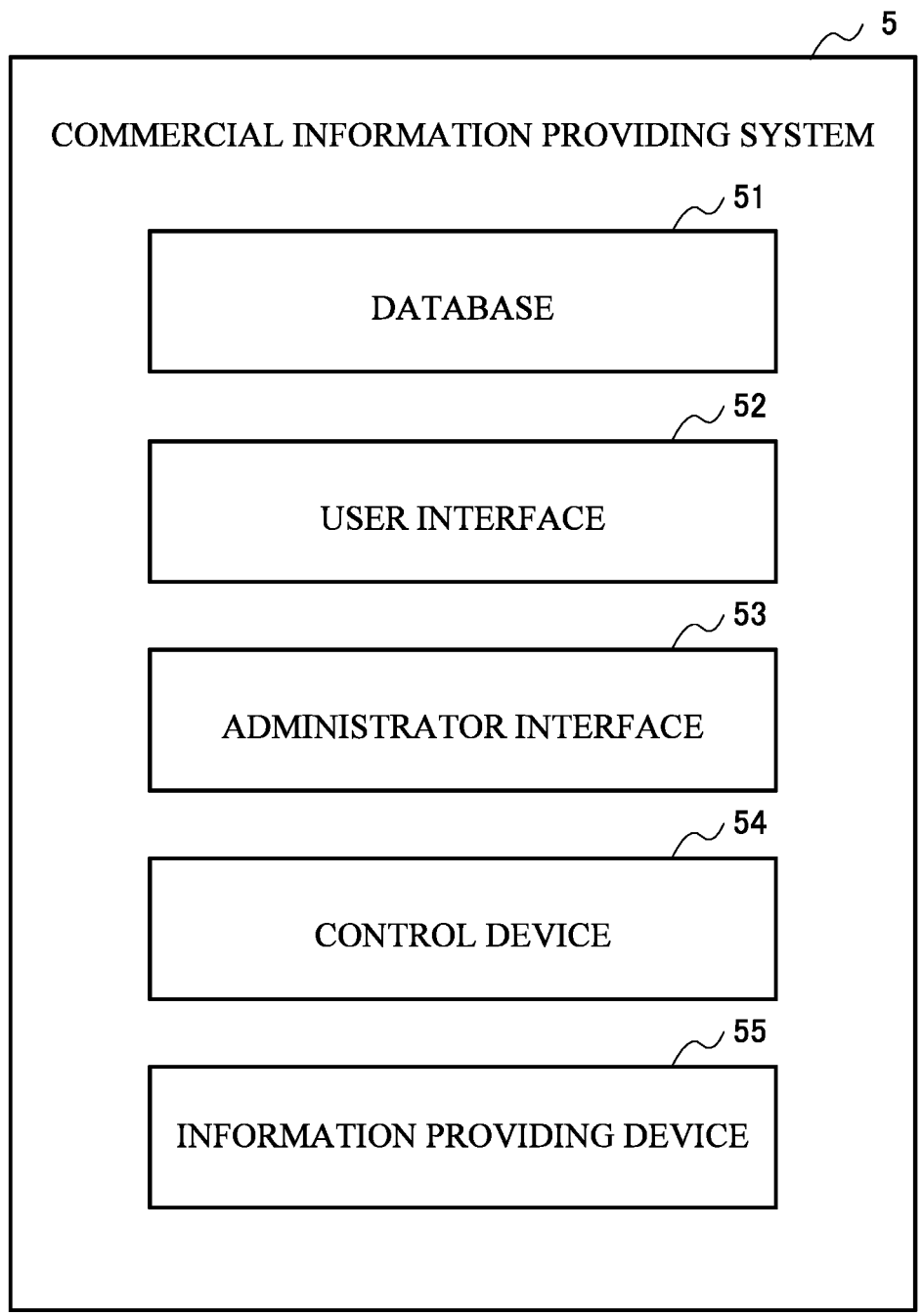
FIG. 2 is a diagram for illustrating an example of a commercial information providing system.

FIG. 2 is a diagram for illustrating an example (a commercial information providing system 5) of a commercial information providing system.

The commercial information providing system 5 includes a database 51, a user interface 52, an administrator interface 53, a control device 54, and an information providing device 55. The database 51, the administrator interface 53, and the control device 54 may be included in a single server (an example of an information processing apparatus); any two of these may be included in a single server and the remaining one is included in a different server; or all of these may be included in separate servers. The user interface 52 and the information providing device 55 may be included in a single user terminal (an example of an information processing apparatus) or in separate user terminals.

The database 51 is a storage unit and represents aggregation of data created and managed in a specific format. The database 51 stores various kinds of data related to commercial information.

For example, the database 51 is included in a dialogue server (an example of a commercial information processing apparatus).

The present embodiment is not limited in the structure or scheme (a specific data model) to store or manage the data. For the database 51, various data models such as a hierarchical model, a network model, and a relational model can be employed as appropriate.

The user interface 52 is an input unit and is an interface capable of accepting an input based on a user operation (an action by the user). A physical button, a physical keyboard, a mouse, an icon displayed on a liquid crystal touch panel, a microphone, and the like function as the user interface 52.

For example, the user interface 52 is included in a user terminal (an example of an information processing apparatus).

The administrator interface 53 is an input unit and is an interface capable of accepting an input based on an administrator operation (an action by the administrator). A physical button, a physical keyboard, a mouse, an icon displayed on a liquid crystal touch panel, and the like function as the administrator interface 53.

For example, the administrator interface 53 is included in a dialogue server.

The control device 54 is a control unit and perform a variety of control related to dialogues.

A CPU (Central Processing Unit), an MCU (Micro-Control Unit), a motherboard, and the like function as the control device 54.

For example, the control device 54 is included in a dialogue server.

The information providing device 55 is an information providing unit and is capable of providing a variety of information such as text, still image, motion picture, audio, and the like.

A cathode-ray tube display, a liquid crystal display, a plasma display, an organic EL display, a video projector, a speaker, and the like function as the information providing device 55.

For example, the information providing device 55 is included in a user terminal.

Hereinafter, the configuration of the commercial information providing system 5 is described from various aspects.

[Mode 1-1]

A commercial information providing system 5 in Mode 1-1 includes a user interface 52 (cf. a user terminal described later) capable of accepting input of question information (cf. an input sentence and input information described later) representing a question from a user, a database 51 (cf. a shop database, an external facility database, an answer template database described later) holding a plurality of sets of commercial information (e.g., a shop name and a photo of a shop, cf. shop data and external facility data described later) related to commercial facilities and a plurality of response templates (e.g., "Shop X meets your requests. We recommend this shop. How do you like?", "How about Shop X? This shop is currently available and you can make a reservation.", and "How do you like this room?", cf. answer templates described later) of responses to question information input from the user interface 52, an administrator interface 53 (cf. a new shop data addition screen described later) capable of accepting setting of a priority level (cf. priority levels described later) to prioritize providing a specific set of commercial information among the plurality of sets of commercial information, a control device 54 (cf. a dialogue server described later) connectable to the database 51 and configured to perform processing of extracting at least one set of commercial information to be provided from the plurality of sets of commercial information and a response template to be used from the plurality of response templates based on the question information input from the user interface 52 (cf. semantic recognition processing and first filtering processing described later) and creating response information using the response template, the response information including a set of commercial information selected from the extracted at least one set of commercial information (cf. second filtering processing described later) based on the priority level, and an information providing device 55 (cf. a user terminal described later) configured to provide the response information (cf. response data described later) created by the control device 54 to the user.

The foregoing is a novel configuration that extracts commercial information to be provided to the user from a database based on the priority levels assigned by the administrator in addition to the question information from the user.

This configuration facilitates providing commercial information intended by the administrator to the user.

According to this configuration, commercial information is extracted based on question information from the user; specific commercial information is selected from the extracted commercial information based on the priority levels assigned by the administrator; and response information including the selected commercial information is provided to the user. That is to say, commercial information intended by the administrator in the commercial information suitable for the response to the question information from the user can be provided to the user.

Since this configuration provides the commercial information intended by the administrator to the user in the form of answering the user's question, the user is naturally directed to a desired action.

[Mode 1-2]

The commercial information providing system 5 in Mode 1-2 includes a terminal device (cf. a user terminal described later) installed in the commercial facilities and connected with the control device 54 to be able to communicate with the control device 54 and the terminal includes the user interface 52.

The foregoing configuration enables input of question information through the user interface 52 of a terminal device installed in the commercial facilities. That is to say, if an issue such as something the user wants to know or some trouble arises to the user when the user is in the commercial facilities, the system can accept question information from the user.

This configuration enables the system to answer the question information from a user in the commercial facilities and provide commercial information intended by the administrator to the user; the user can be provided with a solution and further be directed to a desired action.

[Mode 1-3]

In the commercial information providing system 5 in Mode 1-3, the control device 54 is configured to change the priority level in accordance with a weight assigned depending on predetermined information different from the question information input from the user interface 52 (cf. second filtering processing and recommendation optimization processing described later).

The foregoing configuration changes the priority level in accordance with a weight assigned depending on predetermined information different from the question information input from the user interface 52.

The predetermined information may be personal information such as member information, facility information such as information on equipment in the facilities or a floor map, vacancy information indicating the real-time vacancy rate (occupancy rate) on each set of commercial information, external environment information and internal environment information such as event information in which the start time is linked with a clock function, and different kinds of history information.

According to this configuration, the priority level is changed in view of the predetermined information as well as the question information input by the user, so that the user can be provided with commercial information timely and more appropriate for the user's question.

[Mode 1-4]

In the commercial information providing system 5 in Mode 1-4, the response information created by the control device 54 includes action request information (cf. a RESERVE icon described later) for encouraging the user to react to the commercial information included in the response information.

The action request information may include a RESERVE icon to reserve a shop related to a set of commercial information and a RESERVE icon to reserve a hotel room related to a set of commercial information.

Accordingly, the action request information encourages the user's next action; the user can be pertinently directed to a desired action.

[Mode 1-5]

In the commercial information providing system 5 in Mode 1-5, the user interface 52 is configured to accept input of use request information (cf. an input following a press of a RESERVE icon and an input with a HERE icon described later) for requesting to use a set of commercial information included in the response information provided by the information providing device 55; the control device 54 is configured to create guidance information (cf. an example of a dialogue described later) for contributing to use of the set of commercial information designated by the use request information in response to input of the use request information from the user interface 52; and the information providing device 55 is configured to provide the guidance information created by the control device 54 to the user.

The foregoing configuration provides guidance information for contributing to use of a set of commercial information in response to input of a use request information for requesting to use the set of commercial information.

The guidance information may be a map showing a route from the current position to a destination (e.g., a shop, a room, or a rest room) or information on a shop such as the telephone number, the open hours, the shop holiday, the menu, a coupon, the chefs name, an appeal point, a layout, and a photo.

This configuration enables the user to use the commercial information more conveniently.

[Mode 2-1]

A commercial information providing system 5 in Mode 2-1 includes a database 51 including a plurality of sets of commercial information stored in advance, a control device 54 connectable to the database 51 and configured to create recommendation information (equivalent to the response information, cf. output information described later) with a set of commercial information extracted from the plurality of sets of commercial information, a user interface 52 capable of accepting input of information, an administrator interface 53 capable of accepting input of information, and an information providing device 55 configured to provide the recommendation information to a user. The control device 54 is configured to perform first extraction processing (cf. first filtering processing described later) based on user request information (equivalent to the question information, cf. an input sentence and input information described later) input from the user interface 52 to extract specific sets of commercial information from the plurality of sets of commercial information, perform second extraction processing (cf. second filtering processing described later) based on filtering information (equivalent to priority levels and weights) input from the administrator interface 53 in advance to extract a set of commercial information from the specific sets of commercial information extracted by the first extraction processing, and create recommendation information including the set of commercial information extracted by the second extraction processing.

The foregoing is a novel configuration that extracts commercial information to be provided to a user based on filtering information set by the administrator in addition to user request information from the user.

This configuration facilitates providing commercial information intended by the administrator to the user.

According to this configuration, commercial information is extracted by the first extraction processing based on user request information from the user and further, commercial information is extracted by the second extraction processing based on the filtering information set by the administrator. Recommendation information including the extracted commercial information is provided to the user. That is to say, commercial information the administrator intends to provide to the user in the commercial information suitable for the response to the question information from the user is provided to the user.

Since this configuration provides the commercial information intended by the administrator to the user in the form of answering the user's request, the user is naturally directed to a desired action.

[Mode 2-2]

In the commercial information providing system 5 in Mode 2-2, the control device 54 is configured to add a message for suggesting the set of commercial information extracted by the second extraction processing and requesting the user to take the set of commercial information into consideration.

The foregoing configuration adds a message for suggesting a set of commercial information and requesting the user to take the set of commercial information into consideration.

For a message for suggesting a set of commercial information and requesting to take it into consideration, expressions asking the state, situation, impression, opinion, or intension can be employed. For example, "How about Restaurant A?" or "How about Room A?" is included.

This configuration provides a message suggesting specific commercial information and asking for a reaction. This means the user is directed by the administrator; however, the final decision is left to the user. As a result, the user can have good impression by feeling that the user has selected the information by himself or herself. The user can be directed to the desired action more naturally.

[Mode 3-1]

A commercial information providing system 5 in Mode 3-1 includes a database 51 including a plurality of sets of commercial information stored in advance, a control device 54 connectable to the database 51 and configured to create recommendation information with a set of commercial information extracted from the plurality of sets of commercial information, a user interface 52 capable of accepting input of information, an administrator interface 53 capable of accepting input of information, and a display device (an example of an information providing device 55) capable of displaying the recommendation information. The control device 54 is configured to perform first extraction processing (cf. first filtering processing described later) based on user request information input from the user interface 52 to extract specific sets of commercial information from the plurality of sets of commercial information, perform second extraction processing (cf. second filtering processing described later) based on filtering information (equivalent to priority levels and weights) for determining order of displaying commercial information input in advance from the administrator interface 53 to extract at least one set of commercial information from the specific sets of commercial information extracted by the first extraction processing, and create recommendation information including the at least one set of commercial information sorted and extracted by the second extraction processing in accordance with the filtering information for determining the order.

The foregoing is a novel configuration that extracts commercial information to be provided to the user based on the filtering information set by the administrator in addition to the user request information from the user.

This configuration facilitates providing commercial information intended by the administrator to the user.

According to this configuration, commercial information is extracted by the first extraction processing based on user request information from the user and further, commercial information is extracted by the second extraction processing based on the filtering information set by the administrator. Recommendation information including the extracted commercial information is provided to the user. That is to say, commercial information the administrator intends to provide to the user in the commercial information suitable for the response to the question information from the user is provided to the user.

Since this configuration provides the commercial information intended by the administrator to the user in the form of answering the user's request, the user is naturally directed to a desired action.

Furthermore, since this configuration displays the commercial information in accordance with the order specified by the administrator, the user is directed to paying attention to the commercial information intended by the administrator.

[Mode 4-1]

A commercial information providing method in Mode 4-1 is for a commercial information providing system 5 including a user interface 52 capable of accepting input of question information representing a question from a user, a database 51 holding a plurality of sets of commercial information related to commercial facilities and a plurality of response templates of responses to question information input from the user interface 52, an administrator interface 53 capable of accepting setting of a priority level to prioritize providing a specific set of commercial information among the plurality of sets of commercial information, a control device 54, and an information providing device 55. The commercial information providing method includes a control step (cf. SQ18 described later) of connecting, by the control device 54, to the database 51; extracting, by the control device 54, at least one set of commercial information to be provided from the plurality of sets of commercial information and a response template to be used from the plurality of response templates based on the question information input from the user interface 52; and creating, by the control device 54, response information using the response template, the response information including a set of commercial information selected based on the priority level from the extracted at least one set of commercial information, and an information providing step (cf. SQ20 described later) of providing, by the information providing device 55, the response information created by the control device to the user.

[Mode 5-1]

A commercial information providing method in Mode 5-1 is for a commercial information providing system 5 including a database 51 including a plurality of sets of commercial information stored in advance, a control device 54 connectable to the database 51 and configured to create recommendation information with a set of commercial information extracted from the plurality of sets of commercial information, a user interface 52 capable of accepting input of information, an administrator interface 53 capable of accepting input of information, and an information providing device 55 configured to provide the recommendation information to a user. The commercial information providing method includes a first extraction step (cf. first filtering processing described later) of extracting, by the control device 54, specific sets of commercial information from the plurality of sets of commercial information based on user request information input from the user interface 52, a second extraction step (cf. second filtering processing described later) of extracting, by the control device 54, a set of commercial information from the specific sets of commercial information extracted by the first extraction step based on filtering information input from the administrator interface 53 in advance, and a creation step (cf. response data creation processing described later) of creating, by the control device 54, recommendation information including the set of commercial information extracted by the second extraction processing.

[Mode 6-1]

A commercial information providing method in Mode 6-1 is for a commercial information providing system 5 including a database 51 including a plurality of sets of commercial information stored in advance, a control device 54 connectable to the database 51 and configured to create recommendation information with a specific set of commercial information extracted from the plurality of sets of commercial information, a user interface 52 capable of accepting input of information, an administrator interface 53 capable of accepting input of information, and a display device (an example of an information providing device 55) capable of displaying the recommendation information. The commercial information providing method includes a first extraction step (cf. first filtering processing described later) of extracting, by the control device 54, specific sets of commercial information from the plurality of sets of commercial information based on user request information input from the user interface 52, a second extraction step (cf. second filtering processing described later) of extracting, by the control device 54, at least one set of commercial information from the specific sets of commercial information extracted by the first extraction processing based on filtering information for determining order of displaying the plurality of sets of commercial information input in advance from the administrator interface 53, and a creation step (cf. response data creation processing described later) of creating, by the control device 54, recommendation information including the at least one set of commercial information sorted and extracted by the second extraction processing in accordance with the filtering information for determining the order.

[Mode 7-1]

A commercial information processing apparatus in Mode 7-1 includes a communication unit and a control unit. The communication unit is capable of communicating with an information processing apparatus including an input unit capable of inputting question information representing a question from a user and an information providing unit capable of providing information to the user. The control unit is configured to perform the processing of extracting at least one set of commercial information to be provided and a response template to be used from a storage unit holding a plurality of sets of commercial information on commercial facilities and a plurality of response templates to be used to respond to question information input with the input unit based on the question information input with the input unit and creating response information using the response template. The response information includes a set of commercial information selected from the extracted at least one set of commercial information based on a priority level to prioritize providing a specific set of commercial information among the plurality of sets of commercial information.

The commercial information providing system 5 and the commercial information providing method are not limited to the above-described ones. For example, they may be configured as follows.

[First Other Mode]

The database 51 stores text information representing expected questions (cf. reference texts described later) and the control device 54 interprets the question information based on the question information input from the user interface 52 and the text information (cf. semantic recognition processing described later) and creates the response information (cf. response data creation processing).

Since this configuration interprets the meaning of the question information, the response to a question is not a list of commercial information (the names of shops or facilities) answering the question but interactive bidirectional dialogue, which enables the user to direct one of a plurality of shops the administrator wants to introduce (the administrator wants the user to use).

[Second Other Mode]

The response information includes a proposal message of an interrogative sentence or a tag question in text or speech. Examples of such messages include "Shop X meets your requests. This shop is one of our recommendations. How do you like it?", "Is Shop X acceptable for you? This shop is currently available and you can make a reservation.", and "How about this room?"

According to this configuration, the user is directed by the administrator but the final decision is left to the user. As a result, the user can have good impression by feeling that the user has selected the information by himself or herself.

[Third Other Mode]

The control device 54 is configured to determine whether a use request information for requesting to use a set of commercial information included in the response information is about the commercial information determined based on the priority level upon input of the use request information from the user interface 52 and if not determining that the use request information is about the determined commercial information, create response information including the set of commercial information determined based on the priority level as well as positive information and negative information on the set of commercial information designated by the use request information (cf. icon input processing described later). The information providing device 55 provides the response information created by the control device 54 to the user.

For example, in a case where a user provides a question "I want to eat Japanese food", the control device 54 first provides first response information including information on Restaurants A to D in the facilities that meet the user's request. If the user selects Shop D not recommended by the administrator through the user interface 52, the control device 54 provides second recommendation information including positive information "Restaurant D. Thank you for your frequent visits to this restaurant", negative information "We have checked the availability but your usual private room is occupied and only counter space is available right now. Is it OK with you?", and commercial information determined based on the priority "Restaurant A has an open private room and you can be seated now. Would you like to visit Restaurant A?

This configuration enables the user to reconsider about using Restaurant D not recommended by the administrator to direct the user to Restaurant A recommended by the administrator.

[Fourth Other Mode]

The commercial information providing system further includes a reader device (cf. a user terminal described later) for retrieving identification information on the user from a storage medium such as an IC card and the database 51 or an external database (cf. a member server and a history server described later) holds personal information and use history information of users. The control device 54 is configured to acquire personal information and use history information on the user, determine whether the user is a regular customer based on the personal information and the use history information, and change the priority level based on the personal information and the use history information (cf. second filtering processing described later) if determining that the user is a regular customer.

For example, if the user is a regular customer, a question "I want to eat Japanese food" may imply an intention that the user wants to know the place and the name of the restaurant where the user has been previously, although the user has forgotten the name of the restaurant. Furthermore, a regular customer may know what kind of restaurants are in the commercial facilities.

In these cases, if the response information based on the priority level determined by the administrator does not include the restaurant intended by the user or some restaurants known by the user, the user may feel inconvenience. Accordingly, it is preferable to present a plurality of restaurants including restaurants in the use history and a high-priority restaurant intended by the administrator in view of the question information. In addition, it is preferable to control the processing to provide different information between regular customers and newcomer users.

This configuration presents a regular customer with a plurality of restaurants including restaurants in the use history and a high-priority restaurant intended by the administrator in view of the question information, which enables a dialogue suitable for a regular customer.

[Fifth Other Mode]

Assume that, in response to a question "I want to eat non-fatty food." input through the user interface 52, Udon restaurants A and B, Soba restaurants C and D, and Sushi restaurants F and G are extracted in the first extraction processing as information meeting the conditions.

If newly opened Sushi restaurant G is preset to filtering information (recommendation information) by the manager of the facilities or the administrator through the administrator interface 52, the control device 54 creates a response "How about Sushi restaurant G? The menu is as follows and seats are available now." and displays the response with a RESERVE icon on the display device or the information providing device 55.

In response to a touch on the RESERVE icon, the control device 54 creates a reservation page customized for the user based on the user's personal information (the name, sex, age, and hometown including the nationality) and displays the page on the display device. After entering additional information such as the time of visit and the number of visitors to the reservation page through the user interface such as a touch panel, the user touches (inputs) the HERE icon, then, the reservation information is sent to the restaurant as well as the e-mail address registered in the personal information. A PRINT icon is displayed on the display device to print out the reservation page and the map with a printer (cf. a kiosk terminal described later).

Figure 3:
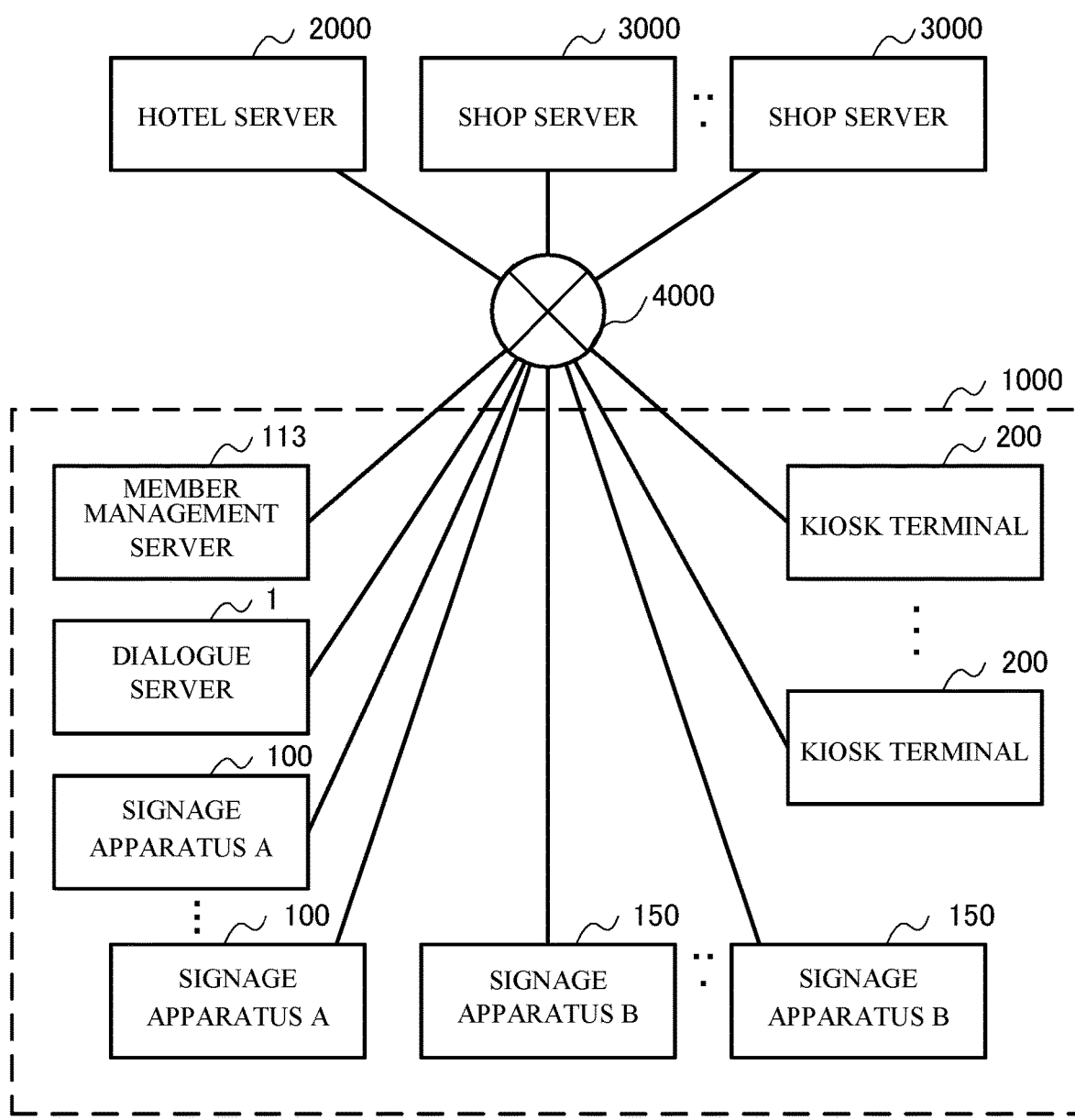
FIG. 3 is a diagram for illustrating an example of a dialogue system.

FIG. 3 is a diagram for illustrating an example (dialogue system 1000) of a commercial information providing system 5. The above-described configuration can be implemented with the dialogue system 1000 described hereinafter but the dialogue system 1000 is merely an example. For example, all the elements disclosed herein are not necessary.

The dialogue system 1000 includes a member management server 13, a dialogue server 1, and one or more user terminals (signage apparatuses A 100, signage apparatuses B 150, and kiosk terminals 200).

Although the signage apparatuses A 100, signage apparatuses B 150, and kiosk terminals 200 are provided for user terminals, the user terminals are not limited to these. The user terminals may be information processing apparatuses or smartphones, for example.

The dialogue server 1 receives and analyzes an HTTP request sent from the web browser of a user terminal in accordance with a user operation, prepares data for responding to the request, and sends back the data to the web browser of the user terminal as an HTTP response. The data to be sent back as an HTTP response includes data such as HTML data and image data in addition to the substance of the response. The HTML data is to display a web page and the image data is image data or video data to be displayed on the web page.

More specifically, when a user operates an input device such as a touch panel of a user terminal, the user terminal receives a signal generated by the operation as an input (input sentence). The user terminal displays a designated web page and displays the received input sentence in an entry area of the web page. The user terminal sends an HTTP request to the dialogue server 1 via a network 4000 in accordance with the user operation (press of an ASK button). Further, upon receipt of output information (such as HTML data, or an example of commercial information) including response data (an example of response information) from the dialogue server 1, the user terminal displays a web page based on the data (updates the display of the web browser).

The dialogue server 1 receives a text (an example of question information) entered by the user to the user terminal via the network 4000 using a protocol such as HTTP.

The dialogue server 1 consults its own knowledge database and shop database or communicates with a hotel server 2000 and shop servers 3000 based on the received input information, and determines a response.

The knowledge database includes knowledge data, which is updated in accordance with operations of the administrator. The knowledge data is basically data specified with a combination of a text (reference text) to be entered by the user with high probability and data for processing the text. The shop database includes shop data, which is updated in accordance with operations of the administrator. The shop data is an example of commercial information and data including a variety of information (such as a shop name) on individual shops.

The dialogue server 1 creates response data so as to display the determined response on a web page displayed by the web browser of the user terminal and sends the response data to the user terminal as output information via the network 4000.

The dialogue server 1 records how the dialogue server 1 has responded to an input of the user to the user terminal into a log and in response to operations of the administrator, analyzes the log and provides a specified report.

[Circuit Configuration of Dialogue Server]

Figure 4:
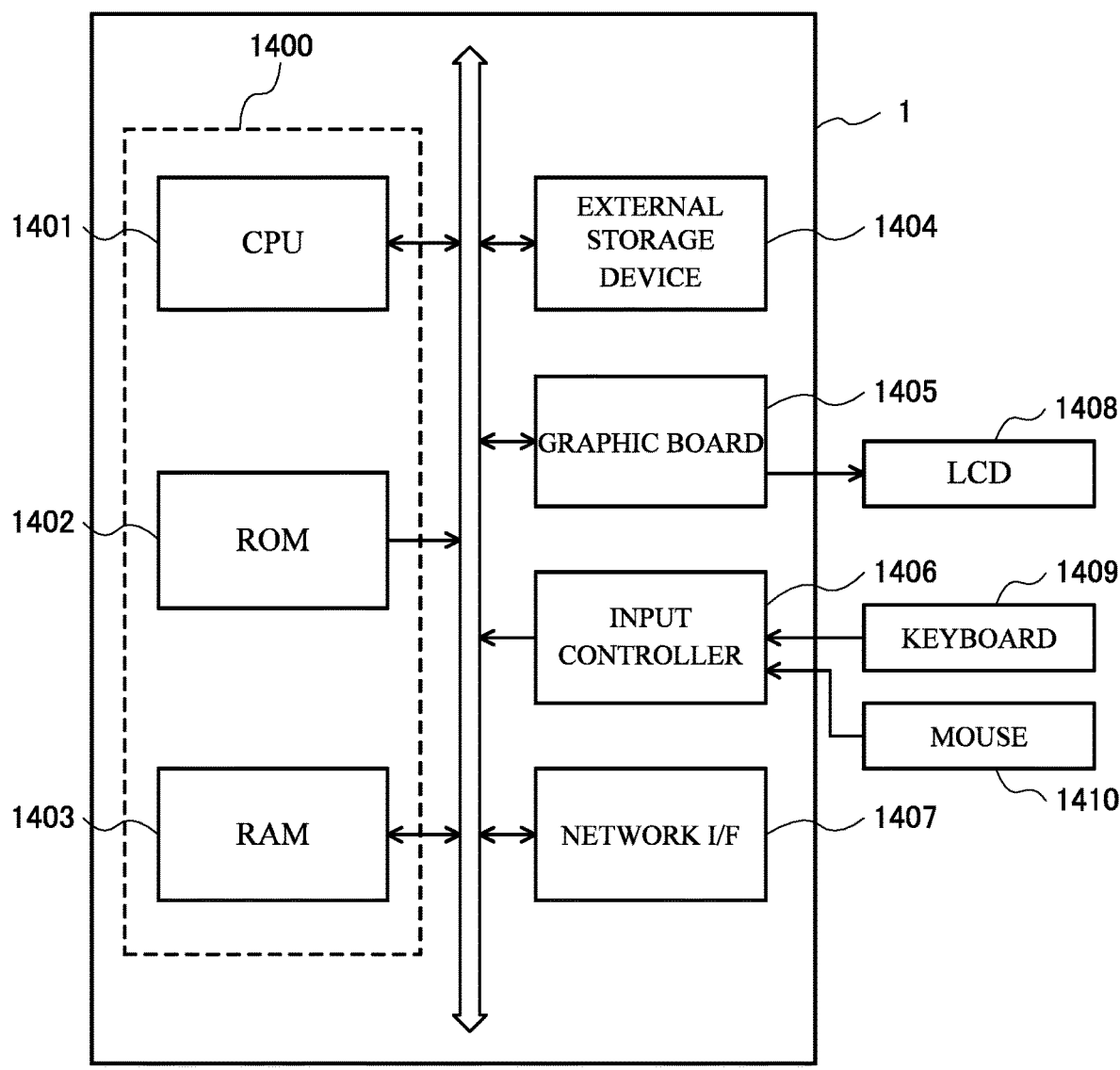
FIG. 4 is a diagram for illustrating a circuit configuration of a dialogue server.

With reference to FIG. 4, a configuration of a circuit included in the dialogue server 1 is described.

The dialogue server controller 1400 for controlling the dialogue server 1 includes a CPU 1401, a ROM 1402, and a RAM 1403.

The CPU 1401 controls operation of the components of the dialogue server 1 and executes the programs stored in the ROM 1402 and carries out operations.

The ROM 1402 includes a memory device such as a flash memory and stores permanent data to be used by the CPU 1401. For example, the ROM 1402 can store a program for controlling the dialogue system.

The RAM 1403 stores data required to execute the programs stored in the ROM 1402 on a temporary basis.

The external storage device 1404 is a storage device such as a hard disk drive and stores programs to be executed by the CPU 1401 and data (such as tables and databases) to be used by the programs executed by the CPU 1401.

The graphic board 1405 controls the LCD 1408 to display a variety of information.

The input controller 1406 converts inputs from the keyboard 1409 or the mouse 1410 into a signal and sends it to the CPU 1401.

The network I/F (interface) 1407 implements data communication with the servers such as the member management server 13, the hotel server 2000, and the shop servers 3000 and the signage apparatuses A 100, the signage apparatuses B 150, the kiosk terminals 200, and the surveillance cameras (not shown).

For example, the CPU 1401 loads the programs and the table data stored in the ROM 1402 to the RAM 1403 and executes the programs to implement the functions of the dialogue server 1

[Configuration of Signage Apparatus A]

Figure 5:
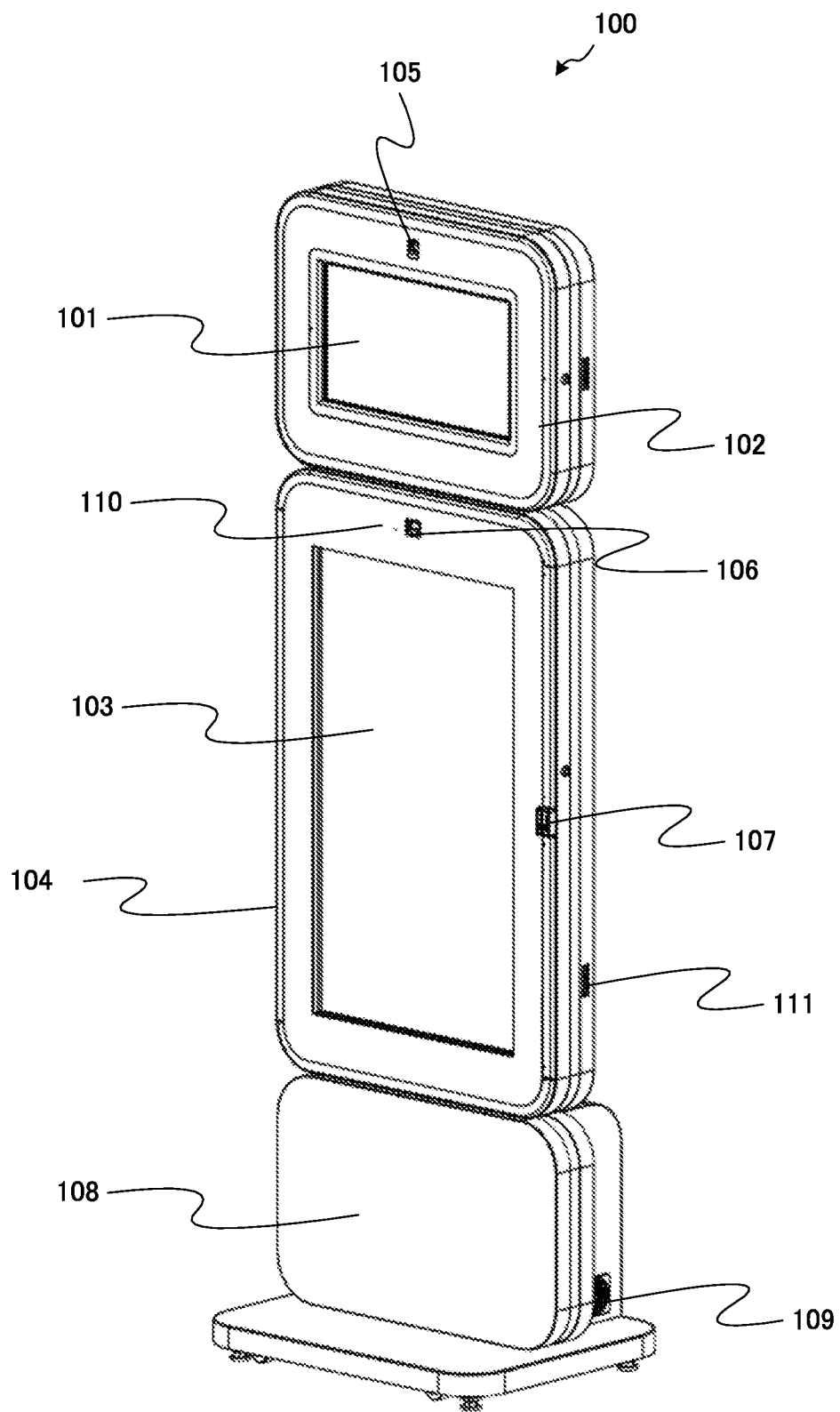
FIG. 5 is a diagram for illustrating an overall structure of a signage apparatus A.

FIG. 5 illustrates a signage apparatus A 100 to be used in the dialogue system 1000. The signage apparatus A 100 is an example of a user terminal (information input and output apparatus) and can be connected to the servers (such as the member management server 13 and the dialogue server 1) in the dialogue system 1000 via a network. For example, the signage apparatus A 100 receives a question (input) from a user and displays (outputs) an answer to the question received from the dialogue server 1. Furthermore, the signage apparatus A 100 can display advertisements (inclusive of billboards) of shops and a floor guide of the hall.

The signage apparatus A 100 includes an LCD 101 and an LCD 103 having a touch panel function. The LCD 101 may be a 24-inch liquid crystal display device (24 inches correspond to approximately 60.96 cm) and the LCD 103 may be a 46-inch liquid crystal display device (46 inches correspond to approximately 116.84 cm). As described above, these LCDs display a dialogue with the user, advertisement information, and guidance information. The touch panel function of the LCD 103 may be based on infrared technology. Although the LCD 103 in this example is configured to have a touch panel function, instructions may be input through other input devices such as a keyboard and a mouse.

The LCD 101 and the LCD 103 are held by cabinets. Around the rims of the front faces of the cabinets, effect-use LEDs 102 and 104 are provided. The effect-use LEDs 102 and 104 can be tape LED lights.

The signage apparatus A 100 further includes motion sensors 105 and 106 on the cabinet for the LCD 101 and the cabinet for the LCD 103, respectively. The motion sensors 105 and 106 can be cameras; images taken by the motion sensors 105 and 106 are used to analyze the behaviors of the users of the signage apparatus A 100 and the people walking down the aisles.

The signage apparatus A 100 also includes a touch unit 107, which includes an RFID module capable of data communication with a contactless IC card, or a cell phone or a smartphone having an NFC function. A member can log in the system by holding a membership card (IC card) associated with the member over the touch unit 107 and display a menu screen for members and information on the member on the LCD 101 or the LCD 103. The information on the member may be acquired from the member management server 13. A contactless IC card, a cell phone, and a smartphone are examples of readable media (storage media).

The hall staffs can log in the system by holding an IC card for staff and display a menu screen for staff on the LCD 101 or the LCD 103.

The signage apparatus A 100 is configured to hide the information displayed on the LCD 103 and automatically log off the user when a predetermined time has elapsed after the user touches the touch unit 107 with an IC card and then leaves the signage apparatus A 100 without log-off operation.

The signage apparatus A 100 includes a microphone 133 in the cabinet for the LCD 103 to collect sounds. The cabinet for the LCD 103 has an opening 110 for a microphone at the position corresponding to the microphone 133. FIG. 5 shows this opening 110 for a microphone beside the motion sensor 106.

The signage apparatus A 100 further includes speakers 134 and 135 in the cabinet for the LCD 103 to output sounds. The cabinet for the LCD 103 is provided with speaker ducts at the positions corresponding to the speakers. FIG. 5 shows a speaker duct 111 for one of the speakers.

In addition to the foregoing, the signage apparatus A 100 includes a base unit 108 for supporting the cabinet for the LCD 101 and the cabinet for the LCD 103, and a control unit 109 containing a controller for controlling components such as the LCDs and LEDs. [Configuration of circuit in signage apparatus A]

Figure 6:
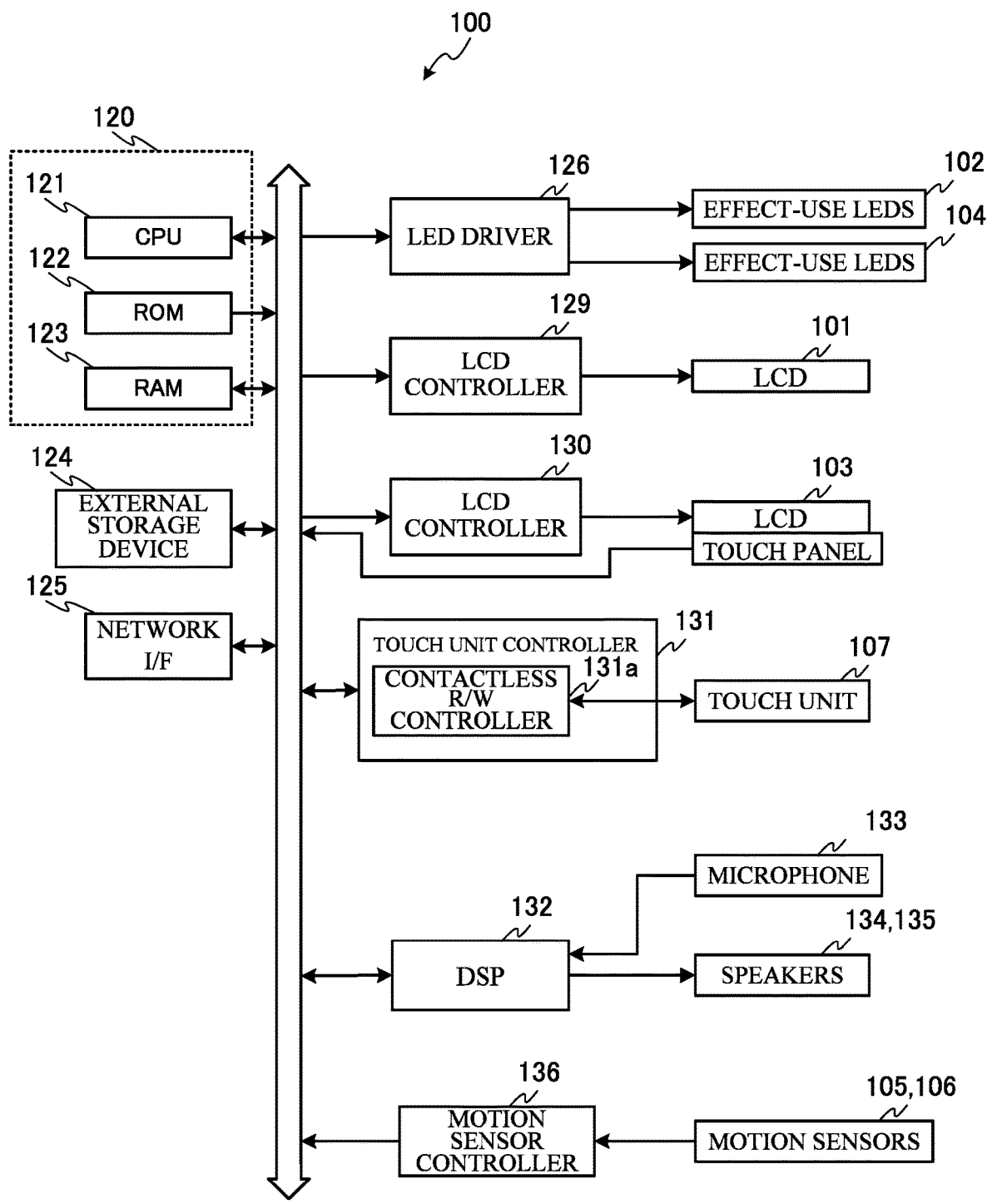
FIG. 6 is a diagram for illustrating a circuit configuration of a signage apparatus A.

Next, with reference to FIG. 6, a configuration of a circuit included in the signage apparatus A 100 is described.

The signage A controller 120 for controlling the signage apparatus A 100 includes a CPU 121, a ROM 122, and a RAM 123.

The CPU 121 controls operation of the components of the signage apparatus A 100, and executes the programs stored in the ROM 122 and carries out operations.

The ROM 122 includes a memory device such as a flash memory and stores permanent data to be used by the CPU 121.

The RAM 123 stores data required to execute the programs stored in the ROM 122 on a temporary basis.

The external storage device 124 is a storage device such as a hard disk drive and stores programs to be executed by the CPU 121 and data to be used by the programs executed by the CPU 121.

The network I/F (interface) 125 implements data communication with servers such as the member management server 13 and the dialogue server 1.

The LED driver 126 controls the effect-use LEDs 102 and 104 to light with predetermined timing. Further, the LED driver 126 can light the effect-use LEDs 102 and 104 synchronously with the display of the dialogue with the user, the display of advertisement information, guidance information, or membership information to be displayed in response to an operation by a member.

The LCD controller 129 controls the LCD 101 to display information such as the aforementioned advertisement information.

The LCD controller 129 can also control the LCD 101 to display a variety of information.

The LCD controller 130 controls the LCD 103 to display response data created by the dialogue server 1 and information such as the aforementioned advertisement information. The LCD 103 has a touch panel function, which forwards an operation of the user to the CPU 121.

The touch unit controller 131 controls data transmission responsive to a touch operation on the touch unit 107 with an IC card or a cell phone. The touch unit controller 131 includes a contactless R/W (reader/writer) controller 131*a*.

The contactless R/W controller 131*a* determines whether the touch unit 107 is operated with an IC card or a cell phone and if the touch unit 107 is operated, acquires information retrieved by the touch unit 107. The touch unit 107 has an antenna for data communication with an IC card or a cell phone using NFC.

Upon acquisition of the identification code of a membership card (IC card) from the touch unit 107, the CPU 121 acquires membership information on the member associated with the identification code from the member management server 13, and displays the information on the LCD 101 or the LCD 103. Furthermore, the CPU 121 can display an operation menu for the member on the LCD 103 or display advertisement information suitable for the member on the LCD 101 or the LCD 103.

Alternatively, the CPU 121 may acquire a user ID stored in the membership card (IC card) from the touch unit 107 and acquire the membership information associated with the user ID from the member management server 13.

The DSP 132 receives audio data acquired from the microphone 133, applies predetermined processing to the data, and sends the data to the CPU 121. In addition, the DSP 132 sends received audio data to the speakers 134 and 135 to output sounds.

The motion sensor controller 136 acquires images of a user or other objects captured by the motion sensors (for example, cameras) 105 and 106, applies predetermined image processing as necessary, and sends the processed data to the CPU 121.

The motion sensor controller 136 can acquire captured-image information from the motion sensors 105 and 106 and send the captured-image information to the dialogue server 1 in response to an acquisition request of the dialogue server 1.

[Configuration of Signage Apparatus B]

Figure 7:
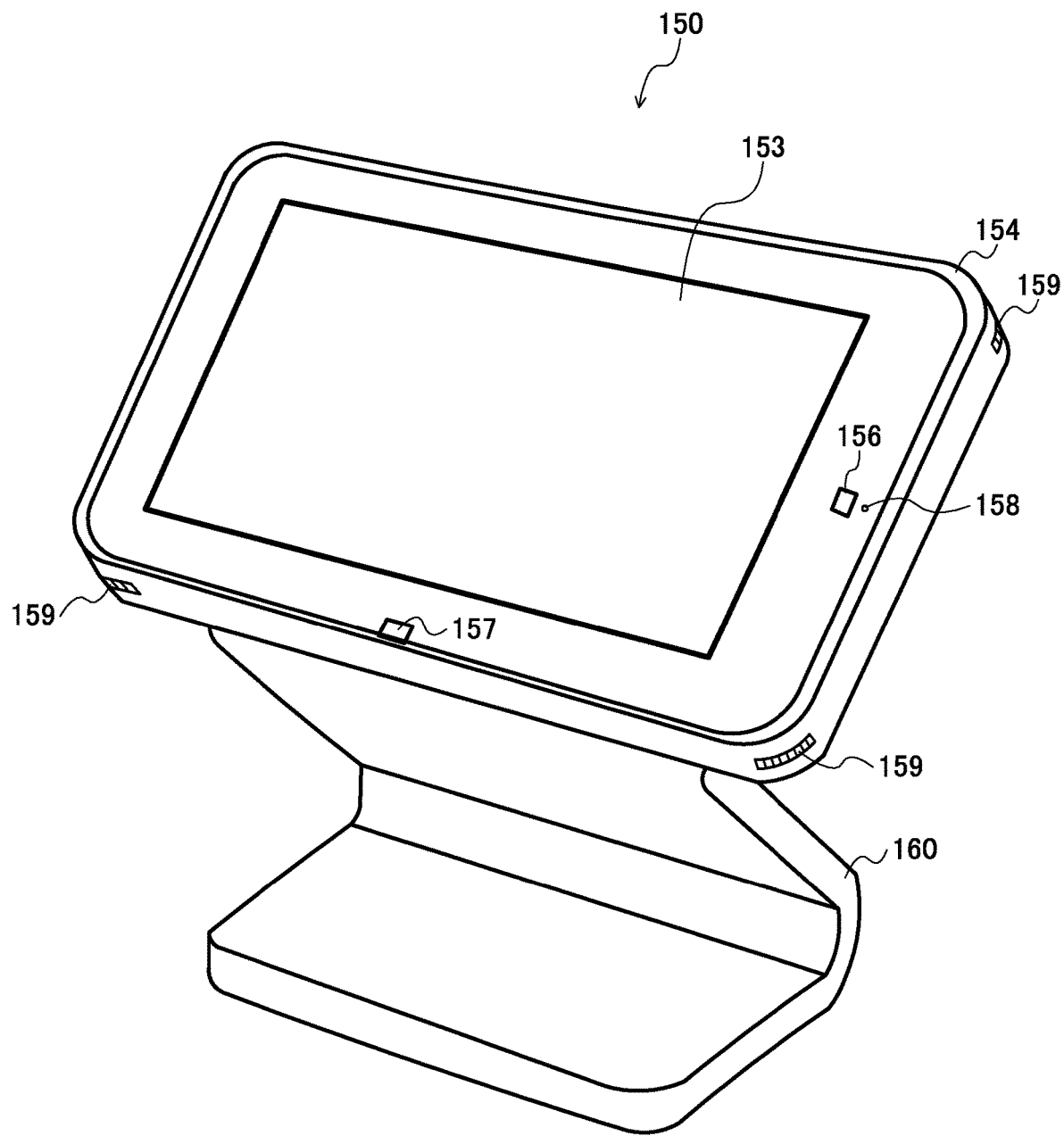
FIG. 7 is a diagram for illustrating an overall structure of a signage apparatus B.

FIG. 7 illustrates a signage apparatus B 150 to be used in the dialogue system 1000. The signage apparatus B 150 is an example of a user terminal (information input and output apparatus) and can be connected to the servers (such as the member management server 13 and the dialogue server 1) in the dialogue system 1000 via a network. For example, the signage apparatus B 150 receives a question (input) from a user and displays (outputs) an answer to the question received from the dialogue server 1. Furthermore, the signage apparatus B 150 can display advertisements (inclusive of billboards) of shops and a floor guide of the hall.

The signage apparatus B 150 includes an LCD 153 having a touch panel function. The LCD 153 may be a 46-inch liquid crystal display device (46 inches correspond to approximately 116.84 cm). As described above, the LCD 153 displays a dialogue with the user, advertisement information, and guidance information. The touch panel function of the LCD 153 may be based on infrared technology. Although the LCD 153 in this example is configured to have a touch panel function, instructions may be input through other input devices such as a keyboard and a mouse.

The LCD 153 is held by a cabinet. Around the rim of the front face of the cabinet, an effect-use LED 154 is provided. The effect-use LED 154 can be a tape LED light.

The signage apparatus B 150 further includes a motion sensor 156 on the cabinet for the LCD 153. The motion sensor 156 can be a camera; images taken by the motion sensor 156 are used to analyze the behaviors of the users of the signage apparatus B 150 and the people walking down the aisles.

The signage apparatus B 150 also includes a touch unit 157, which includes an RFID module capable of data communication with a contactless IC card, or a cell phone or a smartphone having an NFC function. A member can log in the system by holding a membership card (IC card) associated with the member over the touch unit 157 and display a menu screen for members and information on the member on the LCD 153. The information on the member may be acquired from the member management server 13.

The hall staffs can log in the system by holding an IC card for staff and display a menu screen for staff on the LCD 153.

The signage apparatus B 150 is configured to hide the information displayed on the LCD 153 and automatically log off the user when a predetermined time has elapsed after the user touches the touch unit 157 with an IC card and then leaves the signage apparatus B 150 without log-off operation.

The signage apparatus B 150 includes a microphone 183 in the cabinet for the LCD 153 to collect sounds. The cabinet for the LCD 153 has an opening 158 for a microphone at the position corresponding to the microphone 183. FIG. 7 shows this opening 158 for a microphone beside the motion sensor 156.

The signage apparatus B 150 further includes speakers 184 and 185 in the cabinet for the LCD 153 to output sounds. The cabinet for the LCD 153 is provided with speaker ducts 159 at the positions (four corners) corresponding to the speakers.

In addition to the foregoing, the signage apparatus B 150 includes a base unit 160 for supporting the cabinet for the LCD 153. The base unit 160 contains a controller for controlling components such as the LCD 153 and the LED 154.

[Configuration of Circuit in Signage Apparatus B]

Figure 8:
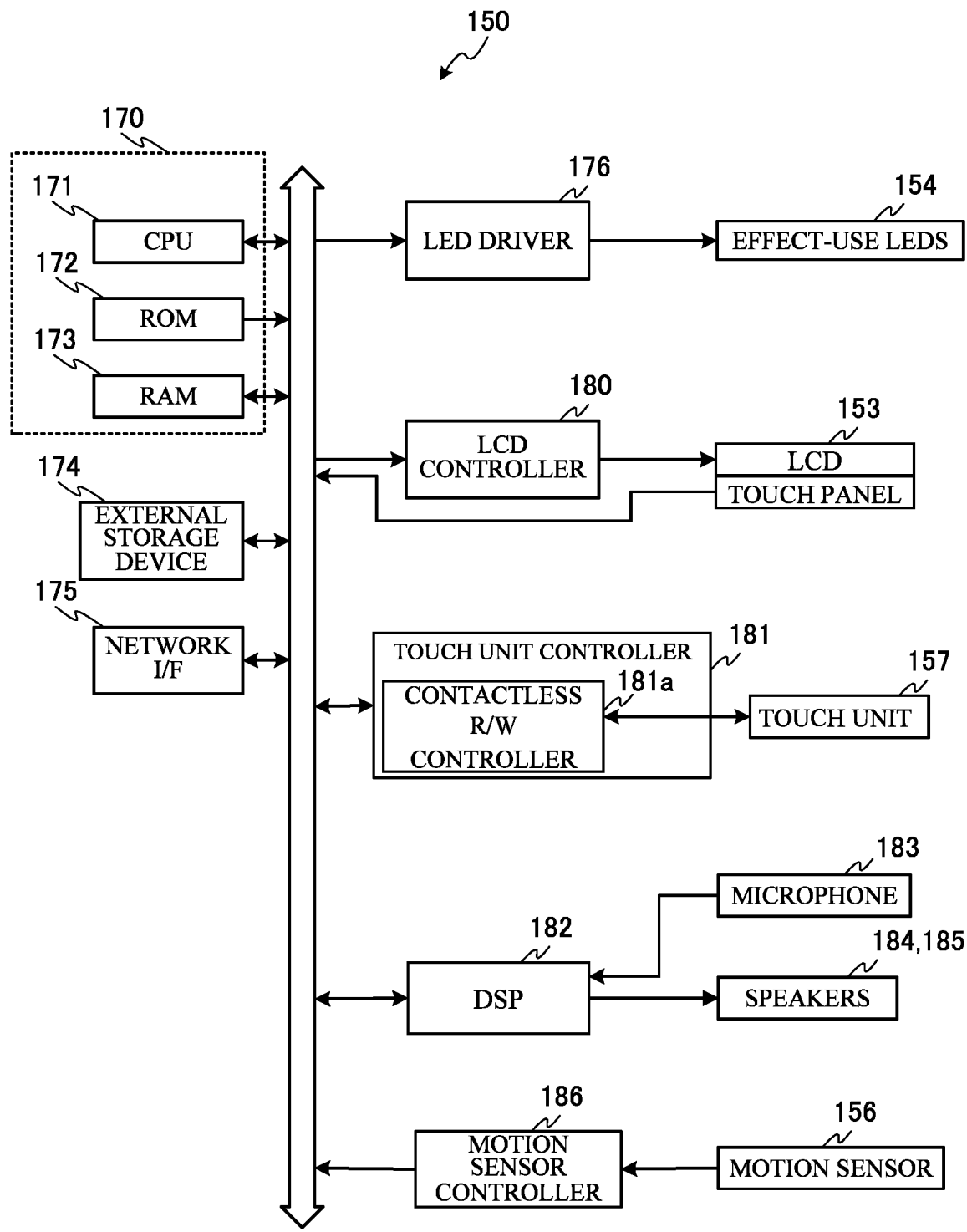
FIG. 8 is a diagram for illustrating a circuit configuration of a signage apparatus B.

Next, with reference to FIG. 8, a configuration of a circuit included in the signage apparatus B 150 is described.

The signage B controller 170 for controlling the signage apparatus B 150 includes a CPU 171, a ROM 172, and a RAM 173.

The CPU 171 controls operation of the components of the signage apparatus B 150, and executes the programs stored in the ROM 172 and carries out operations.

The ROM 172 includes a memory device such as a flash memory and stores permanent data to be used by the CPU 171.

The RAM 173 stores data required to execute the programs stored in the ROM 172 on a temporary basis.

The external storage device 174 is a storage device such as a hard disk drive and stores programs to be executed by the CPU 171 and data to be used by the programs executed by the CPU 171.

The network I/F (interface) 175 implements data communication of the signage apparatus B 150 with servers such as the member management server 13 and the dialogue server 1.

The LED driver 176 controls the effect-use LED 154 to light with predetermined timing. Further, the LED driver 176 can light the effect-use LED 154 synchronously with the display of the dialogue with the user, the display of advertisement information, guidance information, or membership information to be displayed in response to an operation by a member.

The LCD controller 180 controls the LCD 153 to display response data created by the dialogue server 1 and information such as the aforementioned advertisement information. The LCD 153 has a touch panel function, which forwards an operation of the user to the CPU 171.

The touch unit controller 181 controls data transmission responsive to a touch operation on the touch unit 157 with an IC card or a cell phone. The touch unit controller 181 includes a contactless R/W (reader/writer) controller 181a.

The contactless R/W controller 181a determines whether the touch unit 157 is operated with an IC card or a cell phone and if the touch unit 157 is operated, acquires information retrieved by the touch unit 157. The touch unit 157 has an antenna for data communication with an IC card or a cell phone using NFC.

Upon acquisition of the identification code of a membership card (IC card) from the touch unit 157, the CPU 171 acquires membership information on the member associated with the identification code from the member management server 13, and displays the information on the LCD 153. Furthermore, the CPU 171 can display an operation menu for the member on the LCD 153 or display advertisement information suitable for the member on the LCD 153.

Alternatively, the CPU 171 may acquire a user ID stored in the membership card (IC card) from the touch unit 157 and acquire the membership information associated with the user ID from the member management server 13.

The DSP 182 receives audio data acquired from the microphone 183, applies predetermined processing to the data, and sends the data to the CPU 171. In addition, the DSP 182 sends received audio data to the speakers 184 and 185 to output sounds.

The motion sensor controller 186 acquires images of a user or other objects captured by the motion sensor (for example, camera) 156, applies predetermined image processing as necessary, and sends the processed data to the CPU 171.

The motion sensor controller 186 can acquire captured-image information from the motion sensor 156 and send the captured-image information to the dialogue server 1 in response to an acquisition request of the dialogue server 1.

[Configuration of Kiosk Terminal]

Figure 9:
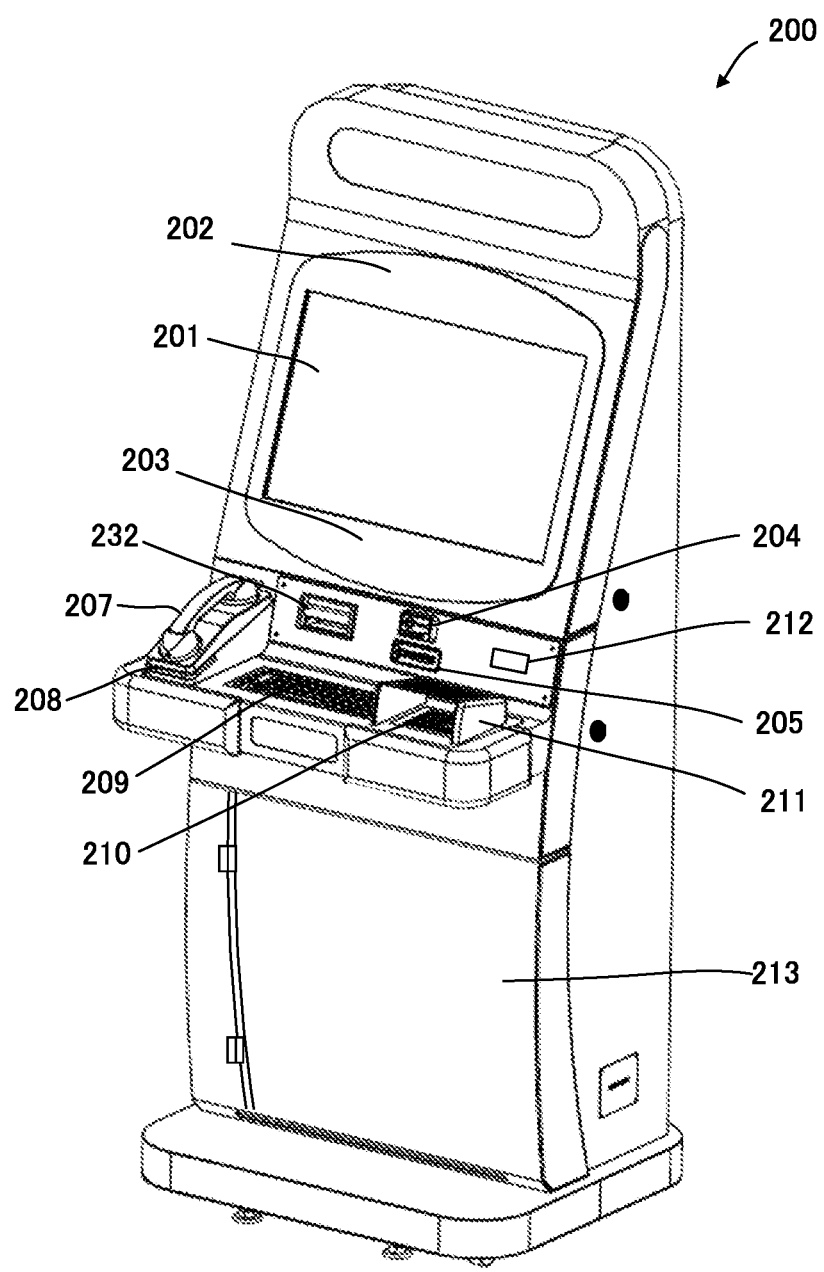
FIG. 9 is a diagram for illustrating an overall structure of a kiosk terminal.

FIG. 9 illustrates a kiosk terminal 200 to be used in the dialogue system 1000. The kiosk terminal 200 is an example of user terminal (information input and output apparatus) and can be connected to the servers (such as the member management server 13 and the dialogue server 1) in the dialogue system 1000 via a network. For example, the kiosk terminal 200 receives a question (input) from a user and displays (outputs) an answer to the question received from the dialogue server 1. Furthermore, the kiosk terminal 200 prints out (outputs) a floor map included in the answer from the dialogue server 1 in response to a user operation. The kiosk terminal 200 also prints out (outputs) a coupon ticket referred to in the dialogue with the dialogue server 1 in response to a user operation.

The kiosk terminal 200 includes an LCD 201 having a touch panel function. The LCD 201 may be a 24-inch liquid crystal display device (24 inches correspond to approximately 60.96 cm). As described above, this LCD displays a dialogue with the user. Although the LCD 201 in this example is configured to have a touch panel function, instructions may be input through other input devices such as a keyboard and a mouse.

The kiosk terminal 200 further includes motion sensors 202 and 203 above and below the LCD 201. The motion sensors 202 and 203 can be cameras; images taken by the motion sensors 202 and 203 are used to analyze the behaviors of the users of the kiosk terminal 200 and the people walking down the aisles.

The kiosk terminal 200 also includes a touch unit 204, which includes an RFID module capable of data communication with a contactless IC card, or a cell phone or a smartphone having an NFC function. A member can log in the system by holding a membership card (IC card) associated with the member over the touch unit 204 and display a menu screen for members and information on the member on the LCD 201. The information on the member may be acquired from the member management server 13. In addition to the touch unit 204 or instead of the touch unit 204, an information recording medium reader for reading information stored in an information recording medium such as a magnetic card may be provided. In this case, a magnetic card can be a membership card, instead of the IC card.

The hall staffs can log in the system by holding an IC card for staff and display a menu screen for staff on the LCD 201.

The kiosk terminal 200 has an IC card slot 205 to insert or take out an IC card. The IC card slot 205 is provided with an eject button. At the corresponding place to the IC card slot 205 inside the cabinet of the kiosk terminal 200, a card unit 230 is provided; the IC card slot 205 is structured as a part of the card unit 230.

When a membership card is inserted from the IC card slot 205, the kiosk terminal 200 can display a menu screen for members and information on the member on the LCD 201. The card unit 230 can issue and collect a card such as a limited card or a reward card.

The kiosk terminal 200 has a ticket printer/bill validator 232. The ticket printer/bill validator 232 can issue and collect a ticket or a coupon; further, have the functions of a bill validator.

The kiosk terminal 200 further has a receiver 207 to be used in VoIP calls. The user of the kiosk terminal 200 can talk with a user of another kiosk terminal 200 or a user of a signage apparatus by using the receiver 207. The incoming alert LED 208 is controlled to light when a VoIP call is coming.

The kiosk terminal 200 has a keyboard 209 and a numeric keypad 210 for the user to enter data (in membership registration or a dialogue with the system) and LED plates 211 for privacy protection are provided on the both sides of the numeric keypad 210.

The kiosk terminal 200 further has a QR code scanner 212 for reading a QR Code™, which may be attached to an e-mail sent to a cell phone.

The kiosk terminal 200 includes a cabinet 213 containing the controller of the LCD and LEDs.

[Configuration of Circuit in Kiosk Terminal]

Figure 10:
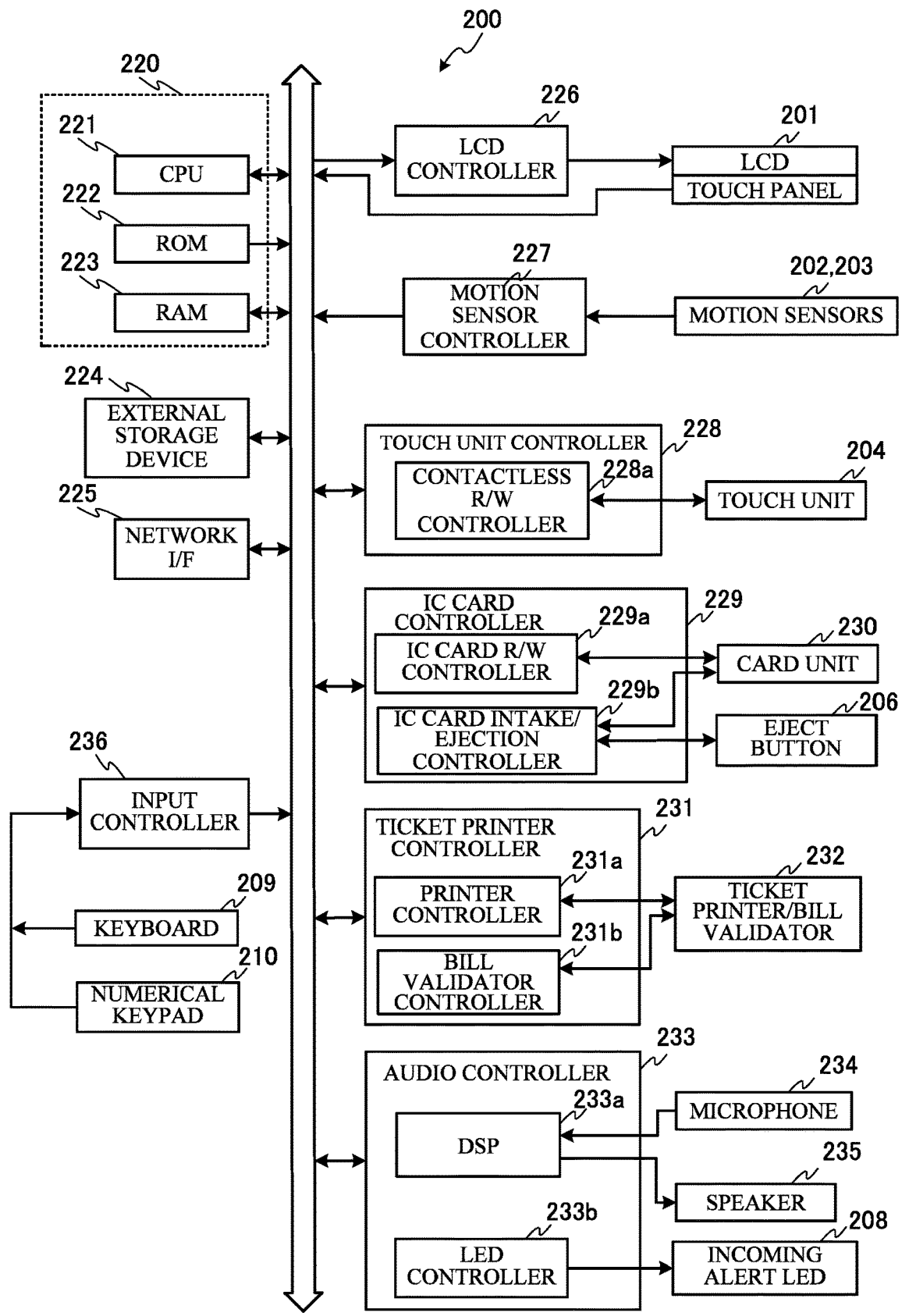
FIG. 10 is a diagram for illustrating a circuit configuration of a kiosk terminal.

Next, with reference to FIG. 10, a configuration of a circuit included in the kiosk terminal 200 is described.

The kiosk terminal controller 220 for controlling the kiosk terminal 200 includes a CPU 221, a ROM 222, and a RAM 223.

The CPU 121 controls operation of the components of the kiosk terminal 200, and executes the programs stored in the ROM 122 and carries out operations.

The ROM 222 includes a memory device such as a flash memory and stores permanent data to be used by the CPU 221. For example, the ROM 222 can store a VoIP call control program.

The RAM 223 stores data required to execute the programs stored in the ROM 222 on a temporary basis.

The external storage device 224 is a storage device such as a hard disk drive and stores programs to be executed by the CPU 221 and data to be used by the programs executed by the CPU 221.

The network I/F (interface) 225 implements data communication with the servers such as the member management server 13 and the dialogue server 1.

The LCD controller 226 controls the LCD 201 to display information such as the aforementioned information on the games. The LCD 201 has a touch panel function, which sends an operation of the user to the CPU 221.

The LCD controller 226 can also control the LCD 201 to display response data created by the dialogue server 1.

The motion sensor controller 227 receives images of a user or other objects captured by the motion sensors (for example, cameras) 202 and 203, applies predetermined image processing as necessary, and forwards the processed data to the CPU 221.

The motion sensor controller 227 can acquire captured-image information from the motion sensors 202 and 203 and send the captured-image information to the dialogue server 1 in response to an acquisition request of the dialogue server 1.

The touch unit controller 228 controls data transmission responsive to a touch operation on the touch unit 204 with an IC card or a cell phone. The touch unit controller 228 includes a contactless R/W (reader/writer) controller 228a.

The contactless R/W controller 228a determines whether the touch unit 204 is operated with an IC card or a cell phone and if the touch unit 204 is operated, acquires information retrieved by the touch unit 204. The touch unit 204 has an antenna for data communication with an IC card or a cell phone using NFC.

The IC card controller 229 controls intake and ejection of an IC card, and retrieval of data from the IC card. The IC card controller 229 includes a contactless R/W (reader/writer) controller 229a and an IC card intake/ejection controller 229b.

The contactless R/W controller 229a controls the card unit 230 to read information such as the identification code stored in the IC card. The card unit 230 has an antenna for data write to the IC card using NFC.

The IC card intake/ejection controller 229b controls intake and ejection of an IC card. In response to insertion of an IC card to the IC card slot 205 by the user, the IC card intake/ejection controller 229b controls the IC card to be held in the card unit 230 until the user logs off. Furthermore, in response to press of the eject button, the IC card intake/ejection controller 229b controls the IC card to be ejected.

The ticket printer controller 231 controls the ticket printer/bill validator 232 to print a floor map, to issue or collect a ticket or a coupon, and to identify a bill. The ticket printer controller 231 includes a printer controller 231a and a bill validator controller 231b.

The audio controller 233 inputs and outputs sounds with a microphone 234 and a speaker 235 included in the receiver 207. The audio controller 233 includes a DSP 233a and an LED controller 233b. The DSP 233a performs predetermined audio signal processing in receiving sounds from the microphone and outputting sounds from the speaker 235. The LED controller 233b controls the incoming alert LED 208 to light based on the incoming signal of a VoIP call.

The input controller 236 converts inputs from the keyboard 209 or the numerical keypad 210 into a signal and sends it to the CPU 221.

[Creating Shop Database]

Figure 11A:
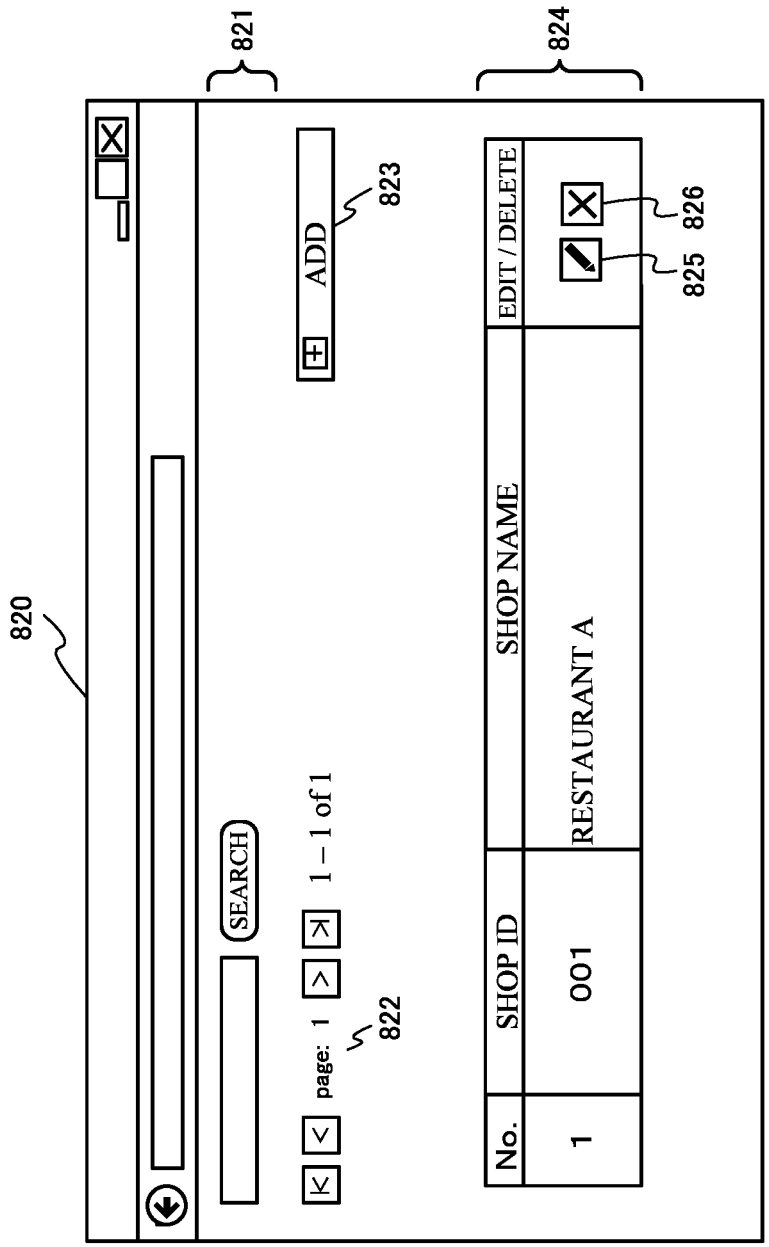
FIG. 11A is a diagram for illustrating an example of a shop data creation screen.

FIG. 11A is a diagram for illustrating an example (shop data creation screen 820) of a shop data creation screen to be used to create a shop database. The dialogue server 1 controls a display device to display the shop data creation screen 820 and shop data configured through the shop data creation screen 820 is stored to a shop database.

The shop data creation screen 820 is displayed in response to selection of a menu "create shop database" in the service menu of the dialogue system 1000.

The shop data creation screen 820 includes a search instruction area 821 for specifying a search item stored in the shop database, a search result list jump instruction area 822 for indicating the page position of the displayed search result within the search result list and for specifying the page where to jump in the search result list, an ADD button 823 for adding new shop data, and an indication area 824 for showing a result of searching the shop data.

The shop data creation screen 820 shows shop data (the shop ID and the shop name) on one shop in the indication area 824 as a result of a specified search. If the search result includes shop data on a plurality of shops, the indication area 824 shows the shop data on individual shops in separate rows.

The EDIT button 825 provided in the indication area 824 is to edit the shop data displayed in the corresponding indication area 824. The DELETE button 826 provided in the indication area 824 is to delete the shop data displayed in the corresponding indication area 824.

Figure 11B:
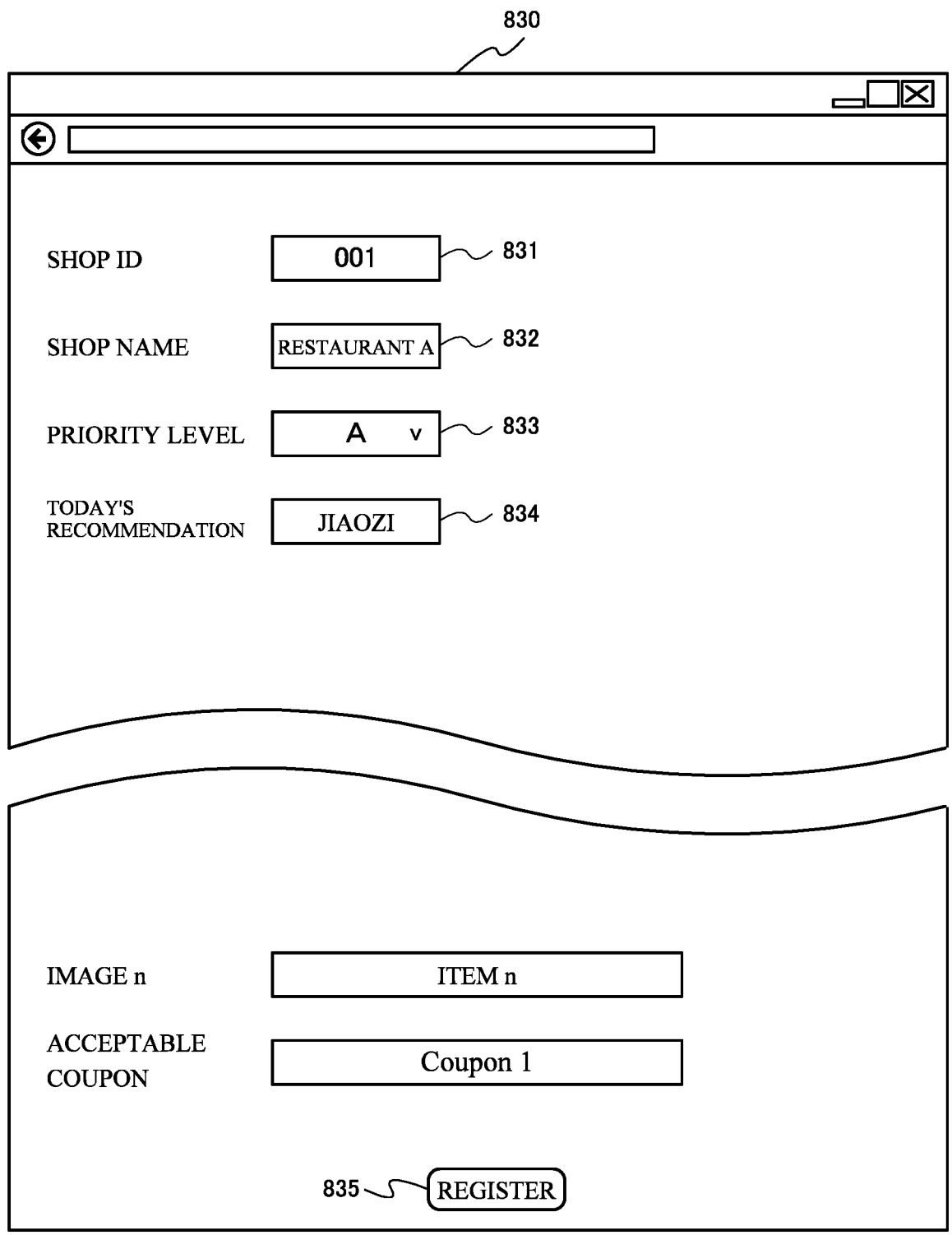
FIG. 11B is a diagram for illustrating an example of a shop data management screen.

FIG. 11B is a diagram for illustrating an example (shop data management screen 830) of shop data management screen to add or update shop data in the shop database. The shop data management screen 830 is a screen displayed in response to press of the ADD button 823 in the shop data creation screen 820. The shop data management screen 820 is also displayed in response to press of the EDIT button 825 to edit existing shop data.

The shop data management screen 830 includes a shop ID indication area 831, a shop name entry area 832, a priority level entry area 833, a today's recommendation entry area 834, and a REGISTER button 835.

The shop ID indication area 831 is a display area to indicate a shop ID. The shop ID is automatically assigned in creating new shop data and cannot be changed.

The shop name entry area 832 is provided below the shop ID indication area 831. The shop name entry area 832 is an area to input the name of a shop.

The priority level entry area 833 is provided below the shop name entry area 832. The priority level entry area 833 is an area to input (set) a priority level (an example of filtering information) so as to provide shop data on a specific shop at a high priority in the shop data on a plurality of shops.

Five priority levels of "A", "B", "C", "D", and "E" are defined for priority (an example of the order of displaying shop data on the LCD). The priority level A is the highest and the priority level E is the lowest. Note that the priority levels are not limited to these. For example, the number of priority levels can be either less than or more than five. Shop data not assigned a priority level may be included.

The today's recommendation entry area 834 is provided below the priority level entry area 833. The today's recommendation entry area 834 is an area for the shop to input an item they want to recommend to the users.

The REGISTER button 835 is provided on the bottom of the shop data management screen 830. In response to press of the REGISTER button 835, the information entered in the entry boxes such as the shop name entry area 832 is reflected to the shop database.

FIG. 12 is a diagram for illustrating an example of data (shop data) stored in the shop database. Each record of shop data includes information such as a shop ID, a shop name, a priority level, a today's recommendation, and a location.

As described above, the shop data is added, altered, and deleted through the shop data creation screen 820 and the shop data management screen 830.

The column of images stores the file names (e.g., "picture 1-1") of image files. The image files are stored in a predetermined storage area such as the external storage device 1404.

[Creation of Knowledge Database]

Figure 13A:
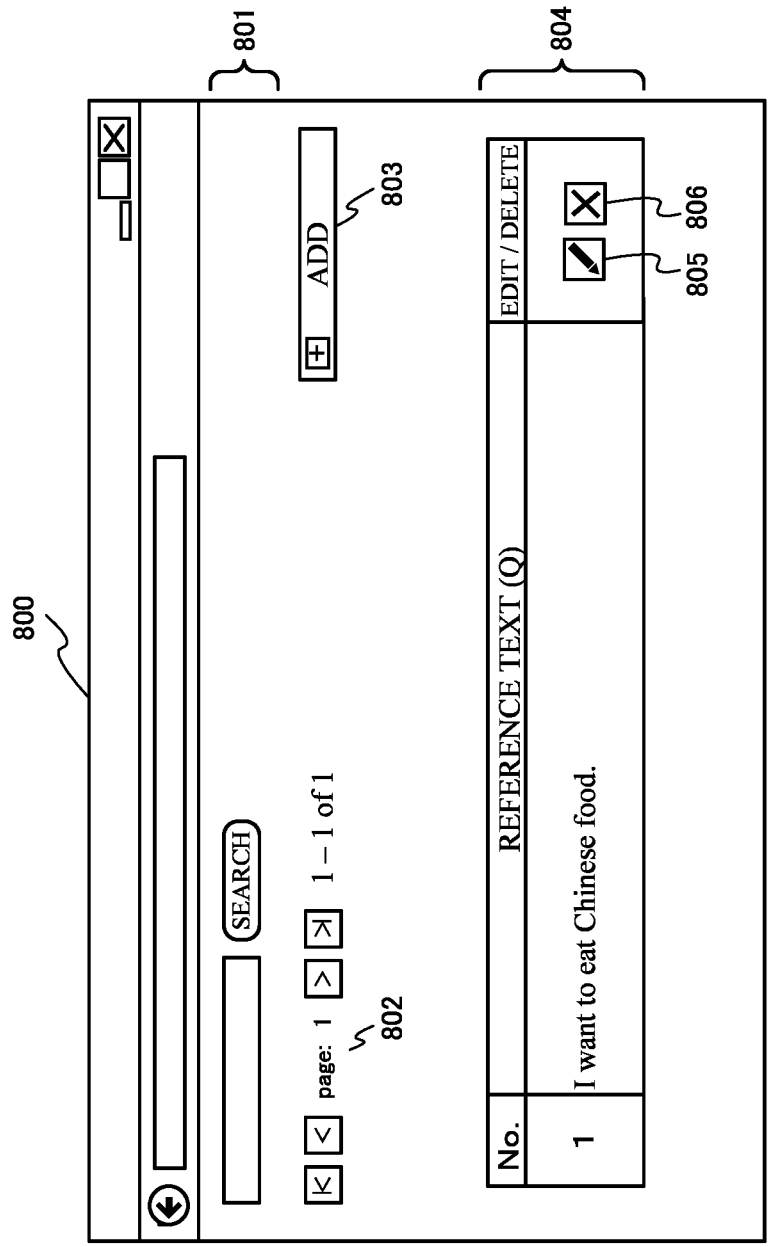
FIG. 13A is a diagram for illustrating an example of a knowledge data creation screen.

FIG. 13A is a diagram for illustrating an example (knowledge data creation screen 800) of a knowledge data creation screen to be used to create a knowledge database. The dialogue server 1 controls a display device to display the knowledge data creation screen 800 and knowledge data configured through the knowledge data creation screen 800 is stored to a knowledge database.

The knowledge data creation screen 800 is displayed in response to selection of a menu "create knowledge database" in the service menu of the dialogue system 1000.

The knowledge data creation screen 800 includes a search instruction area 801 for specifying a reference text (hereinafter referred to as Q as necessary) stored in the knowledge database, a search result jump instruction area 802 for indicating the page position of the displayed search result within the search result list and for specifying the page where to jump in the search result list, an ADD button 803 to add a new Q, and an indication area 804 for showing a result of the searching the Qs.

The knowledge data creation screen 800 shows one Q, "I want to eat Chinese food." in the indication area 804 as a result of a specified search. If a plurality of Qs are hit, the indication area 804 shows the Qs in separate rows.

The EDIT button 805 provided in the indication area 804 is to edit the Q displayed in the corresponding indication area 804. The DELETE button 806 provided in the indication area 804 is to delete the Q displayed in the corresponding indication area 804.

Figure 13B:
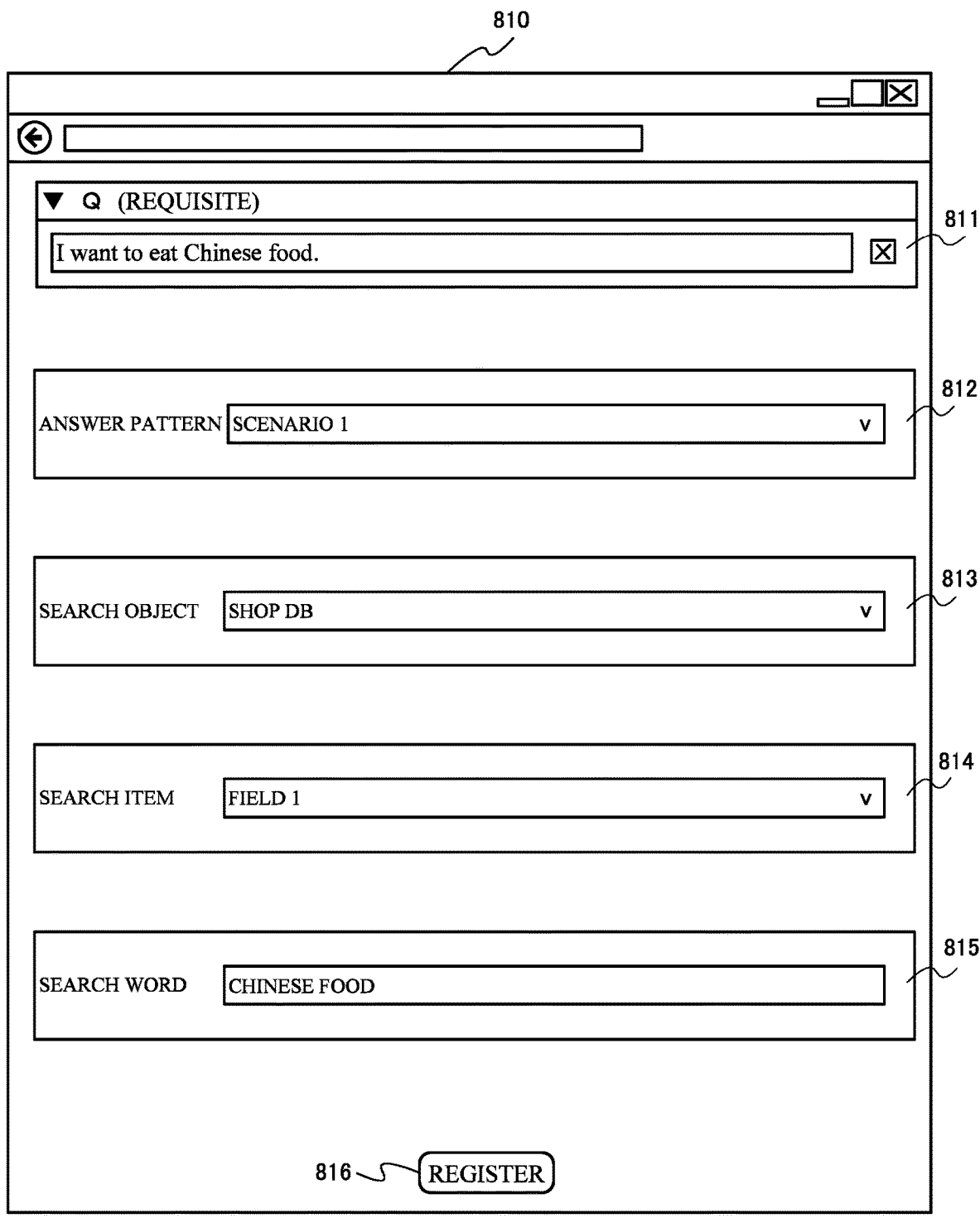
FIG. 13B is a diagram for illustrating an example of a knowledge data management screen.

FIG. 13B is a diagram for illustrating an example (knowledge data management screen 810) of knowledge data management screen to add or update knowledge data in the knowledge database. The knowledge data management screen 810 is a screen displayed in response to press of the ADD button 803 in the knowledge data creation screen 800. The knowledge data management screen 810 is also displayed in response to press of the EDIT button 805 to edit existing knowledge data.

The knowledge data management screen 810 includes a Q entry area 811, an answer pattern entry area 812, a search object entry area 813, a search item entry area 814, a search word entry area 815, and a REGISTER button 816.

The Q entry area 811 is an entry area to input a Q. The administrator enters a question or any other kind of sentence that is expected to be entered by a user to this Q entry area 811 and adds the Q so that the Q will be a hit determined to be semantically close to the input sentence in the comparison between an input sentence of a user and the Qs. The input from the user is referred to as input sentence for convenience; however, the input does not need to be a sentence and may be various types of texts, including a word or an incomplete sentence.

Synonymous sentences (semantically similar sentences or expressions) can be added to the Qs as many as desired. Such configuration can absorb fluctuations in expression among users. In other words, each of the inputs entered in various expressions by users can hit one of the Qs, so that an answer can be output effectively. The X button provided on the right of the entry area for a Q is to delete the Q.

The answer pattern entry area 812 is provided below the Q entry area 811. The answer pattern entry area 812 is an area to enter an answer pattern. There are two kinds of answer patterns: specific answers and scenarios.

The specific answers are a kind of answer patterns with which an answer is solely determined for an input (question) from a user (the dialogue will be completed by exchanging a Q and an A); the scenarios are a kind of answer patterns with which a plurality of answers can be provided (subsequent action(s) of the user are expected and the dialogue will not be completed by exchanging a Q and an A).

In other words, a specific answer is an answer pattern which is to provide one answer to a question in the dialogue and is difficult to include a recommendation in the direct answer for the user. A scenario is an answer pattern which is to provide n answers to one question in the dialogue; it is easy to include a recommendation in the direct answers for the user.

The answer pattern input area 812 is configured to provide a selection of answer patterns with a pulldown menu.

The search object entry area 813 is provided below the answer pattern entry area 812. The search object entry area 813 is an area to enter a search object. The search object is the object to be searched to acquire the information to be used for the answer to the user and could be the shop DB (shop database), other server information (information owned by the other servers), and complex information (combination of information of the shop database, other server information, and other information). The search object may not be required depending on the way to store the data or the data processing method).

The search object entry area 813 is configured to provide a selection of search objects with a pulldown menu.

The search item entry area 814 is provided below the search object entry area 813. The search item entry area 814 is an area to enter a search item. The search item is to specify the item to be searched in the search object.

The search item entry area 814 is configured to provide a selection of search items with a pulldown menu.

The search word entry area 815 is provided below the search item entry area 814. The search word entry area 815 is an area to enter a search word. The search word is to specify the word to be searched for in the search item.

The REGISTER button 816 is provided on the bottom of the knowledge data management screen 810. Upon press of the REGISTER button 816, the information entered in the entry areas such as the Q entry area 811 is reflected to the knowledge database.

FIG. 14 is a diagram for illustrating an example of data (knowledge data) stored in the knowledge database. Each record of knowledge data includes information of a reference text Q, an answer pattern, a search object, a search item, and a search word.

As described above, the knowledge data is added, altered, and deleted through the knowledge data creation screen 800 and the knowledge data management screen 810.

FIG. 15 is a diagram for illustrating an example of data (answer templates) stored in the answer template database.

An answer template is an example of a response template and is configured to be able to create response data for providing a response to a question (input) from a user.

The answer template is composed of fixed part(s) including a fixed text and merge field(s) to be replaced by a search result. The merge fields are denoted in angle brackets ("<" and ">") for convenience of explanation.

Each record of the answer template database stores information of a template ID, an answer pattern, conditions to be selected, and information on answer templates.

For a specific answer, the substances of the answer templates are stored; for a scenario, the file names of the answer templates are stored. The answer templates are stored in a predetermined storage area in the external storage device 1404, for example. The answer template database may be configured to have a data structure in which the substances of the answer templates are stored for scenarios.

Taking an example of the first column (first item) for "Specific Answer 1", the answer template consists of a fixed text "The open hours are" and a merge field "<Field 10>". The merge field <Field 10> means that the information of Field 10 in the shop data (e.g., 10:00-0:00) is acquired and merged.

Furthermore, a plurality of answer templates may be prepared as shown in the second and the third columns for Specific Answer 1; these templates may be selected by rotation or by lottery to avoid providing uniform answers. This configuration enables more natural dialogues.

FIGS. 16A to 16F are examples of answer templates for a scenario answer (answer templates for Scenario 1). Although answer templates are prepared for other scenarios, they are omitted in the drawings.

FIG. 16A is a view of an example of an answer template to be used when the number of hits extracted as a result of searching the shop data in accordance with the inputs of a user is more than a predetermined number (in this example, three).

For example, <Number of hits> is replaced by the number of extracted results.

The field <First shop> is replaced by the information of the shop name in the first shop data (on the first shop to be listed) obtained by sorting the extracted results. The field <First Image_1> is replaced by the Image_1 (a basic photo such as a representative photo showing the appearance of the shop) of the first shop to be listed.

The field <Second shop> is replaced by the information of the shop name in the second shop data (on the second shop to be listed) obtained by sorting the extracted results. The field <Second Image_1> is replaced by the Image_1 (a basic photo) of the second shop to be listed.

The field <Third shop> is replaced by the information of the shop name in the third shop data (on the third shop to be listed) obtained by sorting the extracted results. The field <Third Image_1> is replaced by the Image_1 (a basic photo) of the third shop to be listed.

The field <Icon_1-1: Reserve> is replaced by an icon linked to the page for making reservation for the first shop to be listed. The field <Icon_2-1: More details> is replaced by an icon linked to the page including the details of the first shop to be listed.

The field <Icon_1-2: Reserve> is replaced by an icon linked to the page for making reservation for the second shop to be listed. The field <Icon_2-2: More details> is replaced by an icon linked to the page including the details of the second shop to be listed.

The field <Icon_1-3: Reserve> is replaced by an icon linked to the page for making reservation for the third shop to be listed. The field <Icon_2-3: More details> is replaced by an icon linked to the page including the details of the third shop to be listed.

The field <Icon_3: More shops> is replaced by an icon linked to the page including information on three more shops following the shops on the current screen.

It should be noted that the user interface is not limited to icons but may be buttons, hypertexts, or other forms. Any user interface that accepts selection of an object and an instruction for processing through the operating screen can be employed as appropriate.

A message recommending shops and asking for a reaction (that is to say, a proposal message in an interrogative sentence or a tag question) is added: for example, "Here are popular restaurants in recent days. How do you like these restaurants?" In the case of using such a message, although the user is directed by the administrator, the final decision is left to the user. As a result, the user can have good impression by feeling that the user has selected the restaurant by himself or herself. This style of dialogue can direct the user more naturally.

FIG. 16B is a view of an example of an answer template to be used when the number of hits extracted as a result of searching the shop data in accordance with the inputs of a user is not more than a predetermined number (in this example, three).

Depending on the extraction results, the fields of <Second shop name>, <Second Image_1>, <Icon 1-2: Reserve>, <Icon 2-2: More details>, and <Third shop name>, <Third Image_1>, <Icon 1-3: Reserve>, <Icon 2-3: More details> are not used (displayed).

FIG. 16D is a view of an example of an answer template to be used when the RESERVE icon of a shop which is not recommended is pressed.

The field <Shop name> is replaced by the information of the shop name of the unrecommended shop. The field <Today's recommendation> is replaced by the information on the today's recommendation of the not-recommended shop.

The field <Recommended shop name> is replaced by the information of the shop name of the recommended shop (the shop assigned a priority level A). The recommended shop is not limited to the shop assigned a priority level A. For example, the first shop in the list may apply.

FIG. 16C is a view of an example of an answer template to be used when the MORE DETAILS icon is pressed. FIG. 16E is a view of an example of an answer template to be used when the RESERVE icon is pressed. FIG. 16F is a view of an example of an answer template to be used when the HERE icon is pressed. Regarding the field <print: PRINT>, whether the apparatus being used (in this example, a kiosk terminal 200) is capable of printing is determined and if the apparatus is capable of printing, the field <print: PRINT> is replaced by a PRINT icon.

It should be noted that the user interface is not limited to icons but may be buttons or hypertexts. Any user interface that accepts selection of an object and an instruction for processing through the operating screen can be employed as appropriate.

FIG. 17 is a diagram for illustrating an example of a weight determination table. In the weight determination table, shops are specified correspondingly to available seats. The shops are updated with appropriate timing (for example, periodically or in real time). In the present embodiment, the dialogue server 1 makes an inquiry about the availability to the shop server in each shop with predetermined intervals (for example, five minutes) and updates the weight determination table based on the results.

Basically, as the number of available seats is greater, the weight (priority) becomes higher. In this example, three weights are provided and when six or more seats are available, the shop is weighted the highest.

[History Information]

FIGS. 18A to 18C are diagrams for illustrating examples of history tables for storing histories of different kinds of information.

FIG. 18A is a diagram for illustrating an example of an input history table. The input history table stores pairs of an input sentence and a hit reference text ID. The input history table is updated in response to an operation of input (execution of semantic recognition processing).

FIG. 18B is a diagram for illustrating an example of a reservation history table. The reservation history table stores reserved date and time and a reserved shop together with a user ID. The reservation history table is updated in response to making a reservation (press of the HERE icon).

FIG. 18C is a diagram for illustrating an example of a recommendation history table. The recommendation history table stores information on the date and the time of recommendation together with a shop ID. The recommendation history table is updated based on making a recommendation.

The history information enables analysis about what question is asked frequently or how many times of providing a recommendation have led to how many reservations, so that the knowledge database can be created efficiently.

The history information can be utilized as marketing information.

Figure 19:
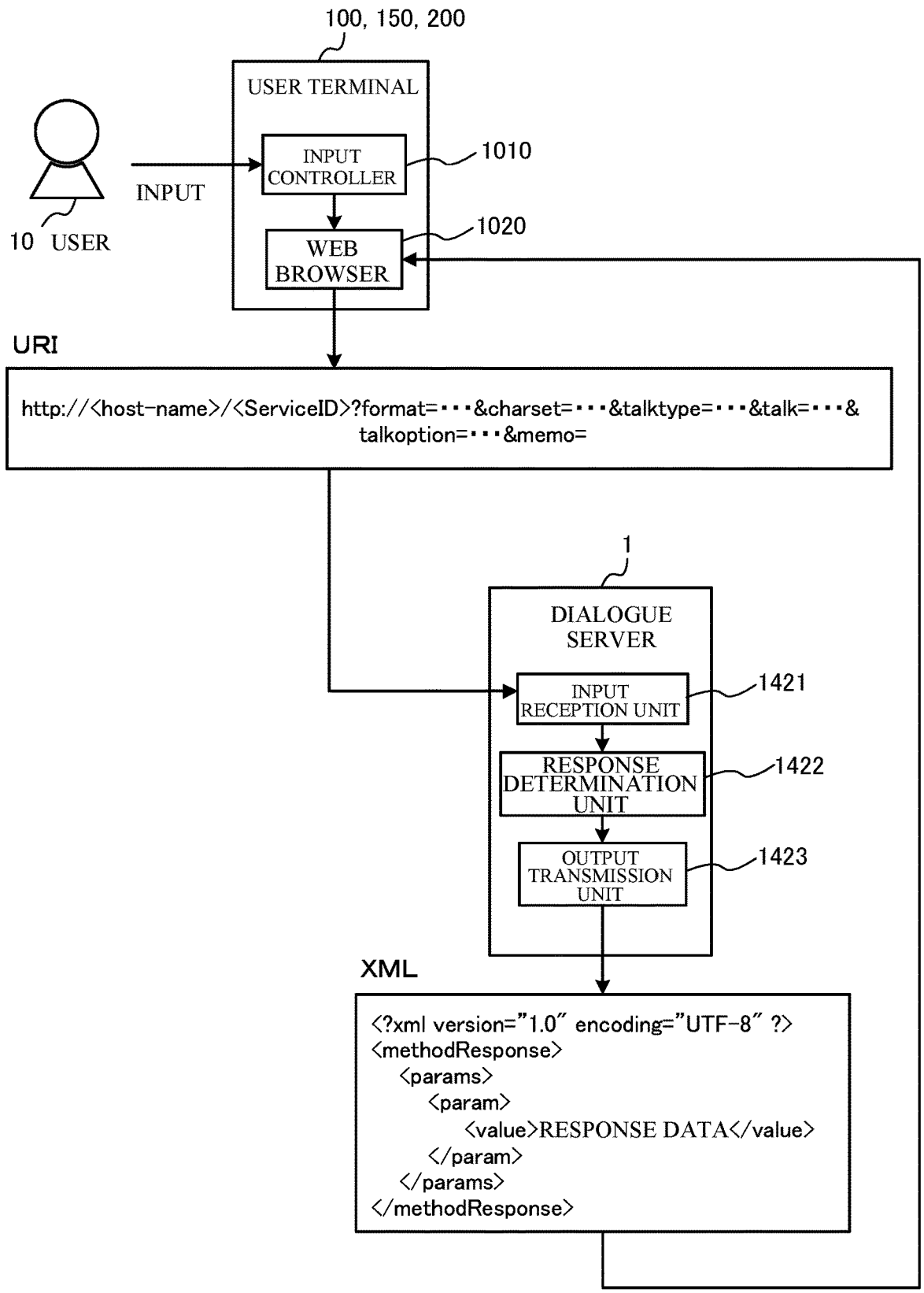
FIG. 19 is a diagram for illustrating an example of an API between a user terminal and the dialogue server.

FIG. 19 is a diagram for illustrating an example of an API (Application Programming Interface) between a user terminal and the dialogue server 1.

In a user terminal, an input from a user 10 is provided to a web browser 1020 via an input controller 1010. The web browser 1020 creates a URI (Uniform Resource Identifier) including the input of the user 10 and sends out the URI using HTTP.

The URI is described, as shown in FIG. 19, starting from "http://" and being followed by <host-name>, which is a host name or an IP address of the dialogue server 1 including a dialogue engine. The subsequent <ServiceID> is an ID for identifying the service provided by the dialogue system 1000; for example, the <ServiceID> is an ID for identifying the data to be used.

Subsequent to the <ServiceID>, request parameters connected by "?" are described. Individual request parameters are separated by "&". In the example of FIG. 19, "format=" is followed by designation of the format of the return value. In the case of designation of "json", a response in JSON format can be received; in the case of designation of "xml", a response in XML format can be received.

Subsequent to "charset=", an encoding format of the return value, such as UTF-8, EUC-JP, or Shift-JIS, is specified. Subsequent to "talktype=", the type of the input sentence to be sent to the dialogue system 1000 is specified. For example, a normal input is specified as 0 and the start of a dialogue is specified as 3. Subsequent to "talk=", the input sentence itself entered by the user 10 is described.

Subsequent to "talkoption=", predetermined information to be used by the dialogue server 1 is specified. To append some memo to the input sentence, a text can be specified subsequent to "memo=". The employment of such a text enables necessary information to be stored in the log data, for example.

A session is usually held using cookie information in the user terminal. However, in the case of a device configured not to use cookie or a cell phone that does not manage sessions with cookie, the URI can be structured to include session information.

The data included in the URI is sent in the form of an HTTP request to the dialogue server 1 in accordance with the <host-name> specified in the URI and the input reception unit 1421 of the dialogue server 1 receives the data. Subsequently, the response determination unit 1422 determines a response based on the data. The determined response is generated in the form of XML data (if "format=xml" is described for the return value). The output transmission unit 1423 sends the generated XML data to the user terminal.

In the XML data shown in FIG. 19, the response data is defined with a tag <value>.

This XML data is sent by the output transmission unit 1423 of the dialogue server 1 to the web browser 1020 of the user terminal in the form of an HTTP response and the web browser 1020 displays the response data.

To display information in a predetermined display area, the information to be displayed in the display area is defined with a specific tag and sent to the web browser 1020. The web browser 1020 interprets the tag and controls the display device to display the information in the display area. For example, to change a character in a predetermined display area, the image data to be used as the character should be defined with a specific tag.

FIG. 19 illustrates a configuration that the user terminal includes the host name of the dialogue server 1, a service provided by the dialogue system 1000, and request parameters in a URI to send a request to the dialogue server 1; however, this configuration is merely an example. The same processing can be performed using various ways, such as by using Java Script™.

For example, the user enters a text to an entry area of a specific web page displayed by the web browser 1020 run on the user terminal through a user interface (for example, by using a keyboard or a touch panel). The text entered by the user typically takes the form of a sentence (input sentence) including, for example, a question about a shop in the facility and is expressed in a natural language.

The text entered by the user is provided to the dialogue server 1 via the network by the web browser 1020 of the user terminal. The network can be a network inclusive of the Internet.

The input reception unit 1421 of the dialogue server 1 receives the text from the user terminal.

The response determination unit 1422 determines a text and images (typically, a response) to be the response to this text. More specifically, the response determination unit 1422 is capable of data communication with the knowledge database including knowledge data and determines a response suitable for the response to the input received from the user terminal using the knowledge database.

The output transmission unit 1423 sends the response to the user terminal via the network. More specifically, the output transmission unit 1423 sends the response to the user terminal so that the web browser run on the user terminal will display the response on the response display area.

As described above, when the user enters a text to the entry area of a web page, a response answering the text is displayed in the response display area of the web page. For example, when a user enters a question about a shop to the entry area of the web page, an answer to the question is displayed in the response display area of the web page.

In the present embodiment, the user places a question to the dialogue server 1 by entering a text to an entry area of a website through the user interface (e.g., a keyboard); however, the dialogue system 1000 accepts a text entered in any way or via any route.

For example, the user may issue a question in speech; the speech can be converted into a text by speech recognition processing and the obtained text can be provided to the control device 54. For another example, a printed question can be converted into a text by OCR (Optical Character Recognition) and the obtained text can be provided to the control device 54.

It should be noted that the dialogue server 1 in the present embodiment has a function of a web server that communicates data with the web browsers run on the signage apparatuses A 100, the signage apparatuses B 150, and kiosk terminals 200 using some protocol such as HTTP to display a predetermined web page on the web browsers.

Although the dialogue server 1 is described as a single computer, the dialogue server 1 can be implemented by distributing the functions to a plurality of computers. As to the databases, the stored data can also be divided in accordance with various policies and distributed to a plurality of sites or computers.

Figure 20:
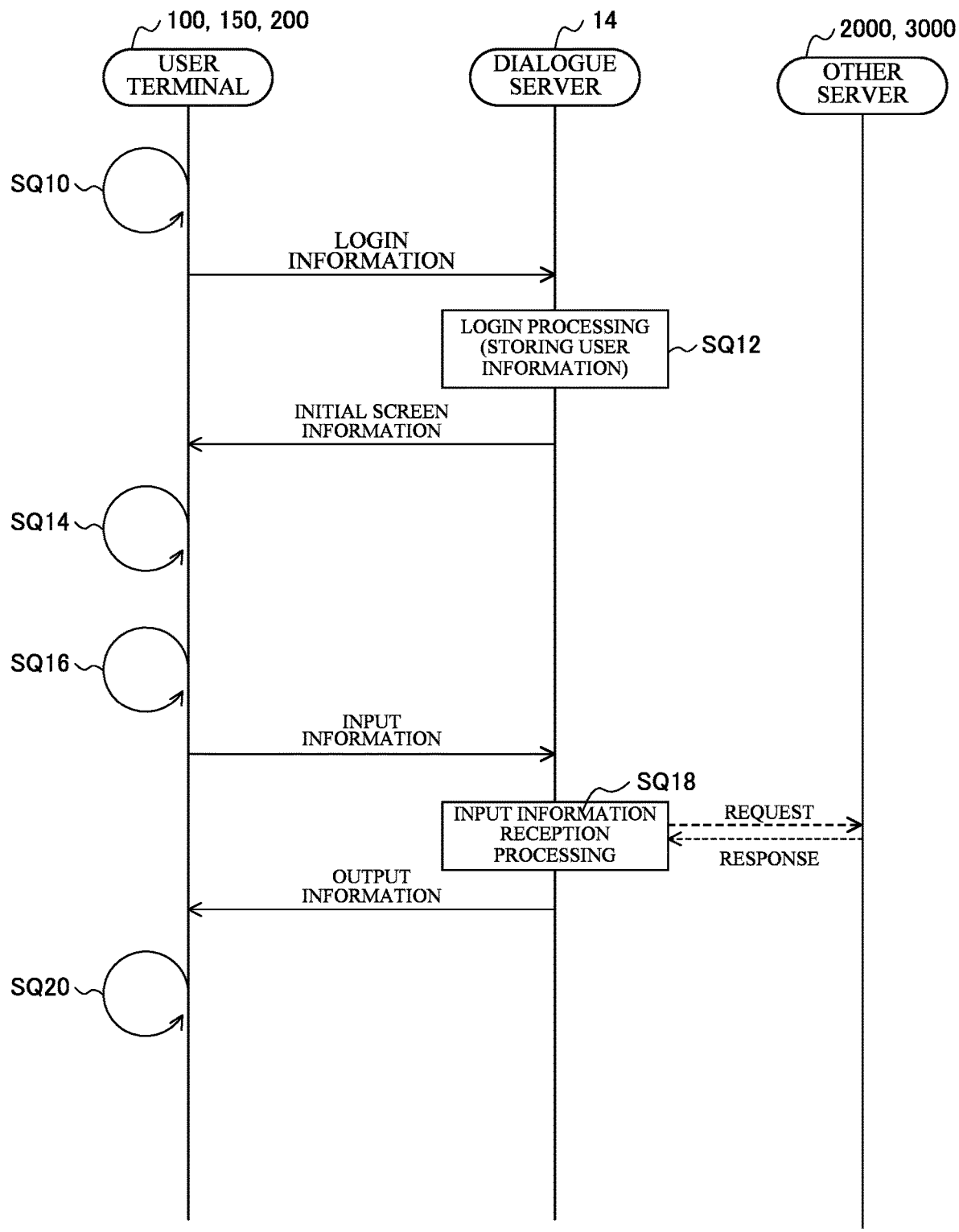
FIG. 20 is a diagram for illustrating an example of a sequence of processing in the dialogue system.

FIG. 20 is a diagram for illustrating an example of a sequence of processing in the dialogue system 1000.

In response to login entry on the user terminal (SQ10), the login information is sent to the dialogue server 1. More specifically, the user terminal retrieves user information (e.g., a user ID) stored in an IC card with a touch unit and creates login information. The terminal ID of the user terminal is sent together with the login information.

The login entry is not a requisite; the login entry may not be performed when the user does not have an IC card.

At SQ12, the dialogue server 1 conducts login processing. In the login processing, the dialogue server 1 stores the login information (e.g., the user ID) to a predetermined storage area, creates initial screen information for the user, and sends the initial screen information to the user terminal.

In the login processing, the dialogue server 1 further sends the user ID to the member management server 13, acquire a variety of information (age, sex, and the like) associated with the user ID, and stores the information to a predetermined storage area. A part or all of the variety of information associated with the user ID may be included in the IC card.

The dialogue server 1 further determines in the login processing whether the user terminal that has sent the login information has a printing function (printer device). More specifically, the dialogue server 1 acquires information on presence of a printing function associated with the terminal ID with reference to a terminal management database (not shown). If determining that the user terminal has a printing function, the dialogue server 1 sets a print flag to ON and if not determining, sets the print flag to OFF.

At SQ14, the user terminal receives initial screen information and displays an initial screen information to receive an input from the user. For example, the CPU 121 of a signage apparatus A outputs an instruction to display the initial screen on the LCD 103 to the LCD controller 130 (e.g., a graphic board). The LCD controller 130 creates image information for the initial screen and outputs the information to the LCD 103. The LCD 103 displays an initial screen based on the received image information. Before displaying the initial screen, the LCD 103 displays a screen for an anonymous user; this screen also accepts an input from the user.

At SQ16, upon receipt of an input (question) from the user, the user terminal sends input information including the information on the input (question) to the dialogue server 1.

At SQ18, the dialogue server 1 conducts input information reception processing. In the input information reception processing, the dialogue server 1 communicates with other servers based on the input information as necessary, determines a response to the input, creates output information including the response, and sends the output information to the user terminal.

At SQ20, the user terminal receives the output information and displays the output information.

[Description of Program to be Executed by Dialogue Server]

Next, processing (a program) performed by the dialogue server 1 is described with reference to FIGS. 21 to 29.

Figure 21:
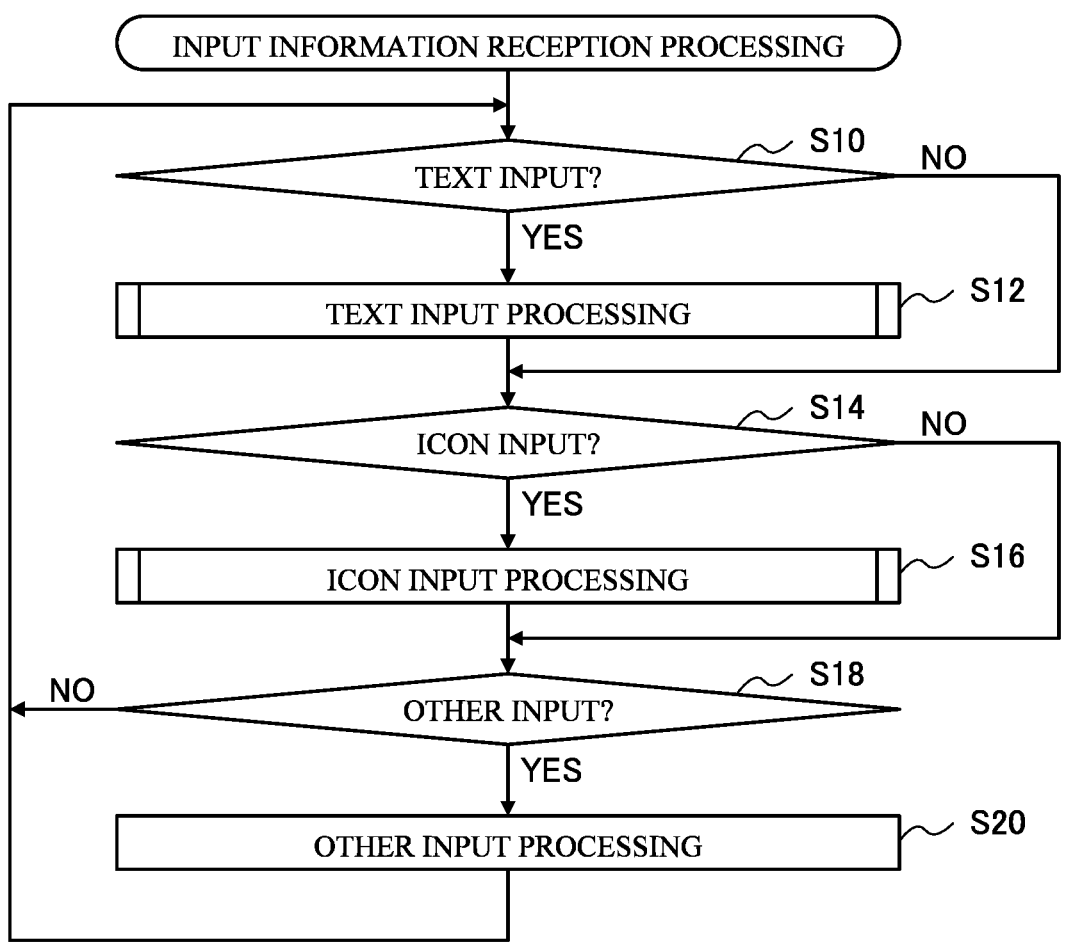
FIG. 21 is an example of a flowchart of input information reception processing.

FIG. 21 is an example of a flowchart of input information reception processing.

At S10, the CPU 1401 determines whether the received input information has been placed by entry to a text box (text input). The CPU 1401 proceeds to S12 if determining that the received input information has been placed by text input and proceeds to S14 if not determining that the received input information has been placed by text input.

At S12, the CPU 1401 performs text input processing. The CPU 1401 interprets the input from the user, performs processing associated with the interpretation, and sends the processing result to the user terminal as output information. Upon completion of this processing, the CPU 1401 proceeds to S14. This processing will be described later in detail.

At S14, the CPU 1401 determines whether the received input information has been placed by press of an icon (icon input). The CPU 1401 proceeds to S16 if determining that the received input information has been placed by icon input and proceeds to S18 if not determining that the received input information has been placed by icon input.

At S16, the CPU 1401 performs icon input processing. The CPU 1401 performs processing associated with the icon, and sends the processing result to the user terminal as output information. Upon completion of this processing, the CPU 1401 proceeds to S18. This processing will be described later in detail.

At S18, the CPU 1401 determines whether the received input information has been placed by other input (an instruction to display information for members, an instruction to display information, or an instruction to change settings of a user terminal). Examples of the information for members include membership information, coupons and rewards, and raffle tickets. Examples of the information to be displayed include a phone book, information on the facilities, an operating manual for the user terminal, and privilege of membership. Examples of settings of a user terminal include the sound volume and the language.

The CPU 1401 proceeds to S20 if determining that the received input information has been placed by other input and returns to S10 if not determining that the received input information has been placed by other input.

At S20, the CPU 1401 performs other input processing. For example, the CPU 1401 performs processing associated with the other input, and sends the processing result to the user terminal as output information. Upon completion of this processing, the CPU 1401 returns to S10.

Figure 22:
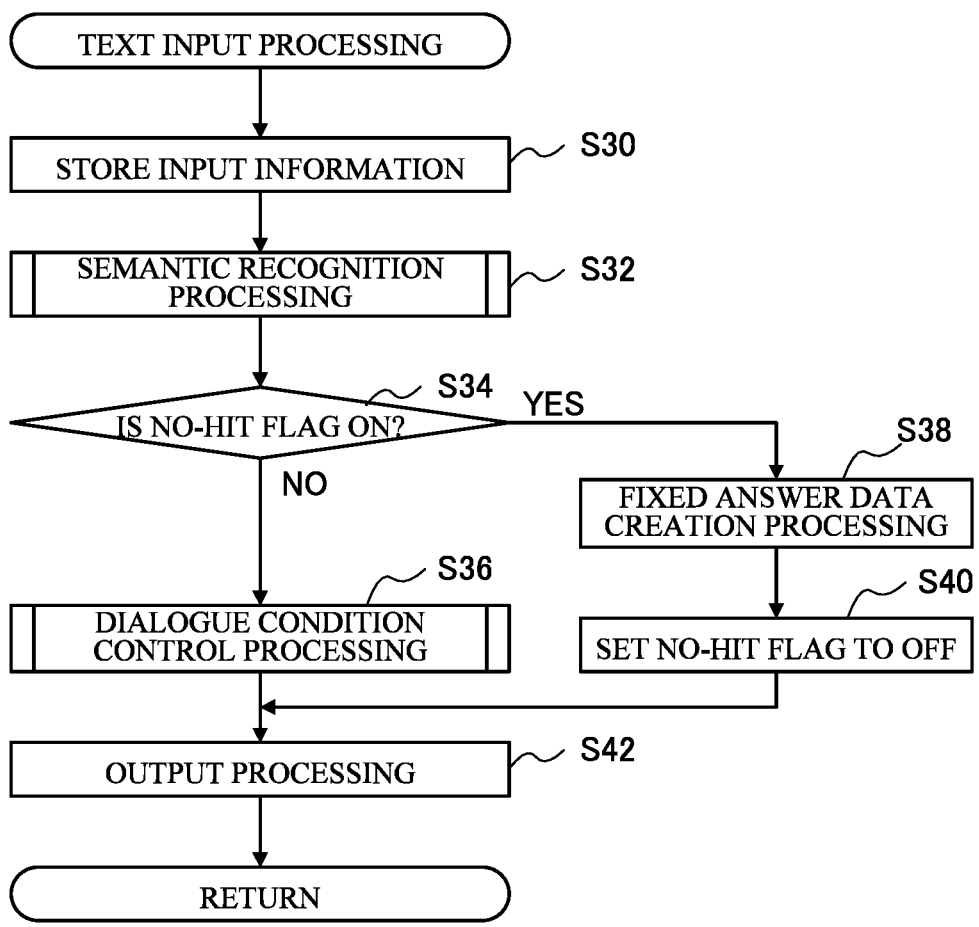
FIG. 22 is an example of a flowchart of text input processing.

FIG. 22 is an example of a flowchart of the text input processing.

At S30, the CPU 1401 stores the input information (e.g., an input sentence) to a predetermined storage area of the RAM 1403 and proceeds to S32.

At S32, the CPU 1401 performs semantic recognition processing. In the semantic recognition processing, the CPU 1401 interprets the input sentence, determines an answer pattern, and identifies a subject (topic) of the dialogue. If determining that answering based on an answer pattern is unavailable, the CPU 1401 sets a no-hit flag to ON. Upon completion of this processing, the CPU 1401 proceeds to S34. This processing will be described later in detail.

At S34, the CPU 1401 determines whether the no-hit flag is ON. The CPU 1401 proceeds to S38 if determining that the no-hit flag is ON and proceeds to S36 if not determining that the no-hit flag is ON. The no-hit flag is a flag for identifying whether to provide a fixed answer in the case of determination that answering based on an answer pattern is unavailable.

At S36, the CPU 1401 performs dialogue condition control processing. In the dialogue condition control processing, the CPU 1401 acquires a variety of information and creates response data based on the answer pattern. Upon completion of this processing, the CPU 1401 proceeds to S42. This processing will be described later in detail.

At S38, the CPU 1401 performs fixed answer data creation processing. For example, the CPU 1401 stores data including a fixed answer to ask for re-entry (e.g., "Sorry, your question cannot be answered. Would you place your question in a different expression?") to the storage area for the response.

A plurality of fixed answers may be provided. Such configuration enables the dialogue to use various expressions.

At S40, the CPU 1401 sets the no-hit flag to OFF and proceeds to S42.

At S42, the CPU 1401 performs output processing. More specifically, the CPU 1401 retrieves the data (including a response, HTML data, and image data) stored in the storage area for the response and sends the retrieved information to the user terminal that has requested the response as output information.

Figure 23:
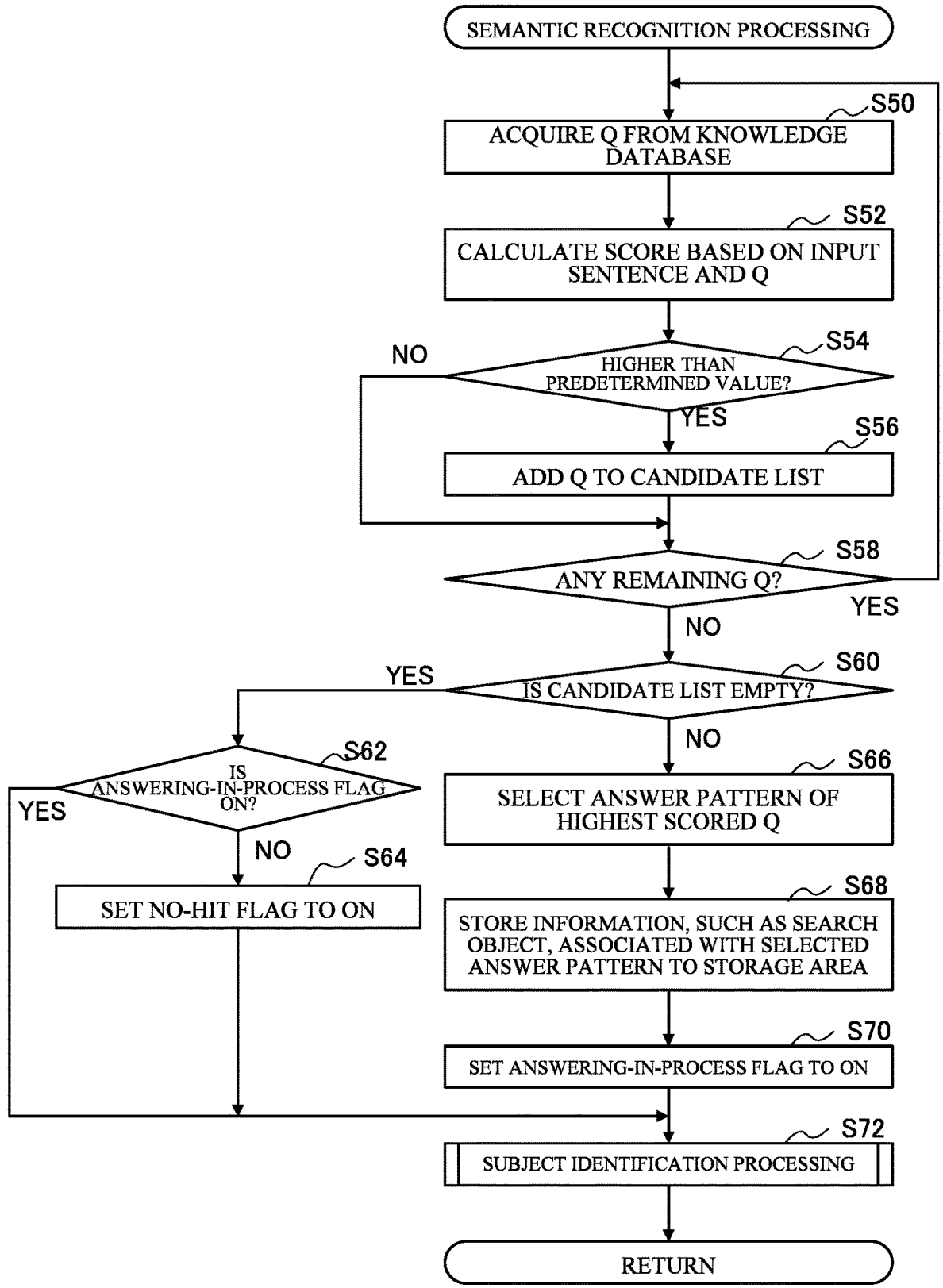
FIG. 23 is an example of a flowchart of semantic recognition processing.

FIG. 23 is an example of a flowchart of the semantic recognition processing.

At S50, the CPU 1401 acquires a reference text Q that has not been compared with the received input information (input sentence) from the knowledge database.

This example of processing compares all the reference texts stored in the knowledge database with the received input information (input sentence); however, preparatory processing to narrow down the reference texts through preliminary processing or referring to the categories, indices, or other type of indicators associated with the reference texts can be employed.

At S52, the CPU 1401 calculates a score representing the semantic closeness between the input information (input sentence) and the acquired reference text Q.

The semantic closeness means the degree of similarity between texts or sentences; the semantic distance between two sentences is represented by a score using various known methods including morphological analysis and vector space method. The present embodiment can employ various methods to determine the semantic closeness.

At S54, the CPU 1401 determines whether the calculated score is higher than a predetermined value. The CPU 1401 proceeds to S56 if determining that the calculated score is higher than the predetermined value and proceeds to S58 if not determining that the calculated score is higher than the predetermined value.

At S56, the CPU 1401 stores the reference text Q together with the score to a predetermined storage area in the RAM 1403 (adds the reference text Q to a candidate list) and proceeds to S58.

At S58, the CPU 1401 determines whether any reference text Q (remaining Q) that has not been compared exists. The CPU 1401 proceeds to S50 if determining that at least one remaining Q exists and proceeds to S60 if determining that no remaining Q exists.

At S60, the CPU 1401 determines whether the candidate list is empty. The CPU 1401 proceeds to S62 if determining that the candidate list is empty and proceeds to S66 if not determining that the candidate list is empty.

At S62, the CPU 1401 determines whether the answering-in-process flag is ON. The CPU 1401 proceeds to S72 if determining that the answering-in-process flag is ON and proceeds to S64 if not determining that the answering-in-process flag is ON. The answering-in-process flag is a flag for identifying whether answering the input from a user is continued (whether the answering is in process).

At S64, the CPU 1401 sets the no-hit flag to ON and proceeds to S72.

At S66, the CPU 1401 selects the answer pattern associated with the highest-scored Q in the candidate list and proceeds to S68.

At S68, the CPU 1401 stores the search object, the search item, and the search word for the identified answer pattern to a predetermined storage area of the RAM 1403 and proceeds to S70.

At S70, the CPU 1401 sets the answering-in-process flag to ON and proceeds to S72.

At S72, the CPU 1401 performs subject identification processing. In the subject identification processing, the CPU 1401 identifies the subject (topic) of the dialogue based on the latest input sentence and previous input sentence(s). This processing will be described later in detail. Upon completion of this processing, the CPU 1401 exits the semantic recognition processing.

Figure 24:
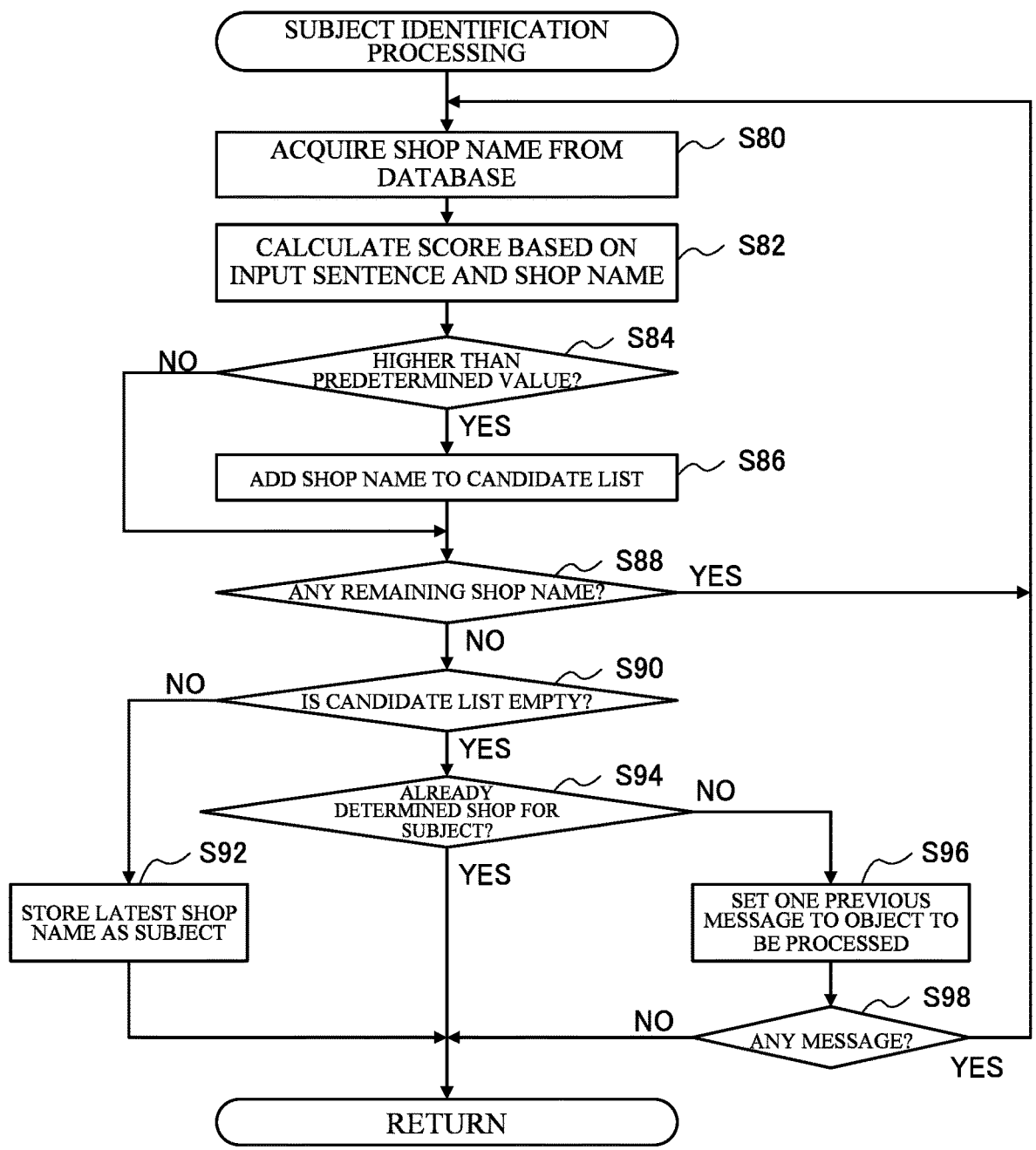
FIG. 24 is an example of a flowchart of subject determination processing.

FIG. 24 is an example of a flowchart of the subject identification processing.

At S80, the CPU 1401 acquires a shop name that has not been compared from the shop database and proceeds to S82.

At S82, the CPU 1401 calculates a score representing the distance between the input sentence and the acquired shop name based on the input sentence and the shop name. The method of calculating the score may be the same as or different from the method used at S52. Upon completion of this processing, the CPU 1401 proceeds to S84.

At S84, the CPU 1401 determines whether the calculated score is higher than a predetermined value. The CPU 1401 proceeds to S86 if determining that the calculated score is higher than the predetermined value and proceeds to S88 if not determining that the calculated score is higher than the predetermined value.

At S86, the CPU 1401 stores the shop name together with the score to a predetermined storage area in the RAM 1403 (adds the shop name to a candidate list) and proceeds to S88.

At S88, the CPU 1401 determines whether any shop name (remaining shop name) that has not been compared exists. The CPU 1401 returns to S80 if determining that some remaining shop name exists and proceeds to S90 if determining that no remaining shop name exists.

At S90, the CPU 1401 determines whether the candidate list is empty. The CPU 1401 proceeds to S94 if determining that the candidate list is empty and proceeds to S92 if not determining that the candidate list is empty.

At S92, the CPU 1401 stores the latest shop name to a predetermined storage area of the RAM 1403 as the subject shop. The latest shop name means the shop name that came up (was input) most lately in the input sentences of the user in the case where the list includes a plurality of candidates. Upon completion of this processing, the CPU 1401 exits the subject identification processing.

At S94, the CPU 1401 determines whether the subject shop has already been identified (whether the information on the subject shop has already been stored). If determining that the subject shop has been identified, the CPU 1401 exits the subject identification processing and if not determining the subject shop has been identified, the CPU 1401 proceeds to S96.

At S96, the CPU 1401 sets the shop name in the last message (either input information or output information) to the object to be processed. That is to say, the CPU 1401 reads back the dialogue from the input information currently being processed to identify the shop name that came up most lately. Upon completion of this processing, the CPU 1401 proceeds to S98.

At S98, the CPU 1401 determines whether such a message exists. If determining that such a message exists, the CPU 1401 proceeds to S80, and if not determining that such a message exists, the CPU 1401 exits the subject identification processing.

It should be noted that, in response to input of a reference term like "this shop", the subject identification processing may request confirmation of the reference term to the user to avoid breaking up the dialogue.

Figure 25:
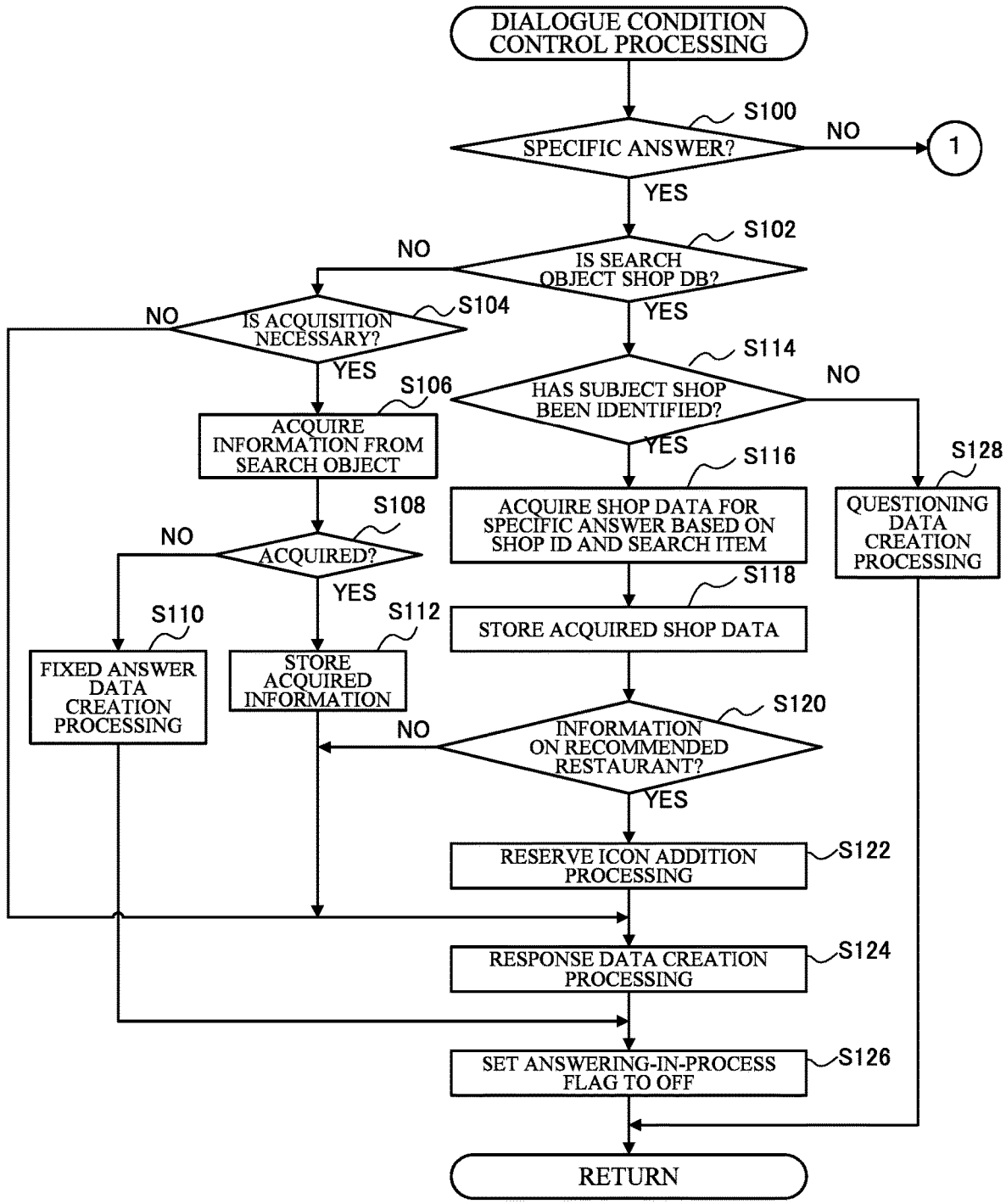
FIG. 25 is an example of a flowchart of dialogue condition control processing.
Figure 26:
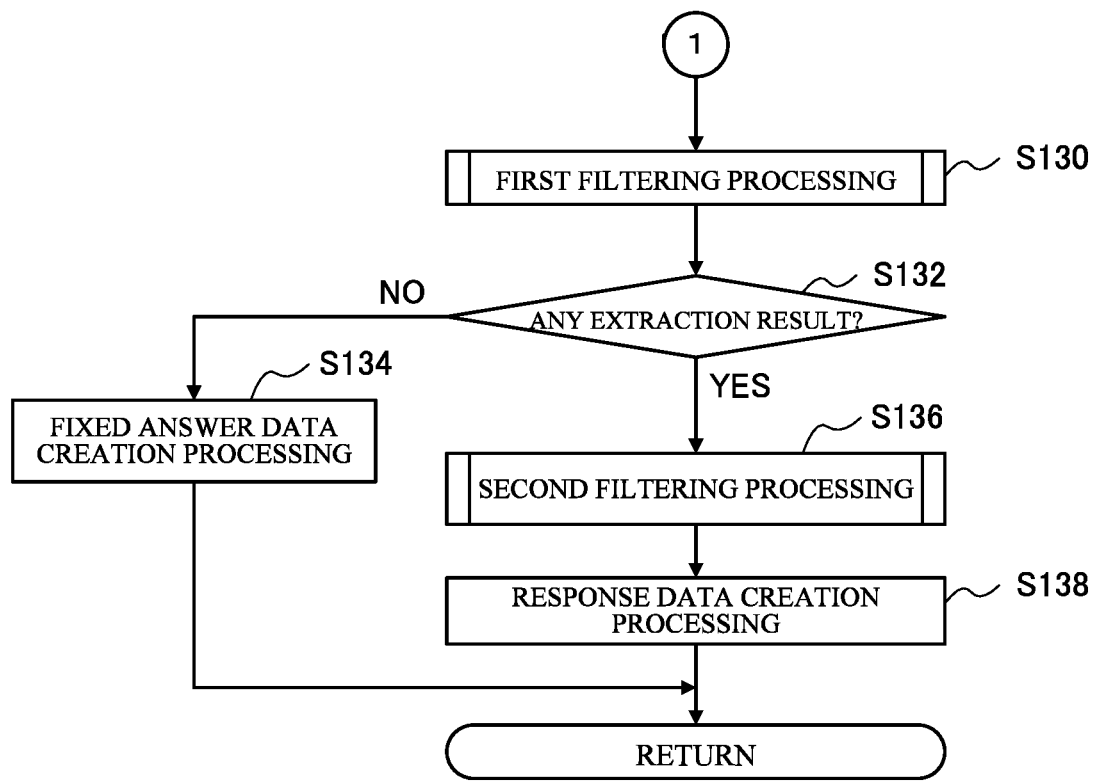
FIG. 26 is an example of a flowchart of dialogue condition control processing.

FIGS. 25 and 26 are an example of a flowchart of the dialogue condition control processing.

At S100, the CPU 1401 determines whether the determined answer pattern is a specific answer. If determining that the determined pattern is a specific answer, the CPU 1401 proceeds to S102; if not determining that the determined pattern is a specific answer, the CPU proceeds to S130 in FIG. 26.

At S102, the CPU 1401 determines whether the search object is the shop DB (shop database). If determining that the search object is the shop database, the CPU 1401 proceeds to S114; if not determining that the search object is the shop database, the CPU 1401 proceeds to S104.

At S104, the CPU 1401 determines whether acquiring information from another server is necessary. For example, if the search object is information in another server (a hotel database held by the hotel server 2000), the CPU 1401 determines that acquiring information from another server is necessary. If determining that acquiring information from another server is necessary, the CPU 1401 proceeds to S106; if not determining that acquiring information from another server is necessary, the CPU 1401 proceeds to S124.

At S106, the CPU 1401 acquires information from the search object. The CPU 1401 requests the corresponding server for information and acquires a response. For example, the CPU 1401 checks the hotel server 2000 for a vacancy and acquires information on the vacancy as of the moment (a list of information on room size, room charge, check-in time, check-out time, and whether breakfast is included or not). Upon completion of this processing, the CPU 1401 proceeds to S108.

At S108, the CPU 1401 determines whether necessary information is successfully acquired. If determining that necessary information is successfully acquired, the CPU 1401 proceeds to S112; if not determining that necessary information is successfully acquired, the CPU 1401 proceeds to S110.

At S110, the CPU 1401 performs fixed answer data creation processing. For example, the CPU 1401 stores data including a fixed answer to ask for re-entry (e.g., "Sorry, communication with the server is failed. Try again later. Do you have any other question?") to the storage area for the response.

A plurality of fixed answers may be provided. Such configuration enables the dialogue to use various expressions.

At S112, the CPU 1401 stores the acquired information to the storage area for the response in the RAM 1403 and proceeds to S124.

At S114, the CPU 1401 determines whether the subject shop has been identified. If determining that the subject shop has been identified, the CPU 1401 proceeds to S116; if not determining that the subject shop has been identified, the CPU 1401 proceeds to S128.

At S116, the CPU 1401 acquires shop data for a specific answer based on the shop ID of the subject shop and the search item, and proceeds to S118. For example, in the case where the subject shop is identified as the shop having the shop ID 001 and the answer pattern is determined to be 010000001 (specific answer 1), the search item is Field 10; accordingly, the CPU 1401 acquires information of Field 10 for the shop ID 001, "10:00-0:00".

At S118, the CPU 1401 stores the acquired shop data to the predetermined storage area of the RAM 1403 and proceeds to S120.

At S120, the CPU 1401 determines whether the subject shop is a recommended restaurant (whether the shop is assigned a priority level A). If determining that the subject shop is a recommended shop, the CPU 1401 proceeds to S122; if not determining that subject shop is a recommended shop, the CPU 1401 proceeds to S124.

At S122, the CPU 1401 performs RESERVE icon addition processing. In the RESERVE icon addition processing, the CPU 1401 sets a flag to add a description to display a RESERVE icon below the acquired shop data. The displaying a RESERVE icon for a recommended shop can direct the user to the recommended shop naturally.

Upon completion of this processing, the CPU 1401 proceeds to S124.

At S124, the CPU 1401 performs response data creation processing. More specifically, the CPU 1401 creates response data based on the information stored in the storage area and an answer template of the determined answer pattern.

For example, in the case where the subject shop is identified as the shop having a shop ID 001, the answer pattern is determined to be 010000001 (specific answer 1), and information "10:00-0:00" is acquired from Field 10 of the shop ID 001, the CPU 1401 creates response data "The open hours are 10:00-0:00." and stores the data to the storage area for the response in the RAM 1403 and proceeds to S126.

At S126, the CPU 1401 sets the answering-in-process flag to OFF and exits the dialogue condition control processing.

At S128, the CPU 1401 performs questioning data creation processing and exits the dialogue condition control processing.

For example, the CPU 1401 stores data including questioning data for requesting an entry clarifying about which shop the question is (e.g., "Which shop do you want to know about? Enter the name of the shop.") to the storage area for the response.

A plurality of kinds of questioning data may be provided. Such configuration enables the dialogue to use various expressions.

At S130, the CPU 1401 performs first filtering processing and proceeds to S132. The first filtering processing performs extraction based on the first search condition. This processing will be described later in detail.

At S132, the CPU 1401 determines whether any result (extraction result) is obtained in the first filtering processing. If determining that at least one extraction result is obtained, the CPU 1401 proceeds to S136; if determining that no extraction result is obtained, the CPU 1401 proceeds to S134.

At S134, the CPU 1401 performs fixed answer data creation processing. For example, the CPU 1401 stores data including a fixed answer to ask for re-entry (e.g., "Sorry, our facilities do not have any shop meeting your request. Do you have any other question?") to the storage area for the response.

A plurality of fixed answers may be provided. Such configuration enables the dialogue to use various expressions.

At S136, the CPU 1401 performs second filtering processing and proceeds to S138. The second filtering processing changes the order of display (the order of priority) based on the priority level. This processing will be described later in detail.

At S138, the CPU 1401 performs response data creation processing and exits the dialogue condition control processing.

More specifically, the CPU 1401 creates response data based on the information stored in the storage area and the answer template of the determined answer pattern.

For example, in the case where the answer pattern is determined to be 000000001 (Scenario 1), the first filtering processing narrows down the shops to four shops, and the second filtering processing determines the shop IDs 001, 002, and 003, the CPU 1401 creates response data "According to the database, there are four restaurants in total . . . " and stores the response data to the storage area for the response in the RAM 1403.

Figure 27:
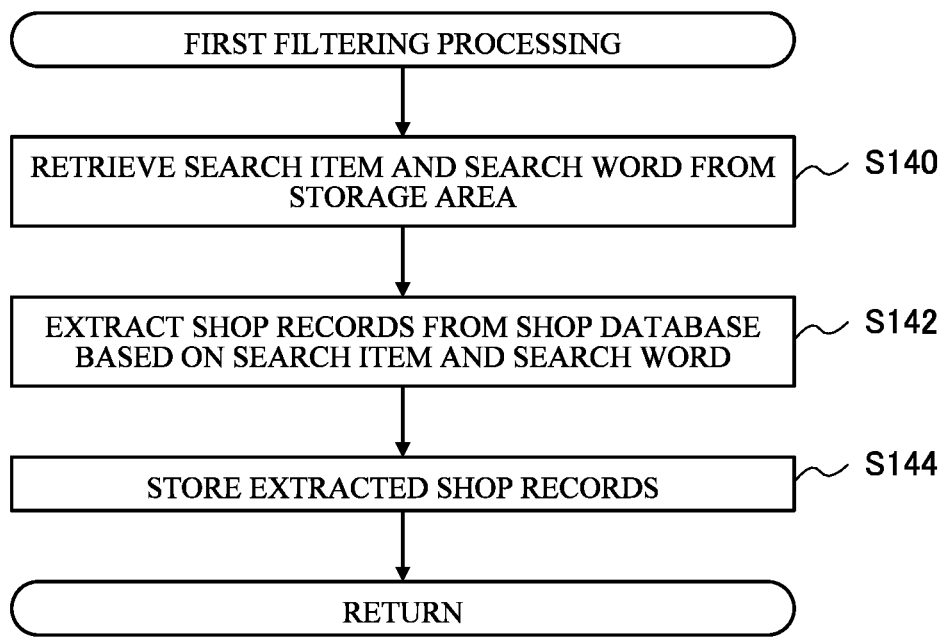
FIG. 27 is an example of a flowchart of first filtering processing.

FIG. 27 is an example of a flowchart of the first filtering processing.

At S140, the CPU 1401 retrieves a search item and a search word from the RAM 1403 and proceeds to S142.

At S142, the CPU 1401 extracts shop records (shop data) from the shop database based on the search item and the search word and proceeds to S144.

For example, in the case where the search item is Field 1 and the search word is "Chinese food", the CPU 1401 extracts all records including "Chinese food" in Field 1 from the shop database.

At S144, the CPU 1401 stores the extracted shop records to a predetermined storage area in the RAM 1403 and exits the first filtering processing.

Figure 28:
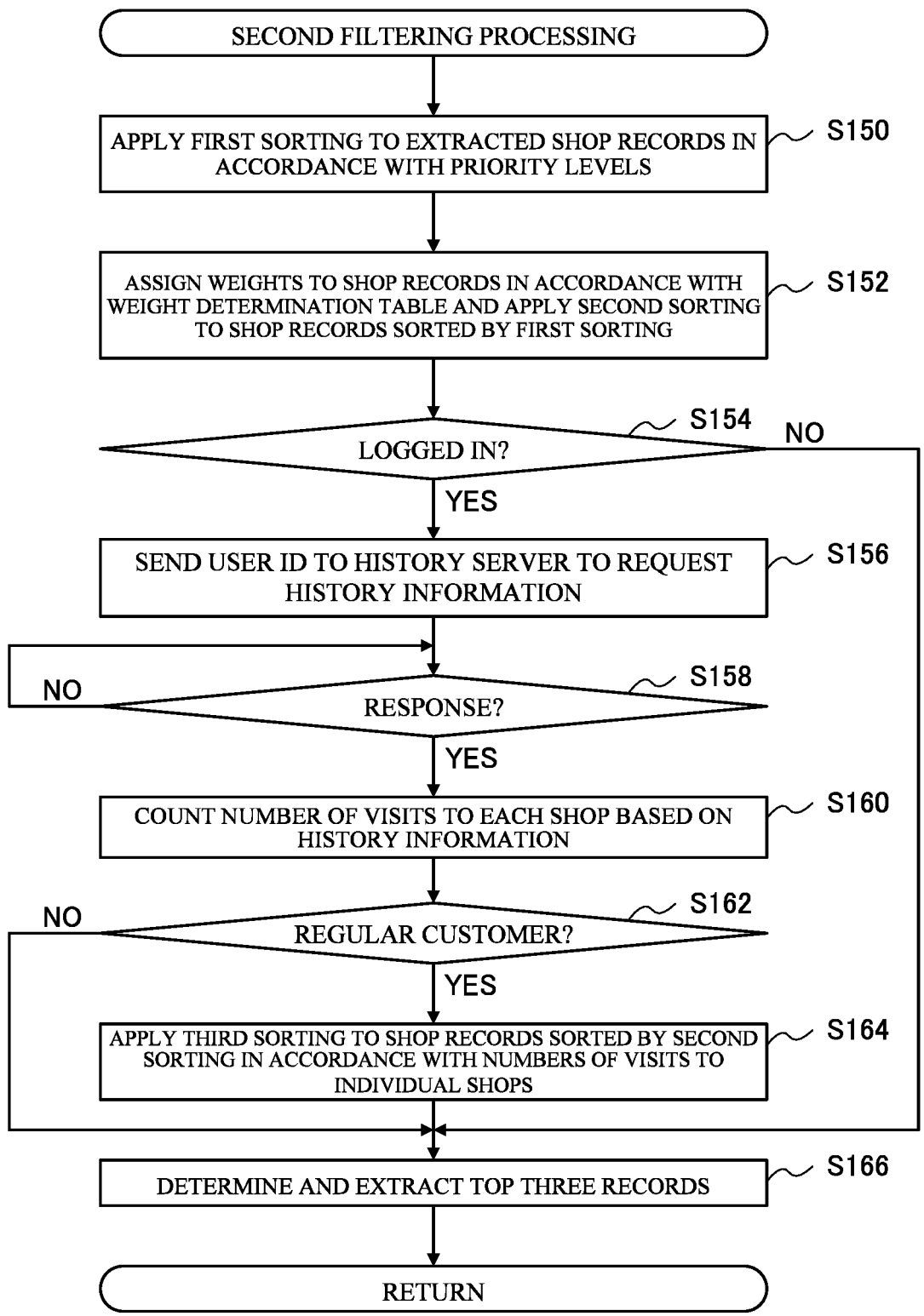
FIG. 28 is an example of a flowchart of second filtering processing.

FIG. 28 is an example of a flowchart of the second filtering processing.

At S150, the CPU 1401 applies first sorting to the extracted shop records in accordance with the priority levels and proceeds to S152. If a plurality of shop records have the same priority level, the CPU 1401 determines the shop having a smaller numbered shop ID to have a higher priority.

At S152, the CPU 1401 assigns weights to the shop records in accordance with the weight determination table, applies second sorting to the shop records sorted by the first sorting, and proceeds to S154.

For example, the CPU 1401 assigns a weight "1" to the shop records having six or more available seats (the shops to be assigned the highest priority), a weight "2" to the shop records having one to five available seats, and a weight "3" to the other shop records with reference to the weight determination table. The CPU 1401 sorts the shop records (second sorting) in accordance with the assigned weights.

That is to say, the CPU 1401 can change the order of display determined in accordance with the priority levels to the order of display in accordance with the weights.

At S154, the CPU 1401 determines whether the user is logged in (login information is stored). If determining that the user is logged in, the CPU 1401 proceeds to S156; if not determining that the user is logged in, the CPU 1401 proceeds to S166.

At S156, the CPU 1401 sends the user ID included in the login information to the history server (not shown) holding a variety of history information such as the history of visited shops to request history information and proceeds to S158.

At S158, the CPU 1401 determines whether a response has been received from the history server. If determining that a response has been received from the history server, the CPU 1401 proceeds to S160; if determining that no response has been received from the history server, the CPU 1401 repeats the processing of S158.

At S160, the CPU 1401 counts the number of visits to each shop sorted by the second sorting with reference to the history information, sets a regular customer flag to ON if the user has visited the shop three times or more, and proceeds to S162.

At S162, the CPU 1401 determines whether the user is a regular customer. More specifically, the CPU 1401 determines whether the regular customer flag is ON in each of the shop records. If determining that the user is a regular customer of at least one of the shops, the CPU 1401 proceeds to S164; if not determining that the user is a regular customer of any of the shops, the CPU 1401 proceeds to S166.

At S164, the CPU 1401 applies third sorting to the shop records sorted by the second sorting in accordance with the number of visits to each shop (in this example, whether the user is a regular customer of each shop), and proceeds to S166.

At S166, the CPU 1401 stores the sorted shop records to a predetermined storage area in the RAM 1403, identifies and extracts the top three records, and exits the second filtering processing.

The second filtering processing is not limited to the above-described processing. The order of sorting is not limited to the first sorting (S150), the second sorting (S152), and then the third sorting (S154 to S164) but any order can be employed as appropriate.

Figure 29:
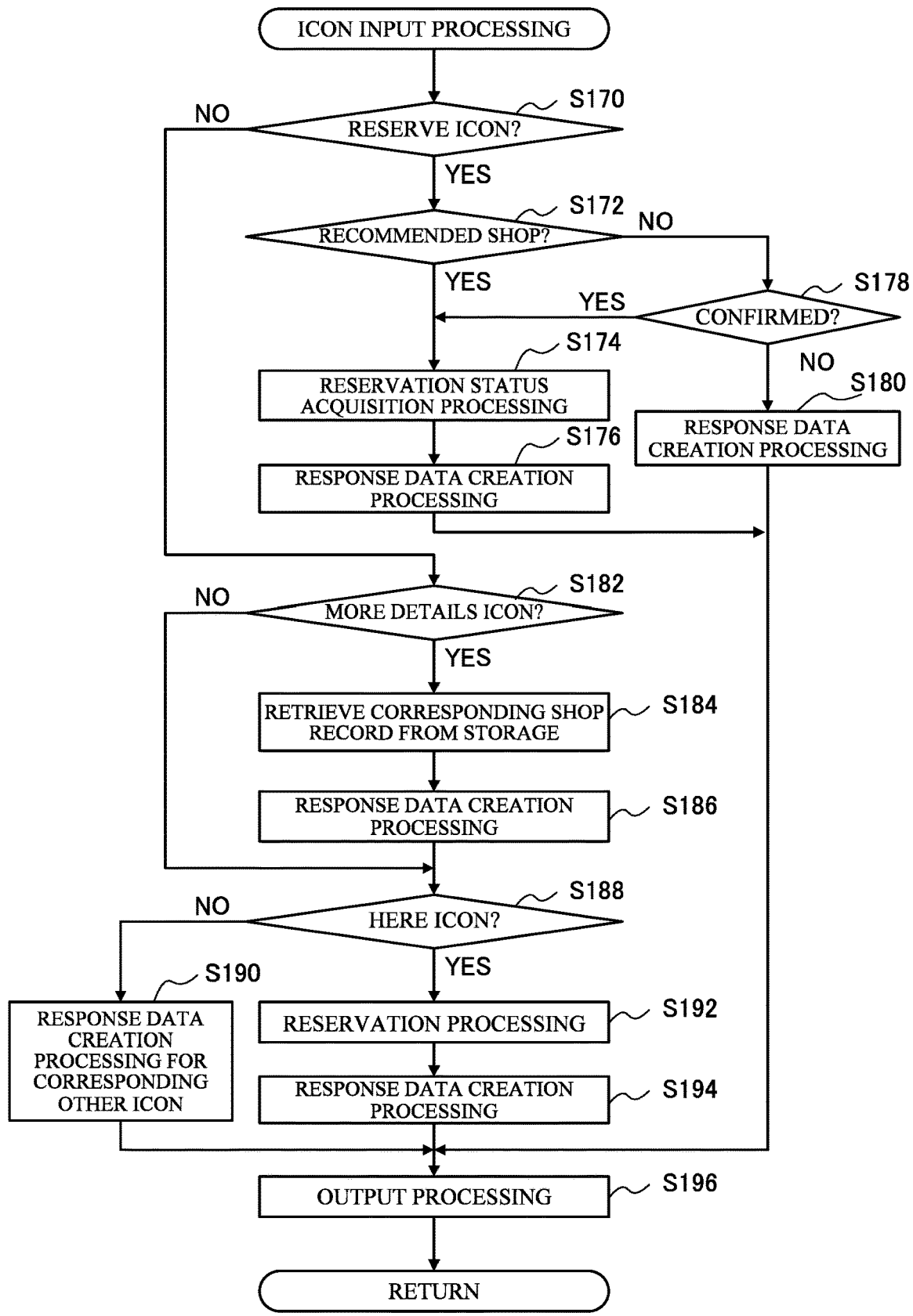
FIG. 29 is an example of a flowchart of icon input processing.

FIG. 29 is an example of a flowchart of the icon input processing.

At S170, the CPU 1401 determines whether the pressed is a RESERVE icon. If determining that the pressed is a RESERVE icon, the CPU 1401 proceeds to S172; if not determining that the pressed is a RESERVE icon, the CPU 1401 proceeds to S182.

At S172, the CPU 1401 determines whether the pressed RESERVE icon is of the recommended shop. If determining that the pressed RESERVE icon is of the recommended shop, the CPU 1401 proceeds to S174; if not determining the pressed RESERVE icon is of the recommended shop, the CPU 1401 proceeds to S178.

At S174, the CPU 1401 performs reservation status acquisition processing and proceeds to S176. In the reservation status acquisition processing, the CPU 1401 accesses the shop server 3000 for the shop to be reserved to check the current vacancy information and acquires the information.

At S176, the CPU 1401 performs response data creation processing and proceeds to S196.

More specifically, the CPU 1401 creates response data based on the information stored in the storage area and the answer template (e.g., FIG. 16E) of the determined answer pattern. For example, in the case where the information acquired from the shop server is "16:00, 17:00, 18:00", the CPU 1401 creates response data "Enter the visit time and the number of visitors . . . " and stores the response data to the storage area for the response in the RAM 1403. The user is provided a selection of 16:00, 17:00, and 18:00 for the visit time.

At S178, the CPU 1401 determines whether the CPU 1401 has requested the user's confirmation to reserve the unrecommended shop (whether the CPU 1401 has provided a response suggesting reconsideration of the reservation of the unrecommended shop). If determining that the CPU 1401 has requested the user's confirmation, the CPU 1401 proceeds to S174; if not determining that the CPU 1401 has requested the user's confirmation, the CPU 1401 proceeds to S180.

At S180, the CPU 1401 performs response data creation processing and proceeds to S196.

More specifically, the CPU 1401 creates response data based on the information stored in the storage area and the answer template (e.g., FIG. 16D) of the determined answer pattern. For example, in the case where the RESERVE icon of unrecommended Restaurant B is pressed for the first time, the CPU 1401 creates response data "Reservation of Restaurant B? . . . " and stores the response data to the storage area for the response in the RAM 1403.

At S182, the CPU 1401 determines whether the pressed is a MORE DETAILS icon. If determining that the pressed is a MORE DETAILS icon, the CPU 1401 proceeds to S184; if not determining is that the pressed is a MORE DETAILS icon, the CPU 1401 proceeds to S188.

At S184, the CPU 1401 retrieves the shop record of the shop associated with the MORE DETAILS icon among the shop records stored in the RAM 1403 and proceeds to S186.

At S186, the CPU 1401 performs response data creation processing and proceeds to S188.

More specifically, the CPU 1401 creates response data based on the information stored in the storage area and the answer template (e.g., FIG. 16C) of the determined answer pattern. For example, in the case where the pressed is the MORE DETAILS icon of Restaurant A, the CPU 1401 creates response data "Here are more details of Restaurant A . . . " and stores the response data to the storage area for the response in the RAM 1403.

At S188, the CPU 1401 determines whether the pressed is a HERE icon. If determining that the pressed is a HERE icon, the CPU 1401 proceeds to S192; if not determining that the pressed is a HERE icon, the CPU 1401 proceeds to S190.

At S190, the CPU 1401 performs response data creation processing on a corresponding other icon and proceeds to S196.

At S192, the CPU 1401 performs reservation processing and proceeds to S194. In the reservation processing, the CPU 1401 sends reservation information (e.g., the visit time and the number of visitors) to the shop server 3000 of the shop to be reserved, requests a reservation, and acquires a response thereto.

At S194, the CPU 1401 performs response data creation processing on the corresponding icon and proceeds to S196.

More specifically, the CPU 1401 creates response data based on the information stored in the storage area and the answer template (e.g., FIG. 16F) of the determined answer pattern. For example, in the case where the HERE icon of Restaurant A is pressed, the CPU 1401 creates response data "Reservation of Restaurant A is completed . . . " and stores the response data to the storage area for the response in the RAM 1403.

At S196, the CPU 1401 performs output processing and exits the icon input processing. More specifically, the CPU 1401 retrieves the data (including a response, HTML data, and image data) stored in the storage area for the response as output information and sends the information to the user terminal that has sent a request.

Figure 30:
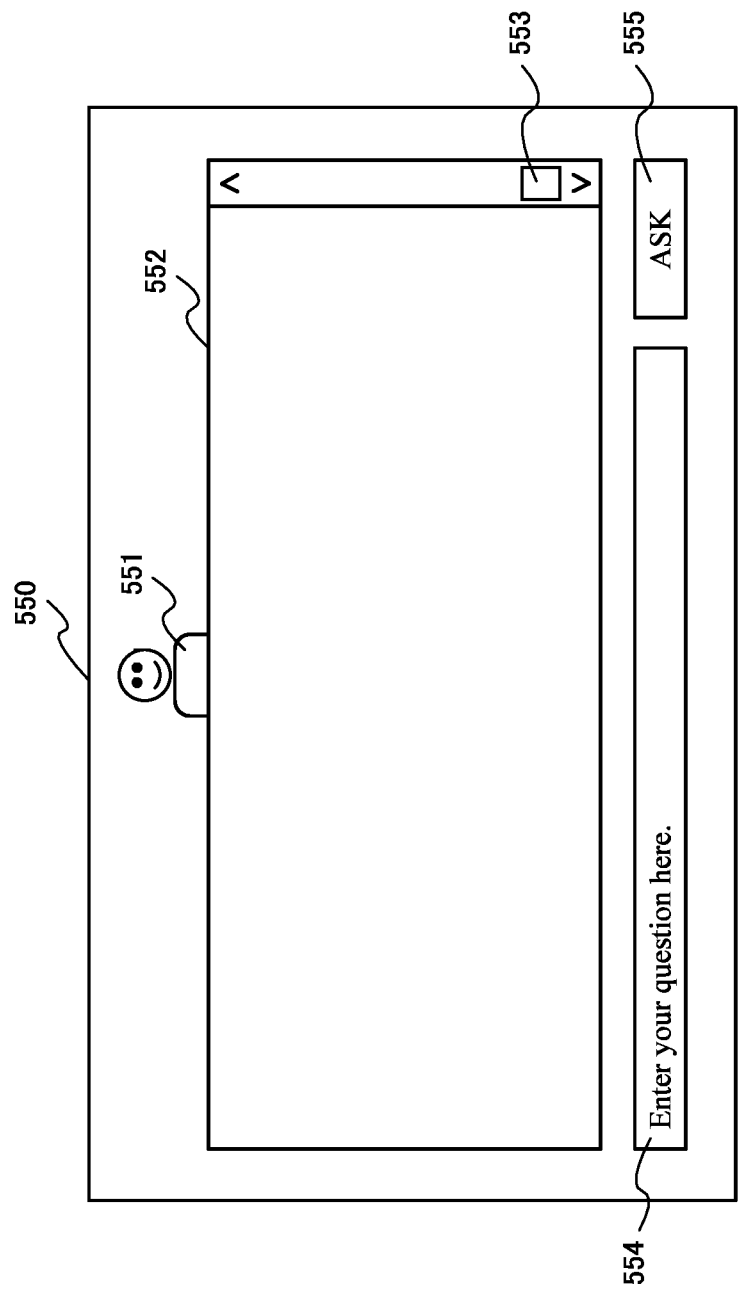
FIG. 30 is a diagram for illustrating an example of an input and output screen.

FIG. 30 is a diagram for illustrating an example (input and output screen 550) of an input and output screen. The input and output screen 550 is a web page (or a part of a web page) displayed by the web browser run on a user terminal. The input and output screen 550 may be displayed as either an independent window page or a part of a web page.

The input and output screen 550 includes a character image display area 551, an output area 552, a scroll bar 553, an input area 554, and an ASK button 555.

The character image display area 551 is an area for displaying a character image; the character can be changed depending on the input or output (response). For example, the character may be controlled to show different expressions depending on the response, even if the character is the same.

The output area 552 is an area for displaying a response output by the dialogue server 1.

The scroll bar 553 is displayed on the right of the output area 552 when the content to be displayed in the window exceeds the height of the window. As the operating part shaped like a knob on the scroll bar 553 is dragged upward or downward, the display area of the window is scrolled to show the upper or lower part that has not been seen.

The input area 554 is an area for the user to enter a text such as a question. In response to a touch operation on the input area 554, a keypad is displayed on the screen to allow the user to enter a text. A keyboard may be provided for the input.

The ASK button 555 is to be pressed by a touch operation of the user after the user has entered a text to the input area 554 (in the present embodiment, the ASK button may be a button or link to be pressed (clicked) with a mouse). In response to press of the ASK button 555, the entered text is sent to the dialogue server 1 via the network using a protocol such as HTTP.

[Example of Dialogue]

Figure 31B:
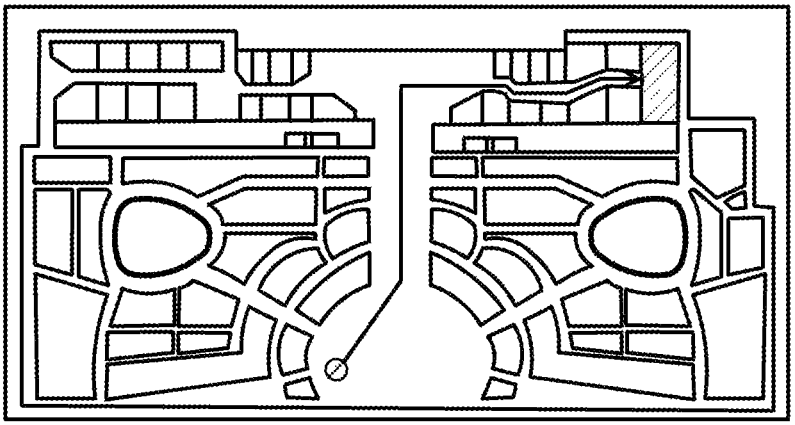
FIG. 31B is a diagram for illustrating an example of a dialogue.

With reference to FIGS. 31A and 31B, an example of a service to be provided by the dialogue system 1000 is described.

As shown in FIG. 31A, when a user inputs "I want to eat Chinese food." (C1), the dialogue system 1000 extracts restaurants serving Chinese food, determines the order of display in view of the priority levels, weights, and history information, and provides a search result to the user (C2). In this example, assume that the system 1000 determines Restaurant A to be recommended based on the priority levels.

Subsequently, in response to press of the RESERVE icon of Restaurant B, a response screen about Restaurant B is displayed (C3). Since Restaurant B is not a recommended shop, the response screen shows acknowledgement information "Reservation of Restaurant B?" and positive information "Restaurant B is popular for dandan noodles", and subsequently, negative information "We have checked the availability but Restaurant B is full . . . " and finally, positive information on the recommended restaurant "How about Restaurant A? Restaurant A is available right now." with a RESERVE icon to encourage the user to reserve Restaurant A.

These messages enable the user to reconsider Restaurant B unrecommended by the administrator and naturally direct the user to Restaurant A recommended by the administrator.

Subsequently, in response to an input "What is the recommendation of this restaurant?" by the user (C4), the system 1000 identifies "this restaurant". In this example, the previous message includes Restaurant A and Restaurant B; the system 1000 determines that Restaurant A shown latest is the subject (subject shop) of the dialogue. Hence, the system 1000 acquires today's recommendation of Restaurant A "jiaozi" from the shop database and provides "jiaozi" (C5).

As noted from this example, if the subject of the dialogue cannot be determined from one input sentence, the system 1000 reads back the dialogue one by one to determine the subject to achieve more natural dialogue.

In this phase, if the response is about a recommended shop, a RESERVE icon is displayed; if the response is about an unrecommended shop, no RESERVE icon is displayed. Such a configuration can naturally direct the user to Restaurant A recommended by the administrator.

Subsequently, in response to an input of "Tell me the open hours." from the user (C6), the system 1000 acquires the open hours of Restaurant A "10:00-0:00" from the shop database and displays the information (C7).

Subsequently, in response to press of the RESERVE icon, the system 1000 displays a reservation screen (C8). In response to selection of "16:00-16:30" for the visit time and "2" for the number of visitors from the pull-downs and a press of the HERE icon, the system 1000 displays a reservation completion screen showing a guidance (an example of guidance information) such as a map for contributing to use of the restaurant (C9). If the user terminal includes a printer device, the screen includes a PRINT icon. The map file is stored in a predetermined storage area such as the external storage device 1404.

Second Embodiment

Figure 32:
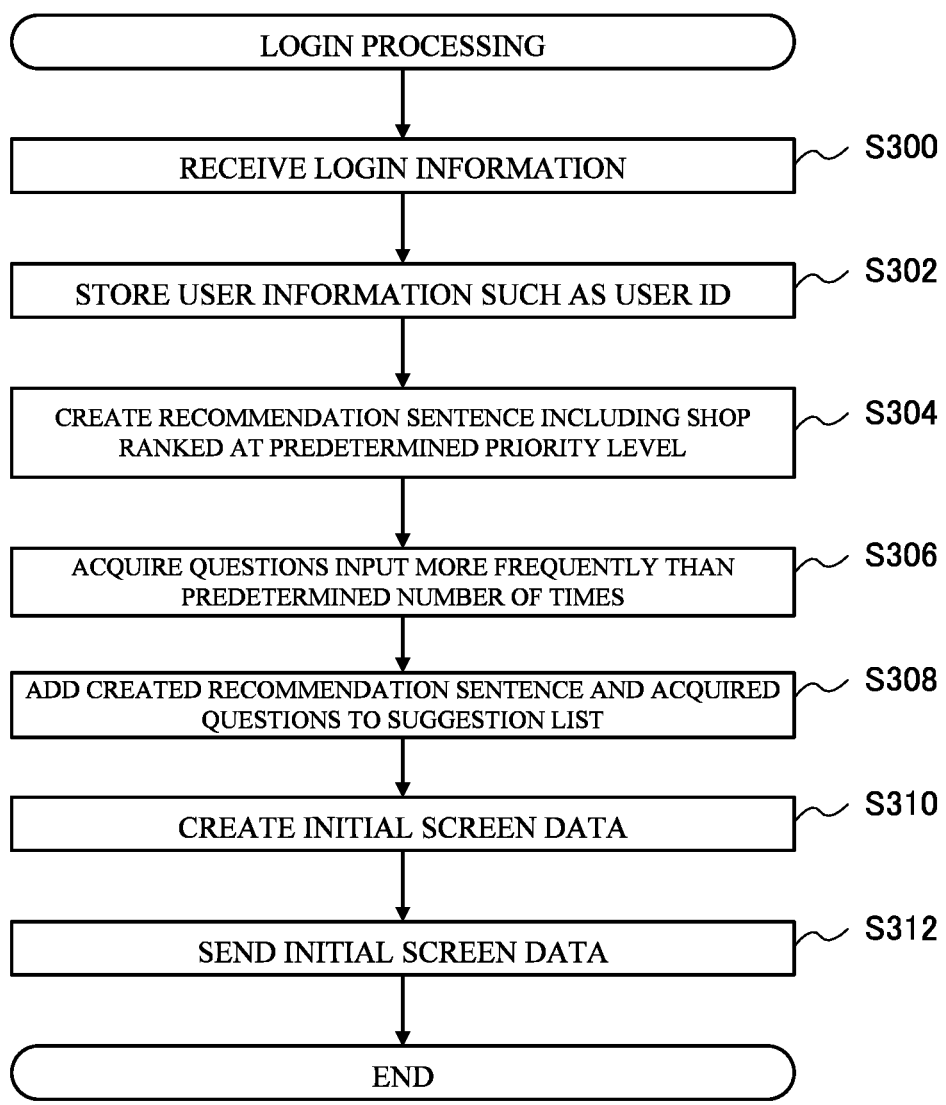
FIG. 32 is an example of a flowchart of login processing.

The present embodiment describes another method of providing commercial information with reference to FIG. 32. In the present embodiment, elements different from those described in the first embodiment are mainly described; the same elements as those described in the first embodiment are denoted by the same reference signs and description thereof is omitted as appropriate.

FIG. 32 is an example of a flowchart of login processing.

At S300, the CPU 1401 receives login information and proceeds to S302.

At S302, the CPU 1401 extracts user information such as a user ID from the login information and stores the user information to a predetermined storage area of the RAM 1403. Upon completion of this processing, the CPU 1401 proceeds to S304.

At S304, the CPU 1401 acquires a shop name ranked at a specific priority level (for example, the highest level) and a today's recommendation from the shop database and creates a recommendation sentence including the shop name and the today's recommendation based on a recommendation sentence template and proceeds to S306.

For example, in the case where a shop name "Restaurant A" and a today's recommendation "jiaozi" are acquired, the CPU 1401 creates a recommendation sentence "If you want to have good jiaozi, how about Restaurant A?" The template of the recommendation sentence ("If you want to have good <today's recommendation>, how about <shop name>?") is prepared in advance and stored in the external storage device 1404.

At S306, the CPU 1401 acquires questions that have entered more frequently than a predetermined number of times from the history database and proceeds to S308.

At S308, the CPU 1401 adds the recommendation sentence and the questions to a suggestion list and proceeds to S310.

At S310, the CPU 1401 creates an initial screen data including the suggestion list and proceeds to S312.

At S312, the CPU 1401 sends the created initial screen data as initial screen information to the user terminal that has requested the login processing.

More specifically, the CPU 1401 sends data to the user terminal so that, when the user enters a text at the user terminal, the user terminal will predict the text to be entered by the user with reference to the suggestion list and provide candidates for the text in the lower part of the input area (the input area on the web page displayed by the web browser run on the user terminal).

This configuration supports the user in entering a frequent question, and further, naturally directs the user to the shop recommended by the administrator by providing information on the shop when the user inputs a question.

The login processing is not limited to the above-described processing.

For example, the suggestion list may be updated not only at the login processing but every time the CPU 1401 communicates with the user terminal. This configuration enables recommended information to be provided in real time.

The dialogue system 1000 may include a suggest server; the suggest server may have a suggest database holding successful responses (hits) to the inputs frequently made in the past. Alternatively, the dialogue system 1000 may include the suggest database in place of the history database.

Third Embodiment

The present embodiment describes another method of providing commercial information with reference to FIGS. 33A to 33C, 34A, and 34B. In the present embodiment, elements different from those described in the first embodiment are mainly described; the same elements as those described in the first embodiment are denoted by the same reference signs and description thereof is omitted as appropriate.

[Unrecommended Shop Exclusion Determination Tables]

FIGS. 33A to 33C are diagrams for illustrating examples of unrecommended shop exclusion determination tables. An unrecommended shop exclusion determination table is to determine whether the response to be provided includes inappropriate information in view of additional information such as the current situation or the user's attribute.

The unrecommended shop exclusion determination table shown in FIG. 33A specifies information on unrecommended shops (shops to be excluded) depending on the age. The unrecommended shop exclusion determination table shown in FIG. 33B specifies information on unrecommended shops (shops to be excluded) depending on the sex. The unrecommended shop exclusion determination table shown in FIG. 33C specifies information on shops (shops to be excluded) located on each floor.

Figure 34A:
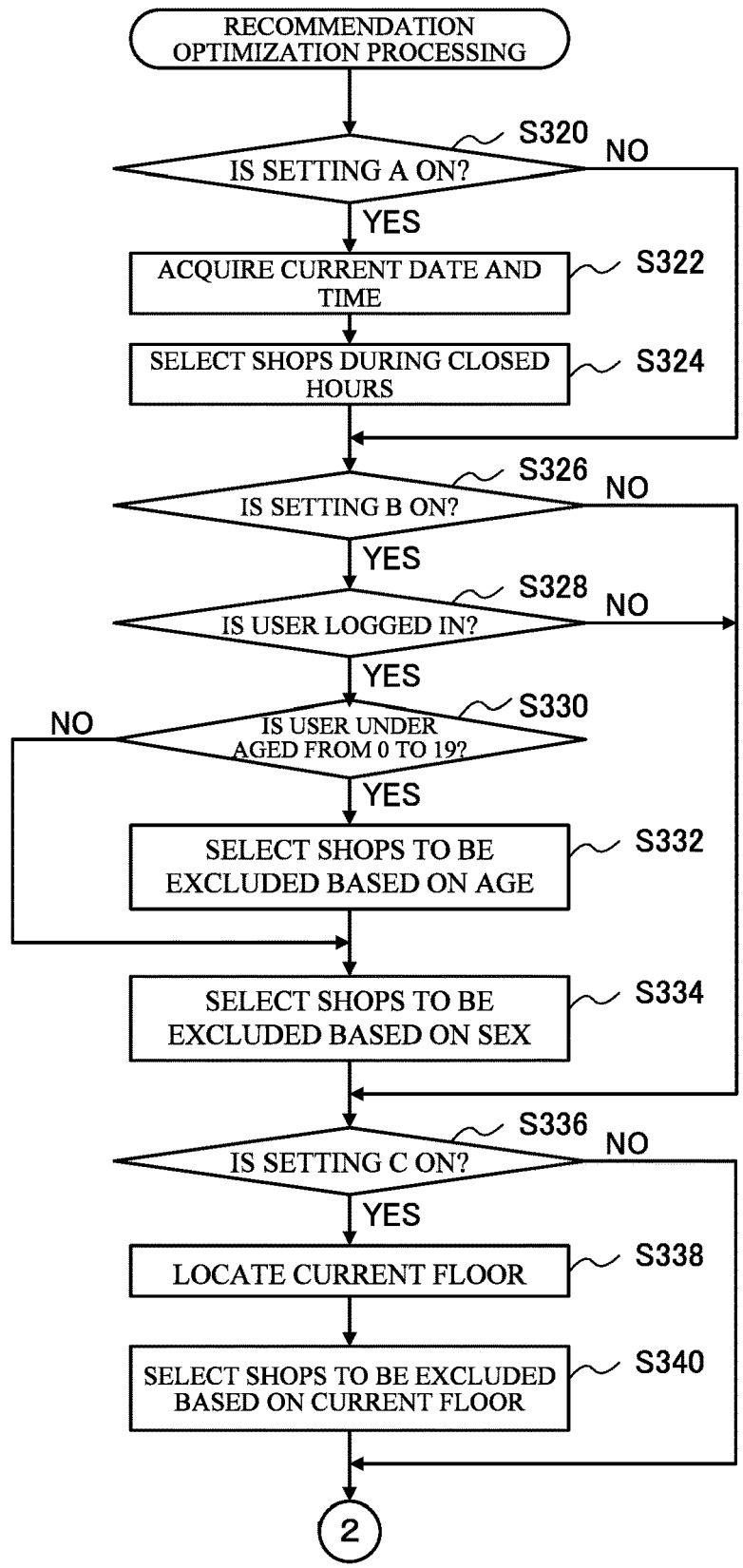
FIG. 34A is an example of a flowchart of recommendation optimization processing.
Figure 34B:
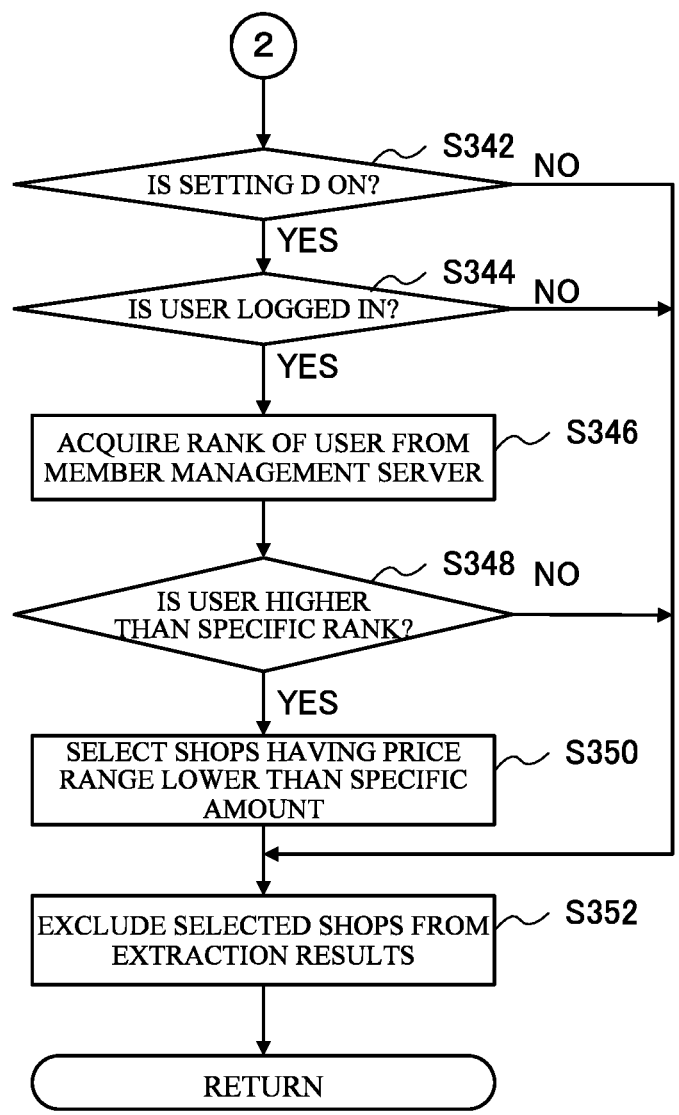
FIG. 34B is an example of a flowchart of recommendation optimization processing.

FIGS. 34A and 34B are an example of a flowchart of recommendation optimization processing. In the recommendation optimization processing, a value ON or OFF are preset to each step of the processing (processing related to setting A to setting D) to optimize the recommendation. The recommendation optimization processing is performed at an appropriate time between the processing of S130 and the processing S138 in FIG. 26.

At S320, the CPU 1401 determines whether the setting A is ON. If determining the setting A is ON, the CPU 1401 proceeds to S322; if not determining the setting A is ON, the CPU 1401 proceeds to S326.

At S322, the CPU 1401 acquires the current date and time and proceeds to S324.

At S324, the CPU 1401 selects the shops during closed hours based on the current date and time with reference to Field 10 of the shop database, stores the selected shops to a predetermined storage area of the RAM 1403, and proceeds to S326.

At S326, the CPU 1401 determines whether the setting B is ON. If determining the setting B is ON, the CPU 1401 proceeds to S328; if not determining the setting B is ON, the CPU 1401 proceeds to S336.

At S328, the CPU 1401 determines whether the user is logged in (login information is stored). If determining that the user is logged in, the CPU 1401 proceeds to S330; if not determining that the user is logged in, the CPU 1401 proceeds to S336.

At S330, the CPU 1401 determines whether the user is aged from 0 to 19. If determining that the user is aged from 0 to 19, the CPU 1401 proceeds to S332; if not determining that user is aged from 0 to 19, the CPU 1401 proceeds to S334.

At S332, the CPU 1401 selects the shops to be excluded based on the age. More specifically, the CPU 1401 selects the shops to be excluded with reference to the unrecommended shop exclusion determination table shown in FIG. 33A and stores the selected shops to the predetermined storage area of the RAM 1403. Upon completion of this processing, the CPU 1401 proceeds to S334.

At S334, the CPU 1401 selects the shops to be excluded based on the sex. More specifically, the CPU 1401 selects the shops to be excluded with reference to the unrecommended shop exclusion determination table shown in FIG. 33B and stores the selected shops to the predetermined storage area of the RAM 1403.

For example, in the case where the user is a male, the shop IDs 011 and 012 are selected. Upon completion of this processing, the CPU 1401 proceeds to S336.

At S336, the CPU 1401 determines whether the setting C is ON. If determining the setting C is ON, the CPU 1401 proceeds to S338; if not determining the setting C is ON, the CPU 1401 proceeds to S342.

At S338, the CPU 1401 locates the floor (current floor) on which the user is. More specifically, the CPU 1401 acquires installation information from a terminal management database (not shown) based on the terminal ID of the user terminal to determine on which floor the user terminal being used by the user is installed. Upon completion of this processing, the CPU 1401 proceeds to S340.

At S340, the CPU 1401 selects the shops to be excluded based on the current floor. More specifically, the CPU 1401 selects the shops to be excluded with reference to the unrecommended shop exclusion determination table shown in FIG. 33C and stores the selected shops to the predetermined storage area of the RAM 1403.

For example, in the case where the current floor is the third floor, the shops on the floors other than the third floor (or the shops on the 1st floor, the second floor, and the fourth floor) are selected. Upon completion of this processing, the CPU 4101 proceeds to S342 in FIG. 34B.

At S342, the CPU 1401 determines whether the setting D is ON. If determining the setting D is ON, the CPU 1401 proceeds to S344; if not determining the setting D is ON, the CPU 1401 proceeds to S352.

At S344, the CPU 1401 determines whether the user is logged in (login information is stored). If determining that the user is logged in, the CPU 1401 proceeds to S346; if not determining that the user is logged in, the CPU 1401 proceeds to S352.

At S346, the CPU 1401 acquires the rank of the user from the member management server 13. More specifically, the CPU 1401 sends the user ID to the member management server 13 to acquire the rank indicating whether the user is rich. It should be noted that the member management server 13 analyzes a variety of information such as behavioral history, presumes the financial ability, ranks the user, and stores the rank together with the user ID.

Upon completion of this processing, the CPU 1401 proceeds to S348.

At S348, the CPU 1401 determines whether the acquired rank is higher than a specific rank. If determining that the acquired rank is higher than the specific rank, the CPU 1401 proceeds to S350; if not determining that the acquired rank is higher than the specific rank, the CPU 1401 proceeds to S352.

At S350, the CPU 1401 selects the shops having a price range lower than a specific amount with reference to the Field n of the shop database, stores the selected shops to the predetermined storage area in the RAM 1403, and proceeds to S352.

At S352, the CPU 1401 excludes the selected shops from the extraction results and exits the recommendation optimization processing.

The above-described processing selects shops not to be recommended based on the current date and time and excludes the selected shops. The narrowing down the recommended shops depending on the current date and time enables the dialogue to be more practical.

The above-described processing selects shops not to be recommended based on the user information (not only the age and the sex but may be the birthday and/or the preference of the user) and excludes the selected shops. The narrowing down the recommended shops depending on the user enables the dialogue to be more natural.

The above-described processing selects shops not to be recommended based on the location of the user and excludes the selected shops. The narrowing down the recommended shops depending on the location of the user enables the dialogue to care about the user.

The above-described processing excludes lower price range shops that are not preferred by a rich user. In general, when a cheap thing is recommended, rich people might feel unpleased. The narrowing down the recommended shops depending on the rank of the user eliminates displeasing the user and enables the dialogue to be more natural.

As described above, the recommendation optimization processing changes the priorities by selecting shops not to be recommended or by assigning weights to the shops not to be recommended, so that a timely and more pertinent answer can be provided to the question from the user.

Fourth Embodiment

Figure 35:
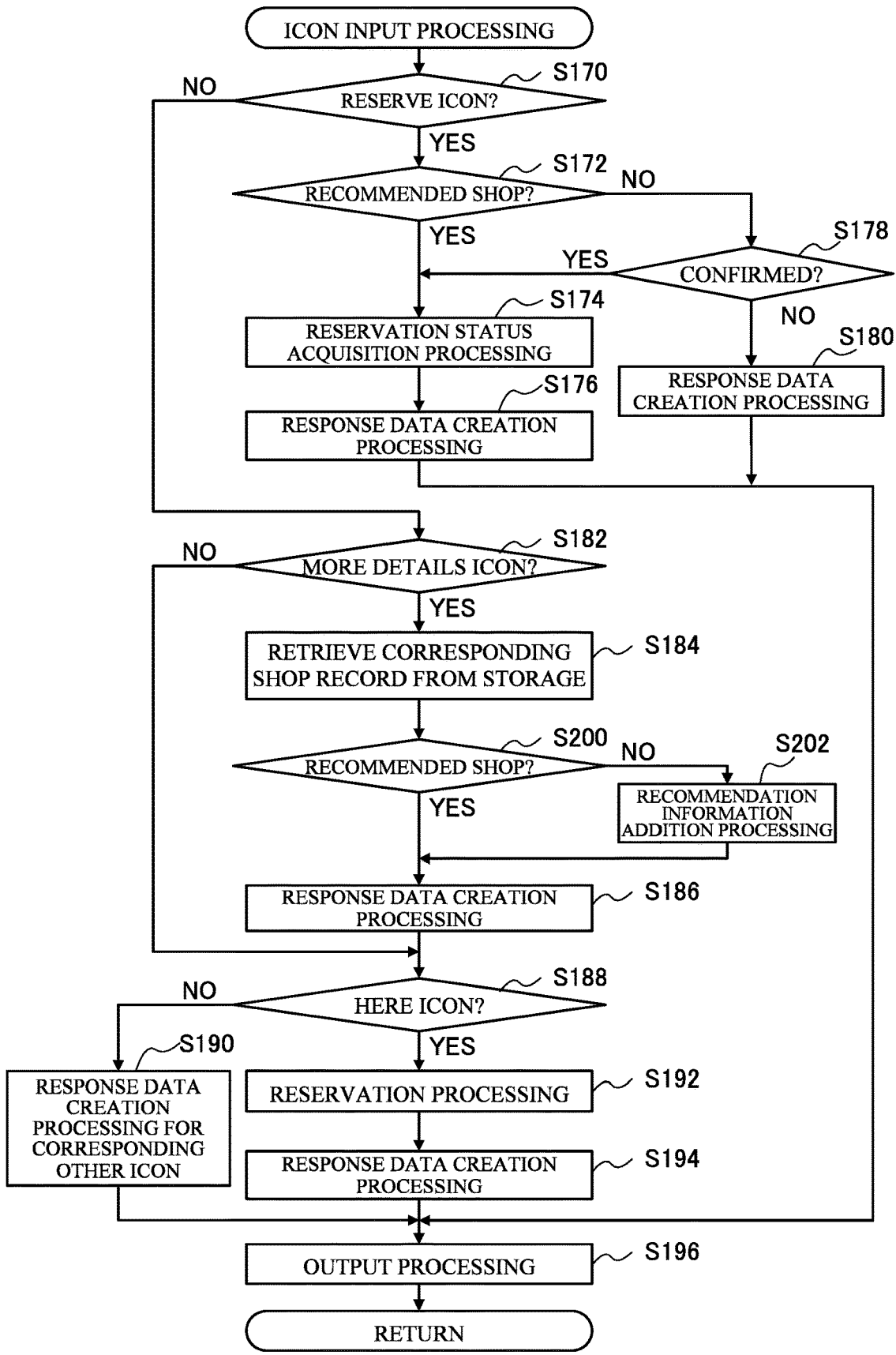
FIG. 35 is an example of a flowchart of icon input processing.

The present embodiment describes another method of providing commercial information with reference to FIGS. 35 and 36. In the present embodiment, elements different from those described in the first embodiment are mainly described; the same elements as those described in the first embodiment are denoted by the same reference signs and description thereof is omitted as appropriate.

FIG. 35 is an example of a flowchart of icon input processing. This processing is different from the processing in FIG. 29 in the point that S200 and S202 are added.

After the processing of S184, the CPU 1401 proceeds to S200.

At S200, the CPU 1401 determines whether the shop associated with the MORE DETAILS icon is a recommended shop (whether the shop is assigned a priority level A). If determining that the shop associated with the MORE DETAILS icon is not a recommended shop, the CPU 1401 proceeds to S202; if determining that the shop associated with the MORE DETAILS icon is a recommended shop, the CPU 1401 proceeds to S186.

At S202, the CPU 1401 performs recommendation information addition processing. More specifically, the CPU 1401 creates recommendation information based on the template for additional recommendation and stores the recommendation information to the storage area for the response in the RAM 1403.

The template for additional recommendation (e.g., "By the way, <Shop Name> is having a discount sale of <Bargain Item (not shown)> today.") is prepared and stored in the external storage device 1404 in advance.

As shown in FIG. 36, in response to an input "I want to buy a dress." from a user (C11), the CPU 1401 extracts shops providing clothes, determines the order of display in view of the priority levels, weights, and history information, and provides the search result to the user (C12). In this example, assume that the Shop M is determined to be recommended.

Subsequently, in response to press of the MORE DETAILS icon of Shop N, the CPU 1401 displays the details of the Shop N and further, provides positive information on the recommended Shop M "By the way, Shop M is having a discount sale of T-shirts today." (C13).

Providing the positive information on Shop M casually as described above can naturally direct the user to Shop M recommended by the administrator.

Then, in response to an input "Where is Shop M?" (C14), the CPU 1401 shows a guidance (map) to Shop M (C15).

Fifth Embodiment

Figure 37:
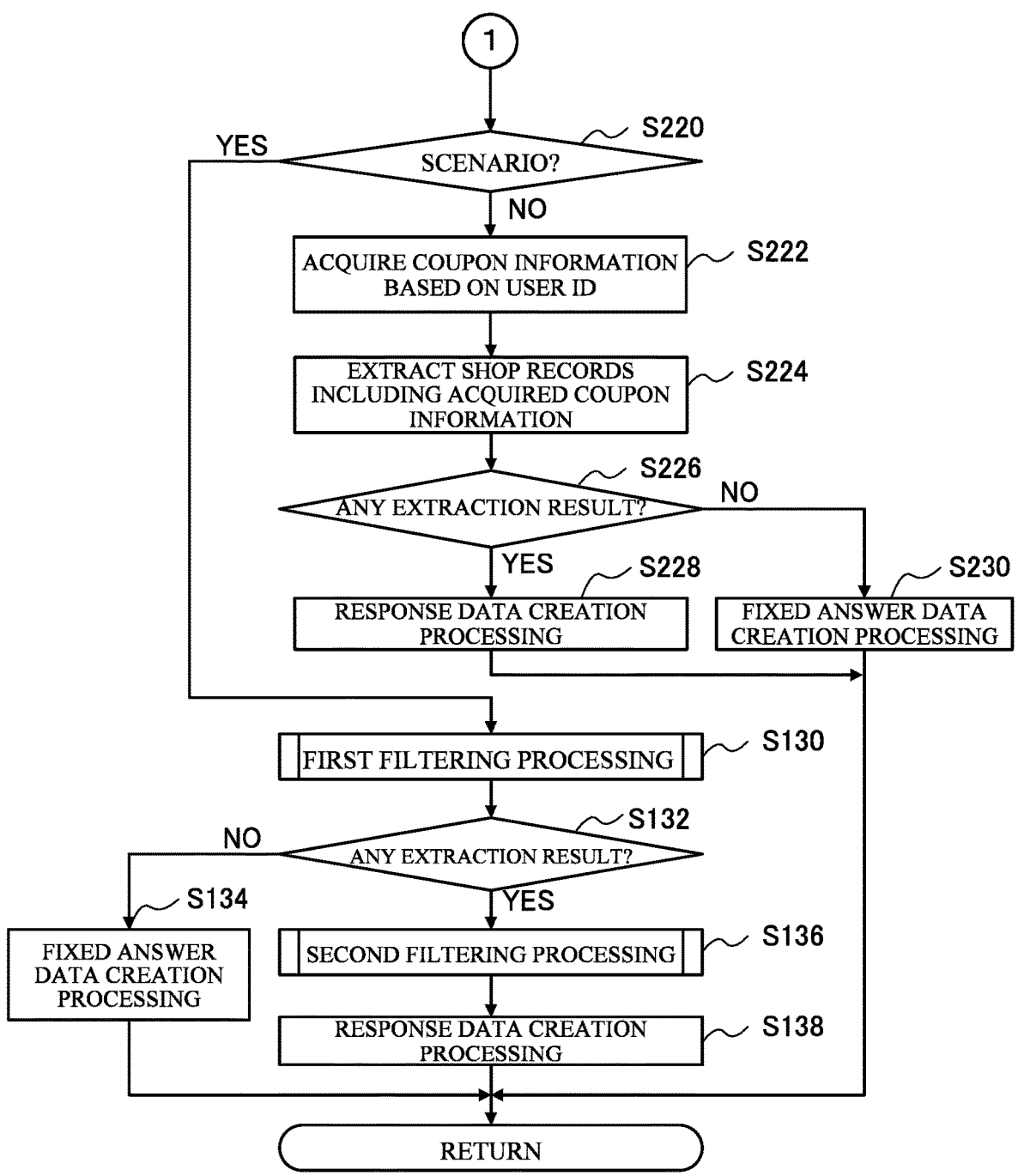
FIG. 37 is an example of a flowchart of dialogue condition control processing.
Figure 38:
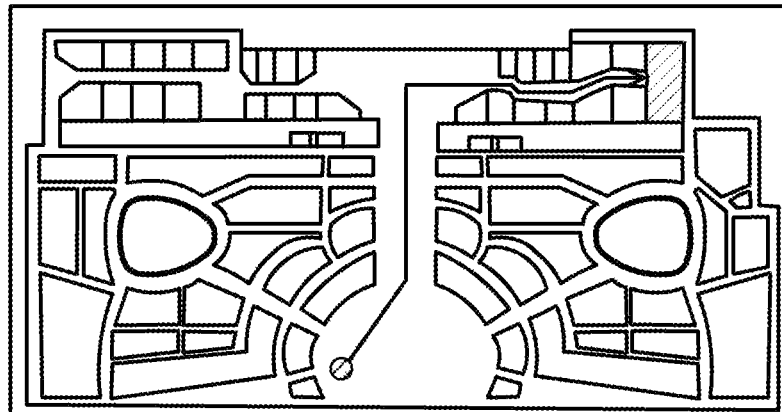
FIG. 38 is a diagram for illustrating an example of a dialogue.

The present embodiment describes another method of providing commercial information with reference to FIGS. 37 and 38. In the present embodiment, elements different from those described in the first embodiment are mainly described; the same elements as those described in the first embodiment are denoted by the same reference signs and description thereof is omitted as appropriate.

FIG. 37 is an example of a flowchart of dialogue condition control processing. This processing is different from the processing in FIG. 26 in the point that S220 to S230 are added.

At S220, the CPU 1401 determines whether the answer pattern is scenario. If determining that the answer pattern is a scenario, the CPU 1401 proceeds to S130; if not determining that the answer pattern is a scenario, the CPU 1401 proceeds to S222.

At S222, the CPU 1401 acquires coupon information from the member management server 13 based on the user ID and proceeds to S224.

At S224, the CPU 1401 extracts shop records including the acquired coupon information from the shop database and stores the shop records to a predetermined storage area in the RAM 1403.

For example, in the case where the acquired coupon information is "coupon 1" and "coupon 2", the CPU 1401 extracts shop records having the shop IDs 001 and 002. Upon completion of this processing, the CPU 1401 proceeds to S226.

At S226, the CPU 1401 determines whether any extraction result is obtained. If determining that some extraction result is obtained, the CPU 1401 proceeds to S228; if determining that no extraction result is obtained, the CPU 1401 proceeds to S230.

At S228, the CPU 1401 performs response data creation processing and exits the dialogue condition control processing. More specifically, the CPU 1401 creates response data based on the information stored in the storage area and the answer template (not shown) of the determined answer pattern and stores the response data to the storage area for the response in the RAM 1403.

At S230, the CPU 1401 performs fixed answer data creation processing and exits the dialogue condition control processing.

For example, the CPU 1401 stores data including a fixed answer indicating that no available coupon is found (e.g., "Sorry, available coupons cannot be found. Do you have any other question?") to the storage area for the response.

The processing has been described using coupons by way of example; however, the same applies points.

As shown in FIG. 38, in response to an input "Tell me shops I can use a coupon." from the user (C21), the CPU 1401 extracts the shops that accept a coupon and provides the search result to the user (C22).

Subsequently, in response to an input "Print out the coupons." from the user (C23), the CPU 1401 provides a message indicating that the user terminal cannot print the coupons because the user terminal does not have a printer function and a guidance of the user terminal having a printer function (C24). If the user terminal has a printer function, the coupons are printed based on the input from the user.

Sixth Embodiment

The present embodiment describes another method of providing commercial information with reference to FIGS. 39 and 40. In the present embodiment, elements different from those described in the first embodiment are mainly described; the same elements as those described in the first embodiment are denoted by the same reference signs and description thereof is omitted as appropriate.

FIG. 39 is a diagram for illustrating an example of data (external facility data) stored in an external facility database. Each record of the external facility data includes information such as a facility ID, a name of facility, a priority level, and information on the shuttle bus stop.

The external facility data is added, altered, or deleted through an external facility data creation screen (not shown) and an external facility data management screen (not shown) like the shop data.

Each field of the shuttle bus stop includes the file name (e.g., "MAP1") of a map file is stored. The map file is stored in a predetermined storage area such as the external storage device 1404. Each field of the time table stores the file name of a time table file (e.g., time table A). The time table file is stored in a predetermined storage area such as the external storage device 1404.

As illustrated in FIG. 40, in response to an input "I want to go to A Land by bus tomorrow." from the user (C31), the CPU 1401 extracts data from the facility database and displays an extraction result (C32).

The extraction result includes information on the external facility (the route from the current position to the shuttle bus stop and the walking time to the bus stop, the travel time by shuttle bus, and the time table of the shuttle bus). Furthermore, information on the weather forecast for tomorrow is retrieved and displayed as well.

In the extraction processing, the CPU 1401 retrieves the search item and the search word from the storage area. Subsequently, the CPU 1401 extracts an external facility record from the external facility database based on the search item and the search word. Then, the CPU 1401 stores the extracted external facility record and creates response data in accordance with an answer template for the external facility.

In addition, the processing for the dialogue about shops is applicable to the dialogue about external facilities. For example, in response to an input "Is there any good theme park near here?" from a user, the CPU 1401 extracts theme parks from the external facility database, determines the order of display in view of the priority levels, weights, and history information, and provides the search results to the user.

The shop database, the knowledge database, the answer template database, and the external facility database may be structured as a single database; some of the databases may be structured as one database; or one of the databases may be structured as a plurality of separate databases. That is to say, the structure to hold the data may be varied as appropriate.

Seventh Embodiment

The present embodiment describes another method of providing commercial information using another data structure with reference to FIGS. 41 to 44. In the present embodiment, elements different from those described in the first embodiment are mainly described; the same elements as those described in the first embodiment are denoted by the same reference signs and description thereof is omitted as appropriate.

Figure 41:
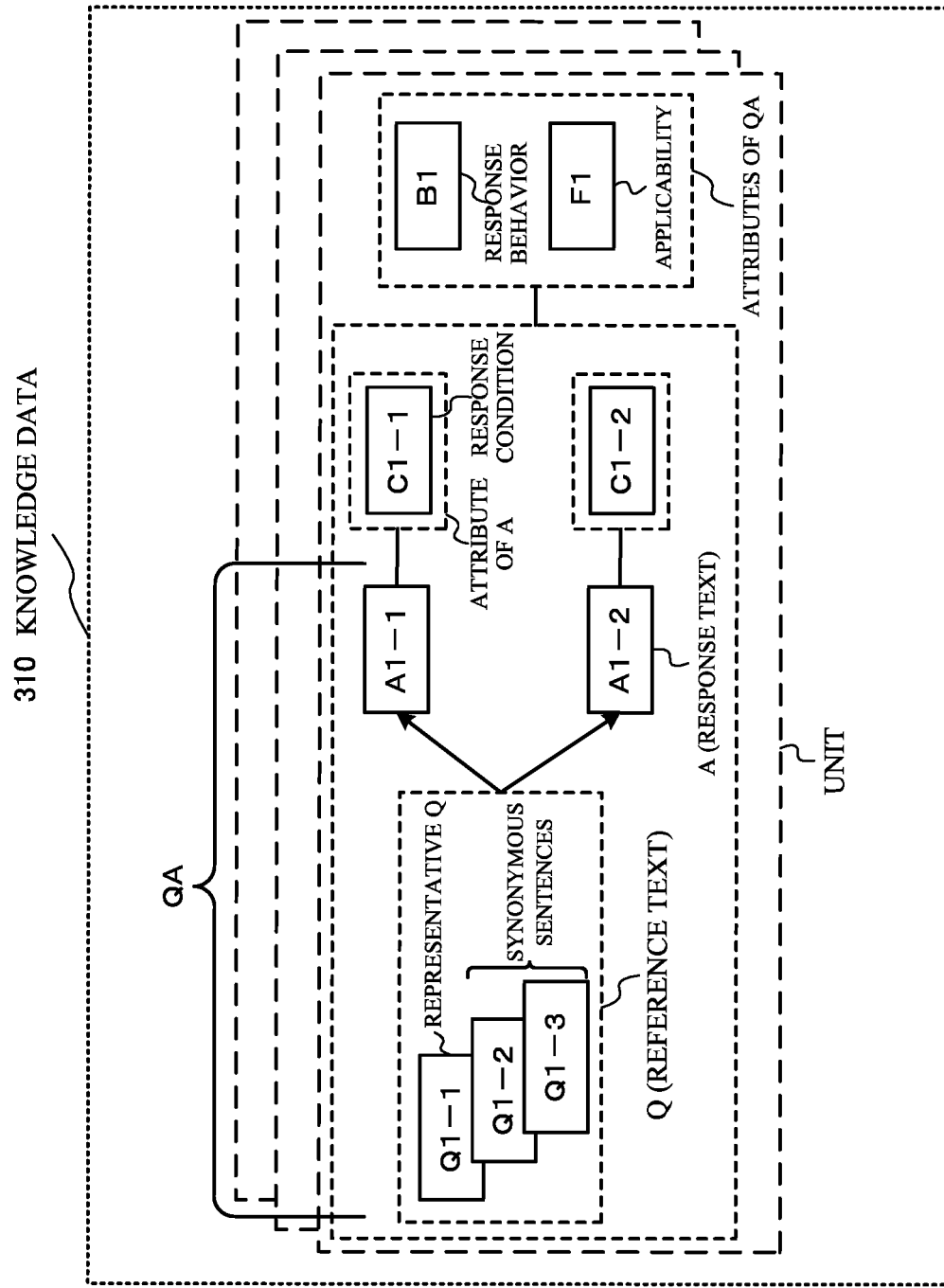
FIG. 41 is a diagram for illustrating an example of a data structure of knowledge data.

FIG. 41 is a diagram for illustrating an example of a data structure of the knowledge data 310 to be used in the dialogue system 1000.

To make an effective response to a text input by a user with a user terminal, the dialogue server 1 of the dialogue system 1000 uses data stored in the knowledge data 310. The knowledge data 310 includes a plurality of units (FIG. 41 shows only Unit 1 in detail). Each unit includes at least one reference text and at least one response text (which corresponds to an answer template); the reference text and the response text are associated with each other and constitute a set.

The reference text is a text to be compared with an input sentence of the user received from the user terminal; FIG. 41 shows three reference texts Qs (Q1-1, Q1-2, and Q1-3). Although the Q seems to represent the initial letter of question, the denotation is merely for convenience; the reference text does not need to be in the form of a question (interrogative sentence). For example, the reference text can be a text in various forms such as a word, an affirmative sentence, a negative sentence, a greeting, and the like.

If the unit includes a plurality of reference texts, one reference text is a representative reference text (representative Q) and the other reference texts are synonymous sentences. In FIG. 41, the Q1-1 is a representative Q and the Q1-2 and the Q1-3 are the synonymous sentences of Q1-1. That is to say, a unit includes a collection of reference texts having the same meaning (very close meanings that can be referred to as being synonymous).

A response text is a text associated with the reference texts (as a response to the reference texts); FIG. 41 shows two response texts As (A1-1 and A1-2). Although the A seems to represent the initial letter of answer, the denotation is merely for convenience; the response text does not need to be a sentence in the form of an answer to some question. For example, the response text can be a text in various forms such as a word, an interrogative sentence, an affirmative sentence, a negative sentence, a greeting, and the like.

One unit includes one or more reference texts and one or more response texts and the reference texts and the response texts are associated with one another; the correspondence relation between the reference text and the response text can be one to one, one to n, n to one, or n to n.

Furthermore, one unit includes an attribute associated with each response text (attribute of A). The attribute of A represents the attribute of the response text. A response condition indicates in what condition the associated response text is appropriate for the response. If the unit does not have a plurality of response texts, the response condition is not necessary because the response can be uniquely determined.

Defining the set of reference texts and response texts associated therewith plus the attributes of the response texts as QA, each QA has an attribute (attribute of QA). The attribute of QA is represented by information including response behavior setting information (B1) or information including applicability setting information (F1). The response behavior setting information is to specify some behavior (action) to be taken by the user terminal of the user if the input sentence of the user is determined to be semantically closest to (hit on) the reference text of the unit. The applicability setting information is to specify whether the reference text Q is to be a suggestion, whether to record a log about this QA, or the like. It should be noted that this attribute of QA can be regarded as attribute associated with the reference text (the group of the reference texts including the representative Q and the synonymous sentences if the unit includes a plurality of reference sentences).

Although FIG. 41 shows that the knowledge data 310 is managed as unified data, at least part of the data can be managed as different data while maintaining the association relations. For example, a collection of QAs can be stored as first data and a collection of the attributes of the QAs can be stored as second data together with the identifiers of the QAs.

Figure 42:
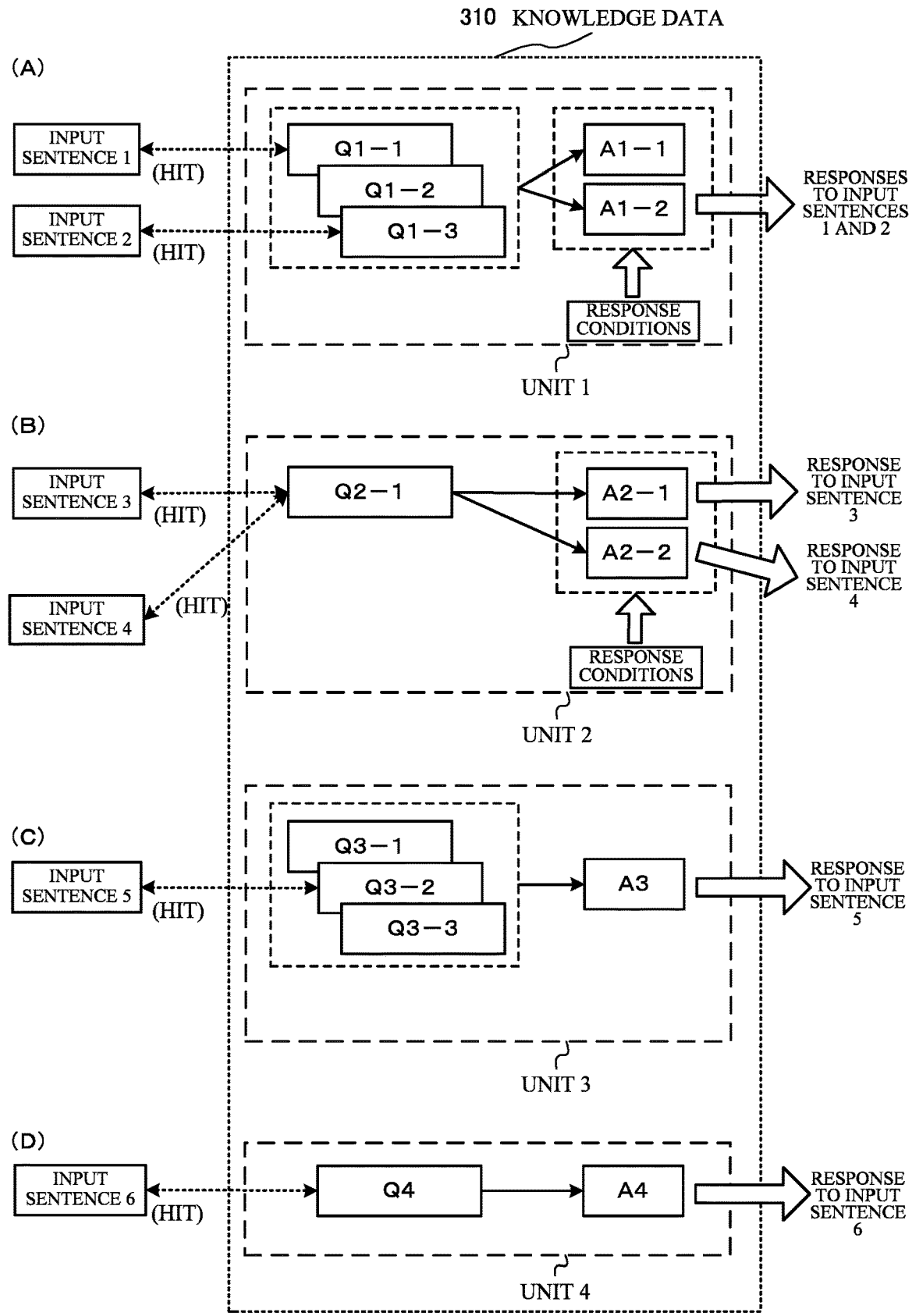
FIG. 42 is a diagram for illustrating examples of relations between an input sentence and a response.

FIG. 42 is a diagram for schematically illustrating ways of determining a response to an input sentence (a diagram for illustrating examples of relations between an input sentence and a response) using the knowledge data 310. It should be noted that the attributes of QA (response behavior setting information and applicability setting information) in each unit of the knowledge data 310 described with FIG. 41 are omitted from FIG. 42.

First, the case in FIG. 42(A) is described. Assume that a unit 1 (identical to Unit 1 shown in FIG. 41) is provided for the knowledge data 310, that input sentences 1 and 2 are entered by users, and that a Q1-1 is hit as the semantically closest text to the input sentence 1 and a Q1-3 is hit as the semantically closest text to the input sentence 2 (assuming that no other unit exists). In the case of FIG. 42(A), an A1-2 is displayed for the response to the input sentence 1 and further, the A1-2 is displayed for the response to the input sentence 2 as well. This is because, regarding the response condition or the attribute of A, the response condition for the A1-2 is satisfied by both of the input sentence 1 and the input sentence 2.

Next, the case in FIG. 42(B) is described. Assume that a unit 2 (in which one reference text (Q2-1) is associated with two response texts (A2-1 and A2-2)) is provided for the knowledge data 310, that input sentences 3 and 4 are entered by users 10, that the Q2-1 is hit as the semantically closest text to the input sentence 3 and also to the input sentence 4 (assuming that no other unit exists). In the case of FIG.

42(B), the A2-1 is displayed for the response to the input sentence 3 and the A2-2 is displayed for the response to the input sentence 4. This is because, regarding the response condition or the attribute of A, the response condition for the A2-1 is satisfied by the input sentence 3 and the response condition for the A2-2 is satisfied by the input sentence 4.

Like this case, even if a plurality of input sentences hit on the same reference text, different responses could be displayed depending on the response condition.

Next, the case in FIG. 42(C) is described. Assume that a unit 3 (in which three reference texts (Q3-1, Q3-2, and Q3-3) are associated with one response text (A3)) is provided for the knowledge data 310, that an input sentence 5 is entered by a user 10, that the Q3-2 is hit as the semantically closest text to the input sentence 5 (assuming that no other unit exists). In the case of FIG. 42(C) the A3 is displayed for the response to the input sentence 5.

FIG. 42(D) shows the simplest case. Assume that a unit 4 (in which one reference text (Q4) is associated with one response text (A4)) is provided for the knowledge data 310, that an input sentence 6 is entered by a user 10, that the Q4 is hit as the semantically closest text to the input sentence 6 (assuming that no other unit exists). In the case of FIG. 42(D), the A4 is displayed for the response to the input sentence 6.

Figure 43:
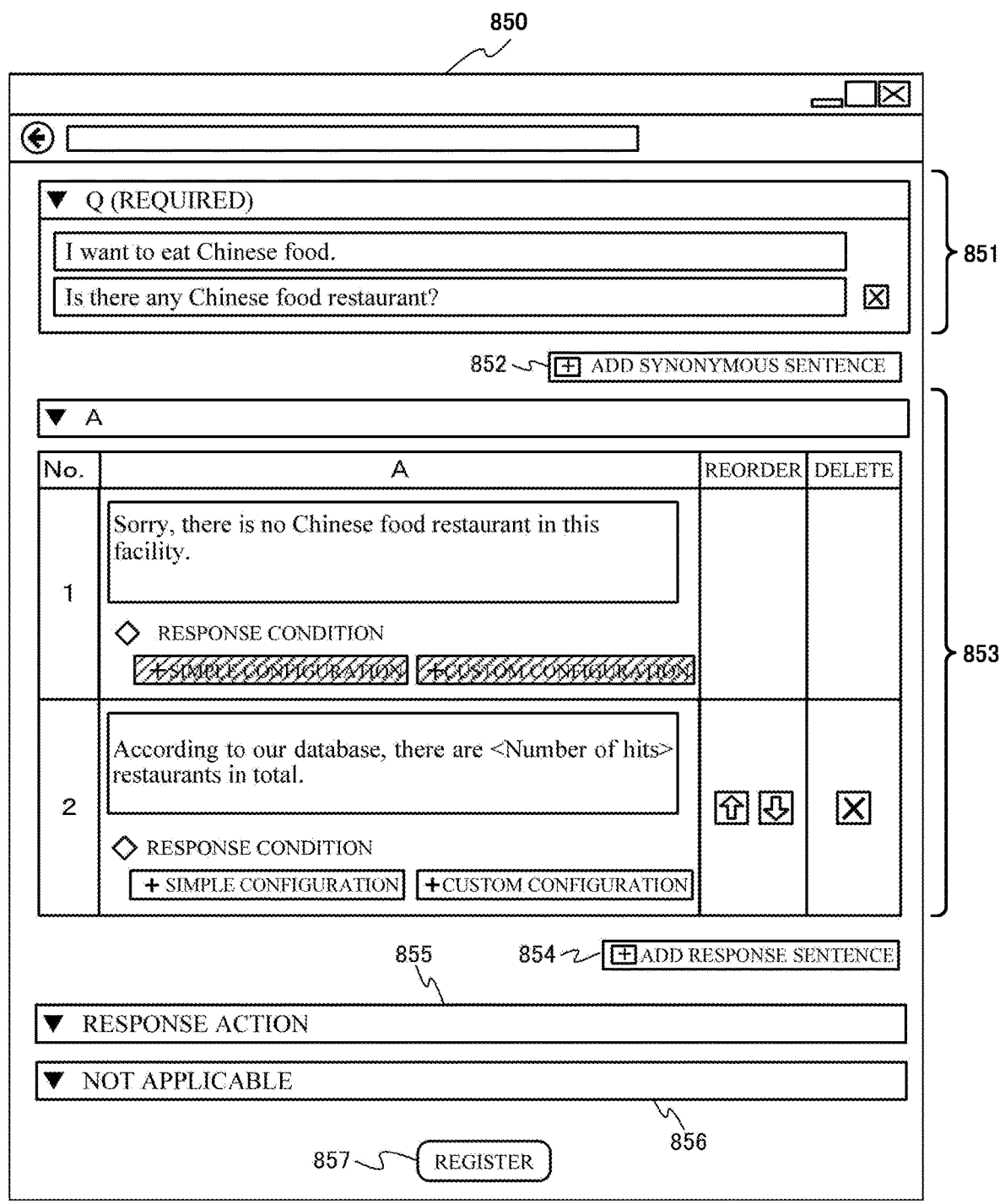
FIG. 43 is a diagram for illustrating an example of a new QA addition screen.

FIG. 43 is a diagram for illustrating an example (new QA addition screen 850) of a new QA addition screen to add a new QA to the knowledge data 310.

The new QA addition screen 850 includes a Q display area 851, an Add Synonymous Sentence button 852, an A display area 853, an Add Response Sentence button 854, a response action setting button 855, an applicability setting button (Not Applicable button) 856, and a Register button 857.

The Q display area 851 includes an entry area for entering a Q; the system administrator enters a question or other kind of sentence that is expected to be entered by the users to this entry area so that an input sentence of a user will hit on the Q as being determined through comparison that the input sentence is semantically close to this Q. Furthermore, synonymous sentences or semantically similar sentences and expressions can be registered as a plurality of Qs. For this purpose, an Add Synonymous Sentence button 852 is provided. Upon press of this button, an entry area is added; the system administrator enters a synonymous sentence to the added entry area. In the example of FIG. 43, the second entry area in the Q display area 851 is an area to enter a synonymous sentence (a text "Is there any Chinese food restaurant?" is provided). The Q entered in the first entry area ("I want to eat Chinese food.") is a requirement and called representative Q.

Synonymous sentences can be added as many as desired in relation to a representative Q. Such configuration can absorb fluctuations in expression among users. In other words, inputs in various expressions entered by users can hit one of the Qs including the representative Q and the synonymous sentences, so that an assigned A can be output effectively. The X button provided on the right of the entry area for a synonymous sentence is to delete the synonymous sentence.

Below the Q display area 851, an A display area 853 is provided. An A is a response text and sent to the web browser of the user terminal when the input sentence of a user hits on one of the Qs set as described above; the system administrator enters an A appropriate for the Qs in the first row of the A display area 853.

In the example of FIG. 43, the system administrator enters a response "According to our database, there are <Number of hits> restaurants in total . . . " as the first response. This A is to guide a user (in a complex facility, for example) who has entered a sentence like the foregoing Q such as "I want to eat Chinese food", "Is there any Chinese food restaurant?", or the like, by answering that "According to our database, there are <Number of hits> restaurants in total . . . ".

The first entry area of the A display area 853 is provided with a Simple Configuration button and a Custom Configuration button for setting response conditions; however, the first A cannot be assigned response conditions. Unless a plurality of As are to be set, the system administrator presses the Register button 857 upon completion of entry to the first entry area to complete the new QA addition.

If the system administrator presses the Add Response Sentence button 854 after entering the first A to the A display area 853, the second entry area is displayed in the A display area 853 and the system administrator enters the second A to the area. Such configuration enables different response sentences to be output in accordance with the predetermined conditions in response to input sentences having the same purport.

For the second and subsequent As to be specified in the A display area 853, a Simple Configuration button and a Custom Configuration button are displayed to specify response conditions; the system administrator can press either one. In this example, the response conditions on the first A are evaluated first and if the response conditions are satisfied, the first A is determined to be a response and is sent to the user terminal; accordingly, the order of the second and subsequent As can be changed to coordinate the priorities in evaluation. Furthermore, the second and the subsequent As can be deleted together with their response conditions with the X button provided on the right of the entry area for entering the A.

Below the A display area 853, a response action setting button 855 is provided. Upon press of this button, an entry area to specify the response action is displayed. The details thereof are described later.

Below the response action setting button 855, an applicability setting button 856 is provided. Upon press of this button, an entry area to specify whether the QA should be subject to a suggestion, for example. The details thereof are described later.

On the bottom of the new QA addition screen 850, a Register button 857 is provided. Upon press of this button, information on the Qs, As, response conditions, and the like entered in the Q display area 851 and the A display area 853 is stored in the knowledge data 310.

FIG. 44 is a diagram for illustrating an example (custom configuration screen 840) of a custom configuration screen. The custom configuration screen 840 includes an A display area 841, a batch operation setting area 842, a conditional expression setting area 843, an Add button 844, a Save button 845, an attribute setting area 846, and an Add button 847.

The A display area 841 shows the A for which response conditions are to be specified with this custom configuration screen 840. In this example, the Custom Configuration button has been pressed to configure the response conditions for the second A in FIG. 43; accordingly, the second A is displayed in the A display area 841.

The batch operation setting area 842 shows a pull-down list to select a batch operation for the conditional expressions. Selecting Edit enables editing the conditional expressions selected with the checkboxes collectively; selecting Delete enables deleting the conditional expressions selected with the checkboxes collectively.

The conditional expression setting area 843 provides entry areas to enter the response conditions for the second A in the form of conditional expression. In the example of FIG. 44, one conditional expression is specified. Individual conditional expressions can use AND condition or OR condition.

The first conditional expression is "n (number of hits)>3". This conditional expression is compared with the data following "talk_option=" included in the request parameter of the URI sent from the user terminal and if the data matches the conditional expression, the data is determined to satisfy the response condition.

The conditional expression indicated in the conditional expression setting area 843 is associated with the second A and stored in the knowledge data 310 upon press of the Apply button provided on the right of the conditional expression.

The Add button 844 is to add another entry area for a conditional expression in the conditional expression setting area 843 so that a new conditional expression can be specified there.

The attribute setting area 846 provides entry areas to enter the attributes for the second A in the form of conditional expression. In the example of FIG. 44, one conditional expression is specified. Individual conditional expressions can use AND condition or OR condition.

For example, the first conditional expression is "Field 10=Chinese food".

The conditional expression indicated in the attribute setting area 846 is associated with the second A and stored in the knowledge data 310 upon press of the Apply button provided on the right of the conditional expression.

The Add button 847 is to add another entry area for a conditional expression in the attribute setting area 846 so that a new conditional expression can be specified there.

The Save button 845 is to save the conditional expressions in the entry areas displayed in the conditional expression setting area 843 and the attribute setting area 846.

As described above, the conditional expressions specified with the custom configuration screen 840 are compared with the parameters appended by the web browser of the user terminal and whether the response conditions are satisfied is determined in accordance with the comparison results. Accordingly, setting various parameters in the user terminal enables creation of wide variation in responses.

For example, a user terminal sends information obtainable by the user terminal to the dialogue server 1; then, the dialogue server 1 can select a different response depending on the information. Specifically, the user terminal may send information on the version of the OS or the web browser, or the model of the user terminal, so that the dialogue server 1 can select a response. In addition, if the user terminal can acquire information on the specifics of the input of the user (such as the number of inputs and the time of input) with an imaging device, the dialogue server 1 can select a response in accordance with this information.

Creating the knowledge data 310 is not limited to the above-described configuration. For example, the registering, altering, and deleting knowledge data may be performed by uploading a CSV (Comma-Separated Values) including knowledge data without using the screen.

Eighth Embodiment

The present embodiment describes another method of providing commercial information with reference to FIG. 45. In the present embodiment, elements different from those described in the first embodiment are mainly described; the same elements as those described in the first embodiment are denoted by the same reference signs and description thereof is omitted as appropriate.

FIG. 45 is a diagram for illustrating an example of a weight determination table. In the weight determination table, shops are specified correspondingly to discount sale periods. The shops are updated with appropriate timing (for example, periodically or in real time).

Basically, the weights (priority levels) are determined to be higher if the current date is in a discount sale period.

For example, at S152 in FIG. 28, the CPU 1401 assigns a weight "1" to the shop records of the shops holding a discount sale (the shops to be assigned the highest priority) among the shop records sorted by the first sorting. Then, the CPU 1401 sorts the shop records (second sorting) in accordance with the assigned weights.

This processing coordinates the shops to be recommended depending on the current date, enabling the dialogue to be more practical.

The weight determination table is not limited to the above-described example. Any weight determination table designed by the administrator can be employed.

Ninth Embodiment

In the present embodiment, the dialogue system 1000 includes a setting unit capable of changing the language (Japanese, English, Chinese, or Spanish) to be used for the dialogue.

The setting unit may be configured so that the user can select the language or the setting unit will identify the language from the input sentence to change the language to be used.

The configurations described in the first embodiment to the ninth embodiment can be combined as appropriate.

As set forth above, embodiments of the present invention have been described; however, they are merely specific examples and not to limit the present invention. The specific elements such as the individual units can be modified in design as appropriate. The effects described in the embodiments are merely the most advantageous effects achieved by the present invention and the effects of the present invention are not limited to the effects described in the embodiments.

In addition, the foregoing detailed description has mainly provided characteristic features for better understanding of the present invention. The present invention is not limited to the embodiments provided in the foregoing detailed description and can be applied to other embodiments to achieve a broad application range. Further, the terms and expressions used in the present specification are to appropriately describe the present invention, and not to limit the interpretation of the present invention. In addition, it would be obvious for those skilled in the art to conceive of configurations, systems, and/or methods other than those included in the concept of the present invention in view of the concept of the invention described in the present specification. Therefore, recitations of the claims must be regarded to include equivalent features within the scope of the technical idea of the present invention. The Abstract is provided for patent offices, general public institutions, or those skilled in the art who are not fully familiarized with patents, legal terms, and professional terminology to be able to readily understand the technical features and the essences of the present invention through simple investigation. Accordingly, the Abstract is not to limit the scope of the invention to be evaluated by the recitations of the claims. To fully understand the object(s) of the present invention and advantageous effect(s) unique to the present invention, it is encouraged to sufficiently refer to the documents already disclosed.

The detailed description provided hereinabove includes processing executed by a computer. The foregoing description and expressions are provided for those skilled in the art to most efficiently understand the present invention. In the present specification, each of the steps employed to derive a result is to be understood as processing without self-contradiction. In each of the steps, an electric or magnetic signal is transmitted, received, and/or recorded. Such a signal is expressed in the form of bit, value, symbol, character, term, number, or the like; however, it should be noted that these expressions are employed for clarity of explanation. Although some steps in the present specification are described using expressions common with human acts, the processing is actually executed by various devices. Furthermore, other elements necessary to perform the steps are obvious from the above description.

The invention claimed is:

1. A commercial information providing system comprising:
    a user interface comprising at least one of a physical or virtual button, a physical or virtual keyboard, a mouse, an icon displayed on electronic display device, or a microphone capable of accepting input of question information representing a question from a user;
    a non-transitory computer readable storage device including a knowledge database holding knowledge data including a plurality of sets of commercial information related to commercial facilities and a plurality of response templates of responses to question information input from the user interface;
    an administrator interface comprising at least one of a physical or virtual button, a physical or virtual keyboard, a mouse, an icon displayed on electronic display device, or a microphone capable of accepting setting of a priority level to prioritize providing a specific set of commercial information among the plurality of sets of commercial information;
    a searching and providing engine including a control device communicatively connectable to the knowledge database and configured to, upon reading computer readable instructions received from the non-transitory computer readable storage device, perform processing of extracting at a set of commercial information to be provided from the plurality of sets of commercial information and a response template to be used from the plurality of response templates based on the question information input from the user interface and creating response information using the response template, the response information including a set of commercial information selected from the extracted at the set of commercial information based on the priority level; and
    an information providing device configured to output one or more of an audio or visual signal so as to provide the response information created by the control device to the user,
    wherein the knowledge data stored in the database is further composed of a plurality of units, each including a reference text query that is compared with an input text query, and a response text that is associated with the reference text query,
    wherein the reference text query is associated with information comprising one or more of:
        a predetermined response condition, which is a condition on information input from the user interface, other than the input text query, for selecting a response text from among a plurality of response texts to be sent to the user interface;
        a predetermined response behavior setting, which is information for defining a behavior of the user interface when a selected response text is received by the user interface; and,
        a predetermined applicability setting, which is information for specifying whether the reference text query is to be a suggestion and/or whether to record the input text query into a log; and
    wherein data to be included in the response text is based on the auxiliary information associated with the reference text query and a semantic closeness of the input text query and the reference text query being greater than or equal to a predetermined threshold.

2. The commercial information providing system according to claim 1, further comprising a terminal device installed in the commercial facilities and connected with the control device to be able to communicate with the control device, wherein the terminal device includes the user interface.

3. The commercial information providing system according to claim 1, wherein the control device is configured to change the priority level in accordance with a weight assigned depending on predetermined information different from the question information input from the user interface.

4. The commercial information providing system according to claim 1, wherein the response information created by the control device includes action request information for encouraging the user to react to the commercial information included in the response information.

5. The commercial information providing system according to claim 1,
    wherein the user interface is configured to accept input of use request information for requesting to use a set of commercial information included in the response information provided by the information providing device,
    wherein the control device is configured to create guidance information for contributing to use of the set of commercial information designated by the use request information in response to input of the use request information from the user interface, and
    wherein the information providing device is configured to provide the guidance information created by the control device to the user.

6. A commercial information providing method for a commercial information providing system including a user interface comprising at least one of a physical or virtual button, a physical or virtual keyboard, a mouse, an icon displayed on electronic display device, or a microphone capable of accepting input of question information representing a question from a user, a non-transitory computer readable storage device including a knowledge database holding knowledge data including a plurality of sets of commercial information related to commercial facilities and a plurality of response templates of responses to question information input from the user interface, an administrator interface comprising at least one of a physical or virtual button, a physical or virtual keyboard, a mouse, an icon displayed on electronic display device, or a microphone capable of accepting setting of a priority level to prioritize providing a specific set of commercial information among the plurality of sets of commercial information, a searching and providing engine including a control device communicatively connectable to the database, and an information providing device configured to output one or more of an audio or visual signal, the commercial information providing method comprising:
upon the control device reading computer readable instructions received from the non-transitory computer readable storage device, the control device performing the control steps of:
connecting, by the control device, to the knowledge database;
extracting, by the control device, a set of commercial information to be provided from the plurality of sets of commercial information and a response template to be used from the plurality of response templates based on the question information input from the user interface; and
creating, by the control device, response information using the response template, the response information including a set of commercial information selected based on the priority level from the extracted the set of commercial information; and
an information providing step of providing via an output one or more of an audio or visual signal, by the information providing device, the response information created by the control device to the user;
wherein the knowledge data stored in the database is further composed of a plurality of units, each including a reference text query that is compared with an input text query, and a response text that is associated with the reference text query,
wherein the reference text query is associated with information comprising one or more of:
a predetermined response condition, which is a condition on information input from the information providing device, other than the input text query, for selecting a response text from among a plurality of response texts to be sent to the information providing device;
a predetermined response behavior setting, which is information for defining a behavior of the information providing device when a selected response text is received by the information providing device; and,
a predetermined applicability setting, which is information for specifying whether the reference text query is to be a suggestion and/or whether to record the input text query into a log; and,
wherein data to be included in the response text is based on the auxiliary information associated with the reference text query and a semantic closeness of the input text query and the reference text query being greater than or equal to a predetermined threshold.

* * * * *